US012559307B2

(12) United States Patent
Yang et al.

(10) Patent No.: US 12,559,307 B2
(45) Date of Patent: Feb. 24, 2026

(54) TRASH CAN ASSEMBLY

(71) Applicant: simplehuman, LLC, Torrance, CA (US)

(72) Inventors: Frank Yang, Rancho Palos Verdes, CA (US); Di-Fong Chang, Torrance, CA (US); Joseph Sandor, Newport Beach, CA (US)

(73) Assignee: simplehuman, LLC, Torrance, CA (US)

(*) Notice: Subject to any disclaimer, the term of this patent is extended or adjusted under 35 U.S.C. 154(b) by 0 days.

(21) Appl. No.: 18/474,054

(22) Filed: Sep. 25, 2023

(65) Prior Publication Data

US 2024/0270487 A1 Aug. 15, 2024

Related U.S. Application Data

(62) Division of application No. 16/284,996, filed on Feb. 25, 2019, now Pat. No. 11,801,996, which is a
(Continued)

(51) Int. Cl.

| | |
|---|---|
| ***B65F 1/06*** | (2006.01) |
| ***B65F 1/16*** | (2006.01) |
| *B65F 1/14* | (2006.01) |

(52) U.S. Cl.
CPC ............ *B65F 1/163* (2013.01); *B65F 1/1646* (2013.01); *B65F 1/06* (2013.01); *B65F 1/062* (2013.01);
(Continued)

(58) Field of Classification Search
CPC .......... B65F 1/163; B65F 1/1646; B65F 1/06; B65F 1/062; B65F 1/1473; B65F 1/1607;
(Continued)

(56) References Cited

U.S. PATENT DOCUMENTS

| | | | |
|---|---|---|---|
| 830,182 | A | 9/1906 | Skov |
| 1,379,677 | A | 5/1921 | Edward |

(Continued)

FOREIGN PATENT DOCUMENTS

| | | |
|---|---|---|
| AU | 622536 | 4/1992 |
| BR | 202013004348-1 | 11/2014 |

(Continued)

OTHER PUBLICATIONS

U.S. Appl. No. 15/476,285, filed Mar. 31, 2017, Yang et al.

(Continued)

*Primary Examiner* — Nathan J Jenness
*Assistant Examiner* — Elizabeth J Volz
(74) *Attorney, Agent, or Firm* — Knobbe, Martens, Olson & Bear, LLP

(57) ABSTRACT

Various trash can assembly embodiments are disclosed. In some embodiments, the trash can assembly includes a body and a lid assembly. The lid assembly can include a lid, and a multicomponent trim ring. The lid assembly can be rotatably connected with the body via a hinge unit. In certain embodiments, a flange of the trim ring is guided into and/or received into the hinge unit. A translating pin of the hinge unit can engage into the flange, thereby providing a rotatable connection between the trim ring and the body. In various embodiments, the translating pin is coupled with a handle to facilitate movement of the pin by a user during engagement of the trim ring and the hinge unit. A positioner can help to position the trash can against or adjacent to a wall or other structure. The movement of both the trim ring and the lid can be dampened.

21 Claims, 46 Drawing Sheets

Related U.S. Application Data division of application No. 14/637,270, filed on Mar. 3, 2015, now Pat. No. 10,279,997.

(60) Provisional application No. 61/983,305, filed on Apr. 23, 2014, provisional application No. 61/953,485, filed on Mar. 14, 2014.

(52) U.S. Cl.
CPC .......... *B65F 1/1473* (2013.01); *B65F 1/1607* (2013.01); *B65F 1/1615* (2013.01); *B65F 2001/1661* (2013.01); *B65F 2001/1669* (2013.01); *B65F 2220/12* (2013.01); *B65F 2250/11* (2013.01); *B65F 2250/114* (2013.01)

(58) Field of Classification Search
CPC ........... B65F 1/1615; B65F 2001/1661; B65F 2001/1669; B65F 2220/12; B65F 2250/11; B65F 2250/114
USPC .......... 220/263, 908, 908.1, 495.01, 495.06, 220/495.08, 495.11, 810, 254.3, 254.6
See application file for complete search history.

(56) References Cited

U.S. PATENT DOCUMENTS

| | | | | |
|---|---|---|---|---|
| 1,426,211 | A | | 8/1922 | Pausin |
| 1,461,253 | A | | 7/1923 | Owen |
| 1,754,802 | A | | 4/1930 | Raster |
| 1,820,555 | A | | 8/1931 | Buschman |
| 1,891,651 | A | | 12/1932 | Padelford et al. |
| 1,922,729 | A | | 8/1933 | Geibel |
| 1,980,938 | A | | 11/1934 | Geibel |
| 2,046,777 | A | | 7/1936 | Geibel |
| 2,308,326 | A | | 1/1943 | Ambrose |
| D148,825 | S | | 2/1948 | Snider |
| 2,457,274 | A | | 12/1948 | Rifken |
| 2,591,104 | A | | 4/1952 | Stone |
| 2,593,455 | A | | 4/1952 | James |
| 2,699,368 | A | | 1/1955 | Alois |
| 2,759,625 | A | | 8/1956 | Ritter |
| 2,796,309 | A | | 6/1957 | Taylor |
| 2,888,307 | A | | 5/1959 | Graves et al. |
| 2,946,474 | A | | 7/1960 | Knapp |
| 3,008,604 | A | | 11/1961 | Garner |
| 3,023,922 | A | | 3/1962 | Arrington et al. |
| 3,137,408 | A | | 6/1964 | Taylor |
| 3,180,384 | A | | 4/1965 | Seifert |
| 3,261,545 | A | | 7/1966 | Frazier |
| 3,300,082 | A | | 1/1967 | Patterson |
| 3,392,825 | A | | 7/1968 | Gale et al. |
| 3,450,297 | A | | 6/1969 | Clerk |
| 3,451,453 | A | | 6/1969 | Heck |
| 3,618,814 | A | | 11/1971 | Nagroski |
| 3,654,534 | A | | 4/1972 | Fischer |
| 3,800,503 | A | | 4/1974 | Maki |
| 3,820,200 | A | | 6/1974 | Myers |
| 3,825,150 | A | | 7/1974 | Taylor |
| 3,825,215 | A | | 7/1974 | Borglum |
| 3,870,261 | A | | 3/1975 | McSwain |
| 3,886,425 | A | | 5/1975 | Weiss |
| 3,888,406 | A | | 6/1975 | Nippes |
| 3,891,115 | A | | 6/1975 | Ono |
| 3,893,615 | A | | 7/1975 | Johnson |
| 3,964,630 | A | | 6/1976 | Getz |
| 4,014,457 | A | | 3/1977 | Hodge |
| 4,027,774 | A | | 6/1977 | Cote |
| 4,081,105 | A | | 3/1978 | Dagonnet et al. |
| 4,189,808 | A | | 2/1980 | Brown |
| 4,200,197 | A | | 4/1980 | Meyer et al. |
| 4,217,616 | A | | 8/1980 | Jessup |
| 4,223,858 | A | | 9/1980 | De Salazar |
| 4,303,174 | A | | 12/1981 | Anderson |
| 4,320,851 | A | | 3/1982 | Montoya |
| 4,349,123 | A | | 9/1982 | Yang |
| 4,357,740 | A | | 11/1982 | Brown |
| 4,416,197 | A | | 11/1983 | Kehl |
| 4,417,669 | A | | 11/1983 | Knowles et al. |
| 4,457,483 | A | | 7/1984 | Gagne |
| 4,535,911 | A | | 8/1985 | Goulter |
| 4,570,304 | A | | 2/1986 | Montreuil et al. |
| 4,576,310 | A | | 3/1986 | Isgar et al. |
| D284,320 | S | | 6/1986 | Kubic et al. |
| 4,609,117 | A | | 9/1986 | Pamment |
| 4,630,332 | A | | 12/1986 | Bisbing |
| 4,630,752 | A | | 12/1986 | DeMars |
| 4,664,347 | A | | 5/1987 | Brown et al. |
| 4,697,312 | A | | 10/1987 | Freyer |
| 4,711,161 | A | | 12/1987 | Swin et al. |
| 4,729,490 | A | | 3/1988 | Ziegenbein |
| 4,753,367 | A | * | 6/1988 | Miller ...................... B65F 1/06 D34/1 |
| 4,763,808 | A | | 8/1988 | Guhl et al. |
| 4,765,548 | A | | 8/1988 | Sing |
| 4,765,579 | A | | 8/1988 | Robbins, III et al. |
| 4,785,964 | A | | 11/1988 | Miller et al. |
| 4,792,039 | A | | 12/1988 | Dayton |
| 4,794,973 | A | | 1/1989 | Perisic |
| 4,813,592 | A | | 3/1989 | Stolzman |
| 4,823,979 | A | | 4/1989 | Clark, Jr. |
| 4,834,260 | A | | 5/1989 | Auten |
| 4,863,053 | A | | 9/1989 | Oberg |
| 4,867,339 | A | | 9/1989 | Hahn |
| 4,869,391 | A | | 9/1989 | Farrington |
| 4,884,717 | A | | 12/1989 | Bussard et al. |
| 4,888,532 | A | | 12/1989 | Josson |
| 4,892,223 | A | | 1/1990 | DeMent |
| 4,892,224 | A | | 1/1990 | Graham |
| D307,344 | S | | 4/1990 | Massonnet |
| 4,913,308 | A | | 4/1990 | Culbertson |
| 4,915,347 | A | | 4/1990 | Iqbal et al. |
| 4,918,568 | A | | 4/1990 | Stone et al. |
| D308,272 | S | | 5/1990 | Koepsell |
| 4,923,087 | A | | 5/1990 | Burrows |
| 4,944,419 | A | | 7/1990 | Chandler |
| 4,948,004 | A | | 8/1990 | Chich |
| 4,953,740 | A | | 9/1990 | Koda |
| 4,964,523 | A | | 10/1990 | Bieltvedt et al. |
| 4,972,966 | A | | 11/1990 | Craft, Jr. |
| 4,996,467 | A | | 2/1991 | Day |
| 5,031,793 | A | | 7/1991 | Chen et al. |
| 5,048,903 | A | | 9/1991 | Loblein |
| 5,054,724 | A | | 10/1991 | Hutcheson |
| 5,065,272 | A | | 11/1991 | Owen et al. |
| 5,065,891 | A | | 11/1991 | Casey |
| D322,350 | S | | 12/1991 | Craft, Jr. et al. |
| 5,072,852 | A | | 12/1991 | Smith et al. |
| 5,076,462 | A | | 12/1991 | Perrone |
| D323,573 | S | | 1/1992 | Schneider |
| 5,090,585 | A | | 2/1992 | Power |
| 5,090,785 | A | | 2/1992 | Stamp |
| 5,100,087 | A | | 3/1992 | Ashby |
| 5,111,958 | A | | 5/1992 | Witthoeft |
| D327,760 | S | | 7/1992 | Donnelly |
| D329,929 | S | | 9/1992 | Knoedler et al. |
| 5,147,055 | A | | 9/1992 | Samson et al. |
| 5,156,290 | A | | 10/1992 | Rodrigues |
| D331,097 | S | | 11/1992 | Sieren |
| 5,170,904 | A | | 12/1992 | Neuhaus |
| 5,174,462 | A | | 12/1992 | Hames |
| D332,852 | S | | 1/1993 | Delmerico |
| 5,199,571 | A | * | 4/1993 | Wolff ...................... A47J 47/18 220/773 |
| D335,562 | S | | 5/1993 | Evans |
| 5,213,272 | A | | 5/1993 | Gallagher et al. |
| 5,222,704 | A | | 6/1993 | Light |
| D337,181 | S | | 7/1993 | Warman |
| 5,226,558 | A | | 7/1993 | Whitney et al. |
| 5,230,525 | A | | 7/1993 | Delmerico et al. |
| 5,242,074 | A | | 9/1993 | Conaway et al. |
| D340,333 | S | | 10/1993 | Duran et al. |
| 5,249,693 | A | | 10/1993 | Gillispie et al. |
| 5,261,553 | A | | 11/1993 | Mueller et al. |

(56) References Cited

U.S. PATENT DOCUMENTS 5,265,511 A 11/1993 Itzov
5,295,607 A 3/1994 Chang
5,305,916 A 4/1994 Suzuki et al.
5,314,151 A 5/1994 Carter-Mann
5,322,179 A 6/1994 Ting
5,329,212 A 7/1994 Feigleson
5,337,581 A 8/1994 Lott
5,348,222 A 9/1994 Patey
5,353,950 A 10/1994 Taylor et al.
5,372,272 A 12/1994 Jennings
5,381,588 A 1/1995 Nelson
5,385,258 A 1/1995 Sutherlin
5,390,818 A 2/1995 LaBuda
5,404,621 A 4/1995 Heinke
5,407,089 A 4/1995 Bird et al.
5,419,452 A 5/1995 Mueller et al.
5,471,708 A 12/1995 Lynch
5,474,201 A 12/1995 Liu
5,476,187 A 12/1995 Marisco
5,501,358 A 3/1996 Hobday
D368,563 S 4/1996 Brightbill et al.
5,520,067 A 5/1996 Gaba
5,520,303 A 5/1996 Bernstein et al.
5,527,840 A 6/1996 Chutko et al.
5,531,348 A 7/1996 Baker et al.
5,535,913 A 7/1996 Asbach et al.
5,558,254 A 9/1996 Anderson et al.
5,560,283 A 10/1996 Hannig
5,584,412 A 12/1996 Wang
D377,554 S 1/1997 Adriaansen
5,611,507 A 3/1997 Smith
5,628,424 A 5/1997 Gola
5,632,401 A 5/1997 Hurd
5,636,416 A 6/1997 Anderson
5,636,761 A 6/1997 Diamond et al.
5,644,111 A 7/1997 Cerny et al.
5,645,186 A 7/1997 Powers et al.
5,650,680 A 7/1997 Chula
D383,277 S 9/1997 Peters
5,662,235 A 9/1997 Nieto
5,671,847 A 9/1997 Pedersen et al.
5,690,247 A 11/1997 Boover
5,695,088 A 12/1997 Kasbohm
5,699,929 A 12/1997 Ouno
D388,922 S 1/1998 Peters
D389,631 S 1/1998 Peters
5,704,511 A 1/1998 Kellams
5,724,837 A 3/1998 Shin
5,730,312 A 3/1998 Hung
5,732,845 A 3/1998 Armaly, Jr.
5,735,495 A 4/1998 Kubota
5,738,239 A 4/1998 Triglia
5,770,935 A 6/1998 Smith et al.
5,799,909 A 9/1998 Ziegler
5,816,431 A 10/1998 Giannopoulos
5,816,640 A 10/1998 Nishimura
D401,028 S 11/1998 Ahern, Jr. et al.
D401,383 S 11/1998 Gish
D401,719 S * 11/1998 Van Leeuwen .................. D34/1
5,873,643 A 2/1999 Burgess, Jr. et al.
5,881,896 A 3/1999 Presnell et al.
5,881,901 A 3/1999 Hampton
5,884,237 A 3/1999 Kanki et al.
5,887,748 A 3/1999 Nguyen
D412,552 S 8/1999 Burrows
5,961,105 A 10/1999 Ehrnsberger et al.
5,967,355 A 10/1999 Ragot
5,967,392 A 10/1999 Niemi et al.
5,987,708 A 11/1999 Newton
6,000,569 A 12/1999 Liu
6,010,024 A 1/2000 Wang
D420,182 S 2/2000 Roudebush
6,024,238 A 2/2000 Jaros
D422,123 S 3/2000 Roudebush
6,036,050 A 3/2000 Ruane
6,062,389 A * 5/2000 Kent ........................ B44D 3/12
220/555
6,079,645 A 6/2000 Henreckson et al.
6,091,064 A 7/2000 Eaton et al.
6,102,239 A 8/2000 Wien
6,105,859 A 8/2000 Stafford
6,123,215 A 9/2000 Windle
D431,700 S 10/2000 Roudebush
D431,888 S 10/2000 Roudebush
6,126,031 A 10/2000 Reason
6,129,233 A 10/2000 Schiller
6,131,861 A 10/2000 Fortier, Jr. et al.
D435,951 S 1/2001 Yang et al.
6,176,455 B1 1/2001 Ma
6,209,744 B1 4/2001 Gill
6,211,637 B1 4/2001 Studer
6,234,339 B1 5/2001 Thomas
6,250,492 B1 6/2001 Verbeek
D445,980 S 7/2001 Tjugum
6,286,706 B1 9/2001 Tucker
6,328,320 B1 12/2001 Walski et al.
6,345,725 B1 2/2002 Lin
6,364,147 B1 4/2002 Meinzinger et al.
6,386,386 B1 5/2002 George
6,390,321 B1 5/2002 Wang
6,401,958 B1 6/2002 Foss et al.
D466,667 S 12/2002 Lin
6,519,130 B1 2/2003 Breslow
6,557,716 B1 5/2003 Chan
D476,456 S 6/2003 Englert et al.
D476,457 S 6/2003 Verbeek
6,596,983 B2 7/2003 Brent
D480,193 S 9/2003 Wang
6,612,099 B2 9/2003 Stravitz
6,626,316 B2 9/2003 Yang
6,626,317 B2 9/2003 Pfiefer et al.
D481,508 S 10/2003 Wang
6,632,064 B1 10/2003 Walker et al.
D481,846 S 11/2003 Lin
D482,169 S 11/2003 Lin
6,659,407 B2 12/2003 Asaro
6,681,950 B2 1/2004 Miller, Jr. et al.
6,701,832 B1 3/2004 Hawkins
D488,604 S 4/2004 Yang et al.
D488,903 S 4/2004 Yang et al.
D489,503 S 5/2004 Lin
D489,855 S 5/2004 Tseng
D489,857 S 5/2004 Yang et al.
D490,583 S 5/2004 Yang et al.
6,739,474 B1 5/2004 Wang
D490,954 S 6/2004 Brand
D491,706 S 6/2004 Yang et al.
6,758,366 B2 7/2004 Bourgund et al.
D493,930 S 8/2004 Wang
D494,723 S 8/2004 Lin
6,774,586 B1 8/2004 Shih
6,785,912 B1 9/2004 Julio
6,812,655 B1 11/2004 Wang et al.
6,814,249 B2 11/2004 Lin
D499,450 S 12/2004 Goodman et al.
6,837,393 B1 1/2005 Kuo
6,857,538 B2 2/2005 Lin
6,859,005 B2 2/2005 Boliver
D503,021 S 3/2005 Yang et al.
D503,022 S 3/2005 Lai
D503,502 S 3/2005 Lai
6,866,826 B2 3/2005 Moore et al.
6,883,676 B2 4/2005 Lin
D507,090 S 7/2005 Yang et al.
6,920,994 B2 7/2005 Lin
D509,339 S 9/2005 Lin
6,974,948 B1 12/2005 Brent
D513,445 S 1/2006 Lin
6,981,606 B2 1/2006 Yang et al.
D517,763 S * 3/2006 Daams ............................. D34/9
D517,764 S 3/2006 Wang
D517,767 S 3/2006 Yang et al.
D518,266 S 3/2006 Yang et al.
7,017,773 B2 3/2006 Gruber et al.

(56) References Cited

U.S. PATENT DOCUMENTS 7,033,039 B2 4/2006 Lin
D522,203 S 5/2006 Lin
D522,204 S 5/2006 Lin
7,044,323 B2 5/2006 Yang
D522,704 S 6/2006 Lin
D524,504 S 7/2006 Lin
D525,756 S 7/2006 Yang et al.
7,073,677 B2 7/2006 Richardson et al.
7,077,283 B2 7/2006 Yang et al.
7,080,750 B2 7/2006 Wein et al.
D526,457 S 8/2006 Lin
D526,458 S 8/2006 Lin
D526,756 S 8/2006 Lin
7,086,550 B2 8/2006 Yang et al.
D528,726 S 9/2006 Lin
D530,476 S 10/2006 Lin
D530,874 S 10/2006 Lin
7,121,421 B2 10/2006 Yang et al.
D531,499 S 11/2006 Zaidman
D535,450 S 1/2007 Chen
D535,799 S 1/2007 Epps
D535,800 S 1/2007 Yang et al.
7,163,591 B2 1/2007 Kim et al.
7,168,591 B1 1/2007 Miller
D537,223 S 2/2007 Lin
D537,597 S 2/2007 Bolden
D537,599 S 2/2007 Lin
D537,601 S 2/2007 Lin
D537,999 S 3/2007 Lin
D538,995 S 3/2007 Lin
D539,498 S 3/2007 Yang et al.
D539,499 S 3/2007 Yang et al.
D540,001 S 4/2007 Zimmerman
7,204,441 B1 4/2007 Hartnett et al.
D542,001 S 5/2007 Yang et al.
D542,995 S 5/2007 Lin
D543,673 S 5/2007 Yang et al.
D544,170 S 6/2007 Lin
D544,171 S 6/2007 Lin
D544,671 S 6/2007 Saunders et al.
D545,024 S 6/2007 Liao
7,225,943 B2 6/2007 Yang et al.
D547,020 S 7/2007 Chen
7,243,811 B1 7/2007 Ramsey
D550,918 S 9/2007 Wang et al.
D552,319 S 10/2007 Gusdorf
D552,321 S 10/2007 Yang et al.
D552,823 S 10/2007 Yang et al.
D552,824 S 10/2007 Zimmerman
D552,825 S 10/2007 Yang et al.
D555,320 S 11/2007 Yang et al.
D557,869 S 12/2007 Hawker et al.
D559,494 S 1/2008 Yang et al.
D559,495 S 1/2008 Yang et al.
D562,522 S 2/2008 Daams
7,328,842 B2 2/2008 Wagner et al.
D564,169 S 3/2008 Wang
D564,723 S 3/2008 Yang et al.
D566,367 S 4/2008 Lin
D566,369 S 4/2008 Shek
D566,923 S 4/2008 Lin
D567,468 S 4/2008 Yang et al.
D568,572 S 5/2008 Yang et al.
D569,720 S 5/2008 Lablaine
7,370,919 B2 5/2008 Rapier, III
7,374,060 B2 5/2008 Yang et al.
D571,520 S 6/2008 Lin
D574,119 S 7/2008 Sofy
7,395,990 B1 7/2008 Stevens
7,398,913 B2 7/2008 McClure
7,404,499 B1 7/2008 Ramsey
D574,569 S 8/2008 Yang et al.
D575,860 S 8/2008 Wu
7,416,093 B2 8/2008 Lin et al.
D576,371 S 9/2008 Zimmerman
D578,265 S 10/2008 Presnell
D578,266 S 10/2008 Yang et al.
D578,268 S 10/2008 Yang et al.
D578,722 S 10/2008 Yang et al.
7,438,199 B1 10/2008 Tidrick
D580,120 S 11/2008 Lin
D580,613 S 11/2008 Yang et al.
D580,615 S 11/2008 Yang et al.
D581,622 S 11/2008 Presnell et al.
D582,121 S 12/2008 Wang et al.
D584,470 S 1/2009 Bizzell et al.
D585,171 S 1/2009 Bizzell et al.
D585,172 S 1/2009 Lin
D585,618 S 1/2009 Yang et al.
D586,065 S 2/2009 Lin
D586,066 S 2/2009 Lin
D586,069 S 2/2009 Lin
D586,070 S 2/2009 Lin
7,494,021 B2 2/2009 Yang et al.
D587,874 S 3/2009 Lin
D588,321 S 3/2009 Schoofs
D589,670 S 3/2009 Smeets
D593,271 S 5/2009 Yang et al.
7,530,578 B2 5/2009 Niemeyer et al.
7,540,396 B2 6/2009 Yang et al.
7,543,716 B2 6/2009 Lin
D596,820 S 7/2009 Yang et al.
7,559,433 B2 7/2009 Yang et al.
D599,074 S 8/2009 Bizzell et al.
D599,971 S 9/2009 Lin
D603,119 S 10/2009 Yang et al.
7,607,552 B2 10/2009 Efstathiou
D604,472 S 11/2009 Blanks et al.
7,614,519 B2 11/2009 Krauth et al.
7,621,420 B2 11/2009 Bandoh et al.
D608,069 S 1/2010 Schoofs
7,656,109 B2 2/2010 Yang et al.
D611,216 S 3/2010 Yang et al.
D611,217 S 3/2010 Bizzell et al.
D611,671 S 3/2010 Yang et al.
7,694,838 B2 4/2010 Yang et al.
7,703,622 B1 4/2010 Bynoe
D615,270 S 5/2010 Yang et al.
D615,722 S 5/2010 Yang et al.
7,712,285 B2 5/2010 Stravitz et al.
7,731,112 B2 6/2010 Matlin et al.
7,741,801 B2 6/2010 Fukuizumi
7,748,556 B2 7/2010 Yang et al.
7,774,202 B2 8/2010 Spengler et al.
7,781,995 B2 8/2010 Yang et al.
D623,817 S 9/2010 Yang et al.
D625,068 S 10/2010 Shannon
7,806,285 B2 10/2010 Yang et al.
D627,533 S 11/2010 Yang et al.
D627,944 S 11/2010 Wang et al.
D629,172 S 12/2010 Liao
D629,579 S 12/2010 Lin
D630,404 S 1/2011 Yang et al.
D631,221 S 1/2011 Yang et al.
D632,039 S 2/2011 Yang et al.
D632,864 S 2/2011 Yang et al.
7,888,898 B2 2/2011 Wilkerson
D634,911 S 3/2011 Yang et al.
D635,319 S 3/2011 Meyerhoffer
7,896,187 B2 3/2011 Haibel
7,906,921 B2 3/2011 Wang et al.
7,922,024 B2 4/2011 Yang et al.
7,950,543 B2 5/2011 Yang et al.
D639,520 S 6/2011 Lin
D644,390 S 8/2011 Smeets et al.
7,992,742 B1 8/2011 Kim
8,006,857 B2 8/2011 Lin
D644,806 S 9/2011 Yang et al.
D644,807 S 9/2011 Yang et al.
D649,728 S 11/2011 Campbell
8,074,833 B2 12/2011 Yang et al.
8,096,445 B2 1/2012 Yang et al.
D655,061 S 2/2012 Scaturro
8,136,688 B2 3/2012 Lee et al.

(56) References Cited

U.S. PATENT DOCUMENTS

| | | | |
|---|---|---|---|
| D657,108 | S | 4/2012 | Yang et al. |
| D657,109 | S | 4/2012 | Liao |
| D658,753 | S | 5/2012 | Zhang et al. |
| 8,297,470 | B2 | 10/2012 | Yang et al. |
| 8,317,055 | B2 | 11/2012 | Zawrotny et al. |
| D672,520 | S | 12/2012 | Yang et al. |
| D673,750 | S | 1/2013 | Quan |
| D675,802 | S | 2/2013 | Yang et al. |
| D675,803 | S | 2/2013 | Yang et al. |
| 8,393,489 | B1 | 3/2013 | Stravitz |
| 8,418,869 | B2 | 4/2013 | Yang et al. |
| D684,741 | S | 6/2013 | Harris |
| 8,456,120 | B2 | 6/2013 | Wang |
| D689,255 | S | 9/2013 | Sun Ting Kung et al. |
| 8,567,630 | B2 | 10/2013 | Yang et al. |
| 8,569,980 | B2 | 10/2013 | Yang et al. |
| D694,382 | S | 11/2013 | Brandenburg et al. |
| 8,575,537 | B2 | 11/2013 | Yao et al. |
| 8,607,932 | B2 | 12/2013 | Cooper et al. |
| 8,672,171 | B2 | 3/2014 | Wynn et al. |
| 8,678,219 | B1 | 3/2014 | Wang et al. |
| 8,686,676 | B2 | 4/2014 | Yang et al. |
| D704,406 | S | 5/2014 | Kern |
| 8,716,969 | B2 | 5/2014 | Yang et al. |
| 8,720,728 | B2 | 5/2014 | Yang et al. |
| D709,172 | S | 7/2014 | Brandenburg et al. |
| D709,662 | S | 7/2014 | Yang et al. |
| 8,766,582 | B2 | 7/2014 | Yang et al. |
| 8,807,378 | B2 | 8/2014 | Kaberna |
| 8,807,379 | B1 | 8/2014 | Hammond |
| D714,510 | S | 9/2014 | Yang et al. |
| D715,575 | S | 10/2014 | Williams et al. |
| D716,015 | S | 10/2014 | van de Leest |
| 8,851,316 | B2 | 10/2014 | Barrett et al. |
| 8,872,459 | B2 | 10/2014 | Yang et al. |
| D717,012 | S | 11/2014 | Han |
| D717,013 | S | 11/2014 | Han |
| D717,014 | S | 11/2014 | Han |
| D717,015 | S | 11/2014 | Han |
| D719,313 | S | 12/2014 | Kao |
| 8,910,821 | B1 | 12/2014 | Stravitz |
| D725,860 | S | 3/2015 | Spivey et al. |
| D725,861 | S | 3/2015 | Yang et al. |
| D729,367 | S | 5/2015 | Markwick et al. |
| D729,368 | S | 5/2015 | Markwick et al. |
| D729,485 | S | 5/2015 | Yang et al. |
| D730,008 | S | 5/2015 | Yang et al. |
| 9,051,093 | B2 | 6/2015 | Yang et al. |
| D755,461 | S | 5/2016 | Wall |
| D758,686 | S | 6/2016 | Beumer |
| D759,934 | S | 6/2016 | Yang et al. |
| D762,037 | S | 7/2016 | Chen |
| D765,937 | S | 9/2016 | Chen |
| D766,998 | S | 9/2016 | Kao et al. |
| 9,434,538 | B2 | 9/2016 | Yang et al. |
| D770,121 | S | 10/2016 | Chen |
| D771,344 | S | 11/2016 | Yang et al. |
| D773,145 | S | 11/2016 | Yang et al. |
| 9,481,515 | B2 | 11/2016 | Yang et al. |
| D773,769 | S | 12/2016 | Chen |
| 9,573,759 | B2 | 2/2017 | Yang et al. |
| 9,586,755 | B1 | 3/2017 | Yang et al. |
| D787,828 | S | 5/2017 | Thoma et al. |
| D790,145 | S | 6/2017 | Chen |
| D792,673 | S | 7/2017 | Lloyd et al. |
| D793,642 | S | 8/2017 | Yang et al. |
| D794,765 | S | 8/2017 | Brandenburg et al. |
| D798,016 | S | 9/2017 | Yang et al. |
| 9,751,692 | B2 | 9/2017 | Yang et al. |
| 9,790,025 | B2 | 10/2017 | Yang et al. |
| D804,133 | S | 11/2017 | Yang et al. |
| 9,856,080 | B2 | 1/2018 | Yang et al. |
| D809,729 | S | 2/2018 | Chen |
| D820,544 | S | 6/2018 | Joseph |
| D825,876 | S | 8/2018 | Chen |
| D827,968 | S | 9/2018 | Chen |
| D829,400 | S | 9/2018 | Yang et al. |
| D830,029 | S | 10/2018 | Greenspoon et al. |
| D835,374 | S | 12/2018 | Yang et al. |
| D835,376 | S | 12/2018 | Yang et al. |
| D836,278 | S | 12/2018 | Berberet et al. |
| D840,628 | S | 2/2019 | Chang |
| D841,275 | S | 2/2019 | Chen |
| D842,573 | S | 3/2019 | Smeets |
| D845,576 | S | 4/2019 | Lu |
| 10,279,996 | B2 | 5/2019 | Yang et al. |
| 10,279,997 | B2 | 5/2019 | Yang et al. |
| D851,350 | S | 6/2019 | Lu |
| D853,065 | S | 7/2019 | Liao |
| D853,067 | S | 7/2019 | Chen |
| D855,919 | S | 8/2019 | Yang et al. |
| D858,023 | S | 8/2019 | Beumer et al. |
| D858,024 | S | 8/2019 | Yang et al. |
| D858,923 | S | 9/2019 | Yang et al. |
| D861,076 | S | 9/2019 | Chen |
| 10,413,064 | B1 | 9/2019 | Lu |
| 10,472,170 | B2 | 11/2019 | Yang et al. |
| D871,564 | S | 12/2019 | Brandenburg et al. |
| 10,494,175 | B2 | 12/2019 | Yang et al. |
| D874,776 | S | 2/2020 | Spadotto |
| 10,654,648 | B1 | 5/2020 | Rodriguez |
| 10,683,165 | B2 | 6/2020 | Yang et al. |
| 10,723,549 | B2 | 7/2020 | Yang et al. |
| D901,815 | S | 11/2020 | Yang et al. |
| D903,217 | S | 11/2020 | Smeets |
| D905,367 | S | 12/2020 | Smeets |
| D907,320 | S | 1/2021 | Moreno |
| D911,650 | S | 2/2021 | Liao |
| D911,651 | S | 2/2021 | Liao |
| 10,906,738 | B2 | 2/2021 | Barry |
| D915,712 | S | 4/2021 | Liu |
| 11,008,163 | B2 | 5/2021 | Wang et al. |
| 11,027,916 | B2 | 6/2021 | Yang et al. |
| D925,153 | S | 7/2021 | Busch |
| D929,062 | S | 8/2021 | Chen |
| D930,933 | S | 9/2021 | Yang et al. |
| 11,136,186 | B2 | 10/2021 | Yang et al. |
| D936,927 | S | 11/2021 | Zeng |
| D938,125 | S | 12/2021 | Zhang |
| D939,174 | S | 12/2021 | Zeng |
| 11,279,555 | B2 | 3/2022 | Yang et al. |
| D951,578 | S | 5/2022 | Lu |
| D963,277 | S | 9/2022 | Yang et al. |
| D969,291 | S | 11/2022 | Yang et al. |
| 11,535,449 | B2 | 12/2022 | Yang et al. |
| D979,167 | S | 2/2023 | Liao et al. |
| D982,273 | S | 3/2023 | Chen |
| 11,603,263 | B2 | 3/2023 | Yang et al. |
| D992,231 | S | 7/2023 | Wang et al. |
| 11,801,996 | B2 | 10/2023 | Yang et al. |
| D1,004,069 | S | 11/2023 | Yang et al. |
| D1,009,652 | S | 1/2024 | Chen |
| D1,013,997 | S | 2/2024 | Wang et al. |
| 12,043,480 | B1 | 7/2024 | Yang et al. |
| 12,139,328 | B2 | 11/2024 | Yang et al. |
| 2001/0002690 | A1 | 6/2001 | Rosky |
| 2001/0013745 | A1 | 8/2001 | Fulterer et al. |
| 2001/0020619 | A1 | 9/2001 | Pfeifer et al. |
| 2001/0045512 | A1 | 11/2001 | Brent |
| 2002/0009567 | A1 | 1/2002 | Brand |
| 2002/0066736 | A1 | 6/2002 | Pyles |
| 2002/0092853 | A1 | 7/2002 | Wang |
| 2002/0096523 | A1 | 7/2002 | Pyles |
| 2002/0096524 | A1 | 7/2002 | Hardesty |
| 2002/0100758 | A1 | 8/2002 | Pyles |
| 2002/0104266 | A1 | 8/2002 | Ranaudo |
| 2002/0116924 | A1 | 8/2002 | Winkelmann et al. |
| 2002/0185199 | A1 | 12/2002 | Myers et al. |
| 2003/0089719 | A1 | 5/2003 | Berger |
| 2003/0102316 | A1 | 6/2003 | Forest |
| 2003/0201265 | A1 | 10/2003 | Lin |
| 2003/0205979 | A1 | 11/2003 | Papari et al. |
| 2003/0230576 | A1 | 12/2003 | Lin |
| 2004/0016756 | A1 | 1/2004 | Lin |

(56) References Cited

U.S. PATENT DOCUMENTS

| | | | | |
|---|---|---|---|---|
| 2004/0028572 | A1 | 2/2004 | Sham et al. | |
| 2004/0134924 | A1 | 7/2004 | Hansen et al. | |
| 2004/0140782 | A1 | 7/2004 | Okabe et al. | |
| 2004/0164077 | A1 | 8/2004 | Kuo | |
| 2004/0174268 | A1 | 9/2004 | Scott et al. | |
| 2004/0175303 | A1 | 9/2004 | Lin | |
| 2004/0199401 | A1 | 10/2004 | Wagner | |
| 2004/0200938 | A1 | 10/2004 | Forlivio | |
| 2004/0206758 | A1 | 10/2004 | Lin | |
| 2004/0206760 | A1 | 10/2004 | Gagnebin | |
| 2004/0250711 | A1 | 12/2004 | Ernst | |
| 2004/0251746 | A1 | 12/2004 | Ichimaru et al. | |
| 2005/0017006 | A1 | 1/2005 | Kuo | |
| 2005/0017010 | A1 | 1/2005 | Siegel et al. | |
| 2005/0029281 | A1 | 2/2005 | Westermann et al. | |
| 2005/0129803 | A1 | 6/2005 | Umeda et al. | |
| 2005/0258177 | A1* | 11/2005 | Woodson ................ | B65F 1/062 220/495.07 |
| 2005/0258794 | A1 | 11/2005 | Fukuizumi | |
| 2006/0027579 | A1 | 2/2006 | Yang et al. | |
| 2006/0103086 | A1 | 5/2006 | Niemeyer et al. | |
| 2006/0110537 | A1 | 5/2006 | Huang et al. | |
| 2006/0138149 | A1 | 6/2006 | Tracy | |
| 2006/0156948 | A1 | 7/2006 | Hendriks et al. | |
| 2006/0163257 | A1 | 7/2006 | Golbert | |
| 2006/0175336 | A1 | 8/2006 | Wang | |
| 2006/0186121 | A1 | 8/2006 | Yang et al. | |
| 2006/0196874 | A1 | 9/2006 | Yang | |
| 2006/0237641 | A1 | 10/2006 | Moeller et al. | |
| 2006/0249510 | A1 | 11/2006 | Lin | |
| 2006/0278643 | A1 | 12/2006 | Chiou | |
| 2006/0283863 | A1 | 12/2006 | Coles | |
| 2007/0012699 | A1 | 1/2007 | Yang et al. | |
| 2007/0034334 | A1 | 2/2007 | Ramsey et al. | |
| 2007/0034723 | A1 | 2/2007 | Joachim et al. | |
| 2007/0045326 | A1 | 3/2007 | Tramontina et al. | |
| 2007/0090112 | A1 | 4/2007 | Kalman et al. | |
| 2007/0114847 | A1 | 5/2007 | Ichimaru et al. | |
| 2007/0181579 | A1 | 8/2007 | Kuo et al. | |
| 2007/0209846 | A1 | 9/2007 | Wilson | |
| 2007/0215622 | A1 | 9/2007 | Perez | |
| 2007/0241109 | A1 | 10/2007 | Lin | |
| 2007/0266637 | A1 | 11/2007 | McGowan | |
| 2007/0272691 | A1 | 11/2007 | Wang et al. | |
| 2007/0289972 | A1 | 12/2007 | Wynn et al. | |
| 2008/0011754 | A1 | 1/2008 | Ramsey | |
| 2008/0011910 | A1 | 1/2008 | Ramsey | |
| 2008/0041863 | A1 | 2/2008 | Forest | |
| 2008/0083627 | A1 | 4/2008 | Hamm | |
| 2008/0083756 | A1 | 4/2008 | Daniels | |
| 2008/0083757 | A1 | 4/2008 | Parker et al. | |
| 2008/0099274 | A1 | 5/2008 | Seel | |
| 2008/0128428 | A1 | 6/2008 | Beckerman | |
| 2008/0164257 | A1 | 7/2008 | Boll et al. | |
| 2008/0173648 | A1 | 7/2008 | Escobar et al. | |
| 2008/0236275 | A1 | 10/2008 | Breed et al. | |
| 2008/0237249 | A1 | 10/2008 | McGee | |
| 2008/0245794 | A1 | 10/2008 | Escobar et al. | |
| 2008/0257889 | A1 | 10/2008 | Kovacevich et al. | |
| 2008/0257890 | A1 | 10/2008 | Kovacevich et al. | |
| 2008/0257891 | A1 | 10/2008 | Kovacevich et al. | |
| 2008/0264948 | A1 | 10/2008 | Kovacevich et al. | |
| 2008/0264950 | A1 | 10/2008 | Kovacevich et al. | |
| 2008/0272119 | A1 | 11/2008 | Efstathiou | |
| 2008/0272127 | A1 | 11/2008 | Kovacevich et al. | |
| 2009/0008888 | A1 | 1/2009 | Boulden | |
| 2009/0071959 | A1 | 3/2009 | Cheung | |
| 2009/0084788 | A1 | 4/2009 | Yang et al. | |
| 2009/0136341 | A1 | 5/2009 | Kenyon | |
| 2009/0214606 | A1 | 8/2009 | Bujard et al. | |
| 2009/0218352 | A1 | 9/2009 | Sued et al. | |
| 2009/0230131 | A1 | 9/2009 | McDuffie et al. | |
| 2009/0261105 | A1 | 10/2009 | Cunningham et al. | |
| 2009/0266836 | A1 | 10/2009 | Mobley | |
| 2010/0006572 | A1 | 1/2010 | Chiou | |
| 2010/0084235 | A1 | 4/2010 | Lu | |
| 2010/0096894 | A1 | 4/2010 | Fukai | |
| 2010/0122985 | A1 | 5/2010 | Peters et al. | |
| 2010/0147865 | A1 | 6/2010 | Yang et al. | |
| 2010/0170904 | A1 | 7/2010 | Kalman et al. | |
| 2010/0176126 | A1 | 7/2010 | Shikano | |
| 2010/0178105 | A1 | 7/2010 | Monneret | |
| 2010/0193518 | A1 | 8/2010 | Tontarelli | |
| 2010/0219191 | A1 | 9/2010 | Prosa | |
| 2010/0237074 | A1 | 9/2010 | Yang et al. | |
| 2010/0252557 | A1 | 10/2010 | Clements | |
| 2010/0294766 | A1 | 11/2010 | Wang et al. | |
| 2010/0294769 | A1 | 11/2010 | Lee et al. | |
| 2011/0017735 | A1 | 1/2011 | Wang et al. | |
| 2011/0049149 | A1 | 3/2011 | Shih | |
| 2011/0056952 | A1 | 3/2011 | Borowski et al. | |
| 2011/0139781 | A1 | 6/2011 | Jin et al. | |
| 2011/0272409 | A1 | 11/2011 | Kasbohm | |
| 2012/0000911 | A1 | 1/2012 | Wang | |
| 2012/0111895 | A1 | 5/2012 | Fitzpatrick et al. | |
| 2012/0145932 | A1 | 6/2012 | Yao et al. | |
| 2012/0234836 | A1 | 9/2012 | Barrett et al. | |
| 2012/0234849 | A1 | 9/2012 | Hughes et al. | |
| 2012/0248149 | A1 | 10/2012 | Pelfrey | |
| 2012/0261423 | A1 | 10/2012 | Zawrotny et al. | |
| 2012/0267375 | A1 | 10/2012 | Egan et al. | |
| 2013/0002100 | A1 | 1/2013 | Badri et al. | |
| 2013/0036924 | A1 | 2/2013 | Ko | |
| 2013/0048641 | A1 | 2/2013 | Romano | |
| 2013/0097809 | A1 | 4/2013 | Weber et al. | |
| 2013/0105487 | A1 | 5/2013 | Baik | |
| 2013/0105488 | A1 | 5/2013 | Quan | |
| 2013/0240592 | A1 | 9/2013 | Woodruff | |
| 2013/0248535 | A1 | 9/2013 | Wolfe et al. | |
| 2013/0300119 | A1 | 11/2013 | Anzalon et al. | |
| 2014/0183193 | A1 | 7/2014 | Hammond et al. | |
| 2014/0238989 | A1 | 8/2014 | Wang et al. | |
| 2014/0240964 | A1 | 8/2014 | Adachi et al. | |
| 2014/0305946 | A1 | 10/2014 | Han | |
| 2014/0345453 | A1 | 11/2014 | Oh et al. | |
| 2015/0028751 | A1 | 1/2015 | Dobbins | |
| 2015/0213705 | A1 | 7/2015 | Ehrman et al. | |
| 2015/0251849 | A1 | 9/2015 | Yang et al. | |
| 2015/0321841 | A1 | 11/2015 | Salas et al. | |
| 2016/0035209 | A1 | 2/2016 | Martin et al. | |
| 2016/0137411 | A1 | 5/2016 | Rogers | |
| 2016/0162832 | A1 | 6/2016 | Thompson et al. | |
| 2016/0200508 | A1 | 7/2016 | Thoma et al. | |
| 2016/0239795 | A1 | 8/2016 | Burch, V et al. | |
| 2017/0050404 | A1 | 2/2017 | Henken et al. | |
| 2017/0052613 | A1 | 2/2017 | Alameh et al. | |
| 2017/0127669 | A1 | 5/2017 | Yang et al. | |
| 2017/0166167 | A1 | 6/2017 | Heller et al. | |
| 2017/0176986 | A1 | 6/2017 | High et al. | |
| 2018/0044108 | A1 | 2/2018 | Ackerman | |
| 2019/0077595 | A1 | 3/2019 | Wang et al. | |
| 2020/0148467 | A1 | 5/2020 | Yang et al. | |
| 2021/0269238 | A1 | 9/2021 | Shek | |
| 2022/0097960 | A1 | 3/2022 | Yang et al. | |
| 2022/0135318 | A1 | 5/2022 | Bing et al. | |
| 2022/0160126 | A1 | 5/2022 | Yang et al. | |
| 2022/0375320 | A1 | 11/2022 | Thompson et al. | |
| 2023/0115198 | A1 | 4/2023 | Yang et al. | |
| 2023/0286740 | A1 | 9/2023 | Yang et al. | |
| 2023/0356235 | A1 | 11/2023 | Yang et al. | |

FOREIGN PATENT DOCUMENTS

| | | | |
|---|---|---|---|
| CA | 2078813 | A1 | 9/1992 |
| CA | 2182840 | | 9/1997 |
| CA | 2519295 | | 3/2007 |
| CA | 132181 | | 6/2010 |
| CA | 2695086 | | 9/2010 |
| CA | 136938 | | 5/2011 |
| CA | 141819 | | 4/2012 |
| CA | 2778535 | A1 | 8/2013 |
| CN | 2075182 | U | 4/1991 |
| CN | 2378327 | Y | 5/2000 |
| CN | 2467467 | Y | 12/2001 |

(56) References Cited

FOREIGN PATENT DOCUMENTS

| | | | |
|---|---|---|---|
| CN | 2707695 | Y | 7/2005 |
| CN | 200964993 | Y | 10/2007 |
| CN | 101177946 | A | 5/2008 |
| CN | 201105898 | Y | 8/2008 |
| CN | 201330049 | Y | 10/2009 |
| CN | 201367221 | Y | 12/2009 |
| CN | 201372076 | Y | 12/2009 |
| CN | 201447201 | U | 5/2010 |
| CN | 201512253 | U | 6/2010 |
| CN | 201597962 | U | 10/2010 |
| CN | 201625566 | U | 11/2010 |
| CN | 201907743 | U | 7/2011 |
| CN | 202213911 | U | 5/2012 |
| CN | 301947175 | S | 6/2012 |
| CN | 203006242 | U | 6/2013 |
| CN | 103207416 | A | 7/2013 |
| CN | 103300590 | A | 9/2013 |
| CN | 103303618 | A | 9/2013 |
| CN | 204587817 | U | 8/2015 |
| CN | 205169479 | U | 4/2016 |
| CN | 106690938 | A | 5/2017 |
| CN | 107032015 | A | 8/2017 |
| CN | 107495686 | A | 12/2017 |
| CN | 109775193 | A | 5/2019 |
| CN | 305634902 | | 3/2020 |
| CN | 112407663 | A | 2/2021 |
| CN | 307220540 | | 4/2022 |
| CN | 307232793 | | 4/2022 |
| CN | 307264711 | | 4/2022 |
| DE | 1610087 | | 7/1950 |
| DE | 822376 | | 11/1951 |
| DE | 1283741 | | 7/1966 |
| DE | 7503716 | U | 8/1975 |
| DE | 8436939 | | 3/1985 |
| DE | 9108341 | | 10/1991 |
| DE | 4225936 | | 2/1994 |
| DE | 19525885 | | 3/1997 |
| DE | 19617823 | | 11/1997 |
| DE | 19809331 | | 5/1999 |
| DE | 19811991 | A1 | 9/1999 |
| DE | 19824941 | A1 | 12/1999 |
| DE | 29918687 | | 3/2000 |
| DE | 19933180 | | 1/2001 |
| DE | 10036259 | A1 | 11/2001 |
| DE | 10148997 | | 4/2003 |
| DE | 10155943 | A1 | 5/2003 |
| DE | 20305521 | U1 | 6/2003 |
| DE | 20217561 | | 3/2004 |
| DE | 10305311 | A1 | 8/2004 |
| DE | 10337806 | A1 | 3/2005 |
| DE | 202006016420 | U1 | 2/2007 |
| DE | 202004021206 | U1 | 4/2007 |
| EP | 0582240 | | 7/1993 |
| EP | 0903305 | A1 | 3/1999 |
| EP | 0906876 | A2 | 4/1999 |
| EP | 1094017 | A1 | 4/2001 |
| EP | 1162161 | | 12/2001 |
| EP | 1172307 | A1 | 1/2002 |
| EP | 1193690 | A1 | 4/2002 |
| EP | 0957046 | B1 | 8/2003 |
| EP | 1361176 | A1 | 11/2003 |
| EP | 1136393 | B1 | 4/2004 |
| EP | 1447342 | A2 | 8/2004 |
| EP | 1457438 | A1 | 9/2004 |
| EP | 1508537 | A1 | 2/2005 |
| EP | 1600373 | A2 | 11/2005 |
| EP | 1602599 | A2 | 12/2005 |
| EP | 1623937 | A1 | 2/2006 |
| EP | 1647503 | A1 | 4/2006 |
| EP | 1686073 | A1 | 8/2006 |
| EP | 1816090 | A1 | 8/2007 |
| EP | 1918223 | A1 | 5/2008 |
| EP | 1700799 | B1 | 8/2009 |
| EP | 001164826-0001 | | 9/2009 |
| EP | 001232904-0001 | | 10/2010 |
| EP | 2343250 | A1 | 7/2011 |
| EP | 3042864 | A1 | 7/2016 |
| EP | 4292955 | A2 | 12/2023 |
| ES | 1022452 | U | 4/1993 |
| ES | 2253079 | B1 | 6/2004 |
| FR | 2887152 | | 12/2006 |
| GB | 191004921 | | 6/1910 |
| GB | 968738 | A | 9/1964 |
| GB | 1555543 | A | 11/1979 |
| GB | 2046694 | A | 11/1980 |
| GB | 2384418 | | 7/2003 |
| GB | 2559346 | A | 8/2018 |
| JP | 02-152670 | | 6/1990 |
| JP | H06-56011 | | 8/1994 |
| JP | 06-272888 | | 9/1994 |
| JP | 2004-106713 | | 4/2004 |
| JP | 2004-231237 | | 8/2004 |
| JP | D1300450 | | 5/2007 |
| JP | D1300451 | | 5/2007 |
| JP | 2007-154831 | A | 6/2007 |
| JP | D1322056 | | 2/2008 |
| JP | D1398668 | | 10/2010 |
| JP | 2013-231413 | A | 11/2013 |
| JP | 2014-523329 | A | 9/2014 |
| JP | 2020-143829 | A | 9/2020 |
| KR | 20040087306 | A | 10/2004 |
| KR | 3003841370000 | | 6/2005 |
| KR | 3004095430000 | | 3/2006 |
| KR | 3004095430001 | | 7/2006 |
| NL | 6908550 | | 12/1970 |
| NL | 1005057 | C2 | 7/1998 |
| TW | 183920 | | 5/1992 |
| TW | 230977 | | 9/1994 |
| TW | 395392 | | 6/2000 |
| TW | D112733 | | 9/2006 |
| TW | D129485 | | 7/2009 |
| TW | D133382 | | 2/2010 |
| TW | D133678 | | 3/2010 |
| TW | 145989 | | 3/2012 |
| TW | D162495 | | 8/2014 |
| TW | 201720729 | | 6/2017 |
| WO | WO 92/02430 | A1 | 2/1992 |
| WO | WO 96/33671 | | 10/1996 |
| WO | WO 2005/080232 | A1 | 9/2005 |
| WO | WO 2005/097329 | A1 | 10/2005 |
| WO | WO 2006/079263 | A1 | 8/2006 |
| WO | WO 2007/139570 | | 12/2007 |
| WO | WO 2009/114495 | A1 | 9/2009 |
| WO | WO 2015/134902 | A1 | 9/2015 |
| WO | WO 2015/138625 | A1 | 9/2015 |
| WO | WO 2016/054109 | A1 | 4/2016 |
| WO | WO 2016/133407 | A1 | 8/2016 |
| WO | WO 2021/180516 | A1 | 9/2021 |
| WO | WO 2023/064221 | A1 | 4/2023 |
| WO | WO 2023/215375 | A1 | 11/2023 |

OTHER PUBLICATIONS

Volume Distributors, Inc.'s Preliminary Proposed Claim Constructions and Identification of Extrinsic Evidence Pursuant to S.P.R. 3.2, Demand for Jury Trial, *Simplehuman, LLC* v. *Volume Distributors, Inc.*, Civil Action No. 2:23-cv-2219, Feb. 12, 2024, in 103 pages.

Simplehuman, LLC's Complaint against Defendant Volume Distributors, Inc.'s, Civil Action No. 2:23-cv-2219, Mar. 24, 2023, in 87 pages.

Volume Distributors, Inc.'s Answer to Complaint of Simplehuman, LLC, Civil Action No. 2:23-cv-2219, May 26, 2023, in 9 pages.

Volume Distributors, Inc.'s Invalidity Contentions, *Simplehuman, LLC* v. *Volume Distributors, Inc.*, Civil Action No. 2:23-cv-2219, Jul. 28, 2023, in 15 pages.

Trento Corner 23 Trash Can, Hailo product webpage, May 2008, http://www.hailo.de/html/default.asp?site=12_71_107&lang=en.

Alzashop.com, Simplehuman 45L Pedal Rectangular White Plastic Stainless Steel Trash Can, https://www.alzashop.com/simplehuman-45l-pedal-rectangular-white-plastic-stainless-steel-d5841987.htm, site visited Jul. 20, 2021, in 3 pages.

(56) References Cited

OTHER PUBLICATIONS

Simplehuman Liner Rim Dual Bucket Rectangular Recycler with Liner Pocket, Stainless Steel, 58 Liter / 15 Gallon, Item No. CW2025, www.Amazon.com, site visited Dec. 29, 2015.
Web page showing picture of Hero Bullet trash can, archived Nov. 17, 2004, downloaded from http://web.archive.org/web/20041117003115/http://www.simplehuman.com/images/hero_bullet.jpg.
Youtube.com, "Automatic trash can pull out cabinet with Arduino (DIY)", dated Oct. 9, 2019, https://www.youtube.com/watch?v=mmcgTaE45_Y, entire video, including screenshot in 1 page.
Youtube.com, "trash pullout with servo drive installed", dated Jun. 17, 2011, https://www.youtube.com/watch?v=tO1SbtllEh8, entire video, including screenshots in 3 pages.
Kohler 6-Liter step trash can, Amazon.com Listing and Kohler.com Listing, including Customer Review dated Feb. 17, 2021, in 15 pages.
Simplehuman, LLC, photos of a trashcan that was described in a printed publication and/or in public use or on sale in the U.S. more than one year before Mar. 9, 2012, in 8 pages.
Volume Distributors, Inc.'s Preliminary Proposed Claim Constructions and Identification of Extrinsic Evidence Pursuant to S.P.R. 3.2, Demand for Jury Trial, *Simplehuman, LLC* v. *Volume Distributors, Inc.*, Civil Action No. 2:23-cv-2219, Aug. 25, 2023, in 7 pages.
Simplehuman, LLC's Proposed Construction for Identified Patent Claim Terms, *Simplehuman, LLC* v. *Volume Distributors, Inc.*, Civil Action No. 2:23-cv-2219, Aug. 25, 2023, in 8 pages.
Volume Distributors, Inc.'s Amended Invalidity Contentions (with Exhibits A1-A4 and B1-B3), *Simplehuman, LLC* v. *Volume Distributors, Inc.*, Civil Action No. 2:23-cv-2219, Sep. 12, 2023, in 527 pages.
Order re Claim Construction, *Simplehuman, LLC* v. *Volume Distributors, Inc.*, Civil Action No. 2:23-cv-2219, Dec. 20, 2023, in 28 pages.
Excerpts of Simplehuman, LLC's Responses to Volume Distributors Inc.'s Third Set of Interrogatories (Nos. 16-18), Inc.'s, *Simplehuman, LLC* v. *Volume Distributors, Inc.*, Civil Action No. 2:23-cv-2219, Apr. 11, 2024, in 18 pages.
Simplehuman, LLC's Complaint against Defendant Volume Distributors, Inc., *Simplehuman, LLC* v. *Volume Distributors, Inc.*, Civil Action No. 2:23-cv-09537, Nov. 10, 2023, in 80 pages.
Volume Distributors, Inc.'s Answer to Complaint of Simplehuman, LLC, *Simplehuman, LLC* v. *Volume Distributors, Inc.*, Civil Action No. 2:23-cv-09537, Dec. 20, 2023, in 6 pages.
Simplehuman, LLC's Amended Complaint against Defendant Volume Distributors, Inc., *Simplehuman, LLC* v. *Volume Distributors, Inc.*, Civil Action No. 2:23-cv-09537, Dec. 20, 2023, in 100 pages.
Volume Distributors, Inc.'s Answer to the Amended Complaint of Simplehuman, LLC, *Simplehuman, LLC* v. *Volume Distributors, Inc.*, Civil Action No. 2:23-cv-09537, Jan. 2, 2024, in 7 pages.
Volume Distributors, Inc.'s Petition for Inter Partes Review of U.S. Pat. No. 10,683,165, Case No. IPR2024-00050, Oct. 16, 2023, in 118 pages.
Decision Granting Institution of Inter Partes Review of U.S. Pat. No. 10,683,165, Case No. IPR2024-00050, Apr. 10, 2024, in 42 pages.
Simplehuman, LLC's Complaint against *International Textile & Apparel, Inc., Simplehuman, LLC* v. *International Textile & Apparel, Inc.*, Civil Action No. 2:24-cv-02068, Mar. 13, 2024, in 38 pages.
International Textile & Apparel, Inc.'s Answer to Complaint and Counterclaims, *Simplehuman, LLC* v. *International Textile & Apparel, Inc.*, Civil Action No. 2:24-cv-02068, May 13, 2024, in 22 pages.
International Textile & Apparel, Inc.'s Amended Answer to Complaint and Amended Counterclaims, *Simplehuman, LLC* v. *International Textile & Apparel, Inc.*, Civil Action No. 2:24-cv-02068, Jun. 3, 2024, in 23 pages.
Simplehuman Stainless Steel Semi Round Trash Bin, date first available Aug. 6, 2012, www.amazon.ae/Simplehuman-Stainless-Steel-Silver-Liters-CW1833/dp/B001BO76WY/, 6 pages.

* cited by examiner

TRASH CAN ASSEMBLY

RELATED APPLICATIONS

This application is a divisional of U.S. patent application Ser. No. 16/284,996, filed Feb. 25, 2019, now U.S. Pat. No. 11,801,996, which is a divisional of U.S. patent application Ser. No. 14/637,270, filed Mar. 3, 2015, now U.S. Pat. No. 10,279,997, which claims the priority benefit of U.S. Provisional Patent Application No. 61/953,485, filed on Mar. 14, 2014, and U.S. Provisional Patent Application No. 61/983,305, filed on Apr. 23, 2014. The entire contents of each of the aforementioned applications is hereby incorporated by reference herein for all that they disclose.

BACKGROUND

Field

The present disclosure is generally related to containers, such as trash can assemblies.

Description of the Related Art

Receptacles and other devices having lids or doors are used in a variety of different settings, such as for containing refuse or for storing items such as recyclables, dirty laundry, pet food, etc. For example, in both residential and commercial settings, trash cans and other receptacles often have lids or doors for protecting or preventing the escape of the contents of the receptacle. The lid or door can also inhibit or prevent odors from escaping and can hide the items within the receptacle from view. Additionally, the lid of a trash receptacle can help prevent contamination from escaping from the receptacle.

However, existing receptacles with lids, such as trash receptacles, can require a large region of upward and rearward clearance to completely open and/or to permit full access to the trash receptacle, which can be inhibited if the receptacle is positioned too close to a rear wall of the room in which it is located. Also, an edge of the lid can strike the rear wall when it opens, and the hinge or pivot region of the lid can repeatedly contact or rub against the rear wall of the room, producing a pattern of wear on the wall and creating a loud and annoying noise, especially when the lid is made of metal.

SUMMARY

In some embodiments, a receptacle, such as a trash receptacle, can comprise a positioner or locating device to assist in locating the receptacle in a position that provides sufficient clearance from one or more nearby objects (e.g., away from a rear wall behind the trash receptacle) to properly open the lid. For example, the positioner or locating device can assist in locating the receptacle in a position that provides sufficient clearance to open the lid to its fullest extent, or substantially to its fullest extent sufficient to provide access to the interior of the receptacle to enable depositing items in or retrieval of items from the receptacle in a manner that is uninhibited by the lid. In some embodiments, the positioner or locating device can assist in locating the receptacle in a position that avoids contact between the opening lid and one or more adjacent structures, such as a wall or other structure positioned behind or around the receptacle.

The positioner or locating device can have many different forms and mechanisms of action. In some examples illustrated and/or described in this specification, which are not limiting, the positioner or locating device can comprise a protruding portion that is attached to and extends away from a region of the receptacle in a direction toward one or more nearby, adjacent, and/or surrounding structures or objects, such as a rear wall behind the receptacle. The positioner or locating device can comprise an end region that is configured to contact or to be positioned adjacent to or near one or more surrounding structures or objects. In some embodiments, the size (e.g., the length and/or width) of the positioner or locating device can be sufficient, when the end region contacts or is positioned adjacent to or near one or more surrounding structures or objects, to locate the body of the receptacle in a position where the receptacle has sufficient peripheral clearance that the opening lid, hinge, and/or pivoting region is configured to not contact or not interfere with one or more surrounding structures or objects, such as a rear wall behind the receptacle.

As illustrated, in some examples, the positioner or locating device can comprise a contacting region that is disposed on and/or in the end region and that is configured to avoid or resist creating noise or creating damage to another structure or object when the contacting region contacts another structure or object. For example, the contacting region can comprise a surface that is soft, resilient, flexible, low-durometer, smooth, curved, and/or scuff-resistant, etc. In some embodiments, as illustrated, the shape and/or size of the contacting region can be configured to spread contact pressure over a region that is longer than the overall side-to-side length of the contacting region, such as by providing one or more curves, bends, and/or junctures in the contacting region where the contacting region changes direction.

In some embodiments, the positioner or locating device can be configured into a plurality of orientations and/or stages. For example, as illustrated, the positioner or locating device can comprise a first retracted or stowed stage and a second extended or deployed stage. In the first stage, the positioner or locating device can be retracted or stowed such that the periphery or profile of the region of the receptacle on which the positioner or locating device is disposed is smaller than in the second stage. In some embodiments, in the first stage, the positioner or locating device is positioned such that a majority of its length and/or width extends along a side of the receptacle, and/or such that a majority of its length and/or width is retracted or positioned inside of a portion of the receptacle, and/or such that a majority of its length and/or width is compacted, such as by telescoping or nesting or folding on itself. In some embodiments, the positioner or locating device can be flush or recessed within a portion of the wall of the receptacle in the first stage. The first stage can be an especially useful configuration when the receptacle is being shipped or stored, or when it is not desired for the positioner or locating device to be used, such as when the receptacle is located in a very small or tight location that may not permit the increased profile or size of the receptacle when the positioner or locating device is in the second stage. In some examples, the positioner or locating device can move between the first and second stages by pivoting, sliding, rotating, or otherwise moving.

In the second stage, the positioner or locating device can be extended or deployed such that the periphery or profile of the region of the receptacle on which the positioned or locating device is disposed is larger than in the first stage, such that a majority of its length and/or width extends away from and does not contact a side of the receptacle, and/or a majority of its length and/or width is outside or spaced from the receptacle, and/or a majority of its length and/or width is expanded or increased as compared to the first stage.

In the first and/or second stages, the positioner or locating device can comprise a locked, secured, and/or temporarily fixed position in which the force required to move the positioner or locating device is greater than in one or more other positions. For example, in the second stage, when the positioner or locating device is positioned so as to locate the receptacle a desire distance from a nearby object, such as a wall, the positioner or locating device can be locked, secured, and/or temporarily fixed into place so that the positioner or locating device does not easily or unintentionally move out of the second position (e.g., back to the first position) simply by contacting a nearby object or when accidentally bumped or jostled.

Any of the structures, materials, steps, or other features disclosed above, or disclosed elsewhere herein, can be used in any of the embodiments in this disclosure. Any of the structures, materials, steps, or other features that are shown and/or described herein can be used in combination with any other of the structures, materials, steps, or other features that shown and/or described herein.

BRIEF DESCRIPTION OF THE DRAWINGS

The abovementioned and other features of the embodiments disclosed herein are described below with reference to the drawings of the embodiments. The illustrated embodiments are intended to illustrate, but not to limit the embodiments. Various features of the different disclosed embodiments can be combined to form further embodiments, which are part of this disclosure.

DETAILED DESCRIPTION

Figure 1:
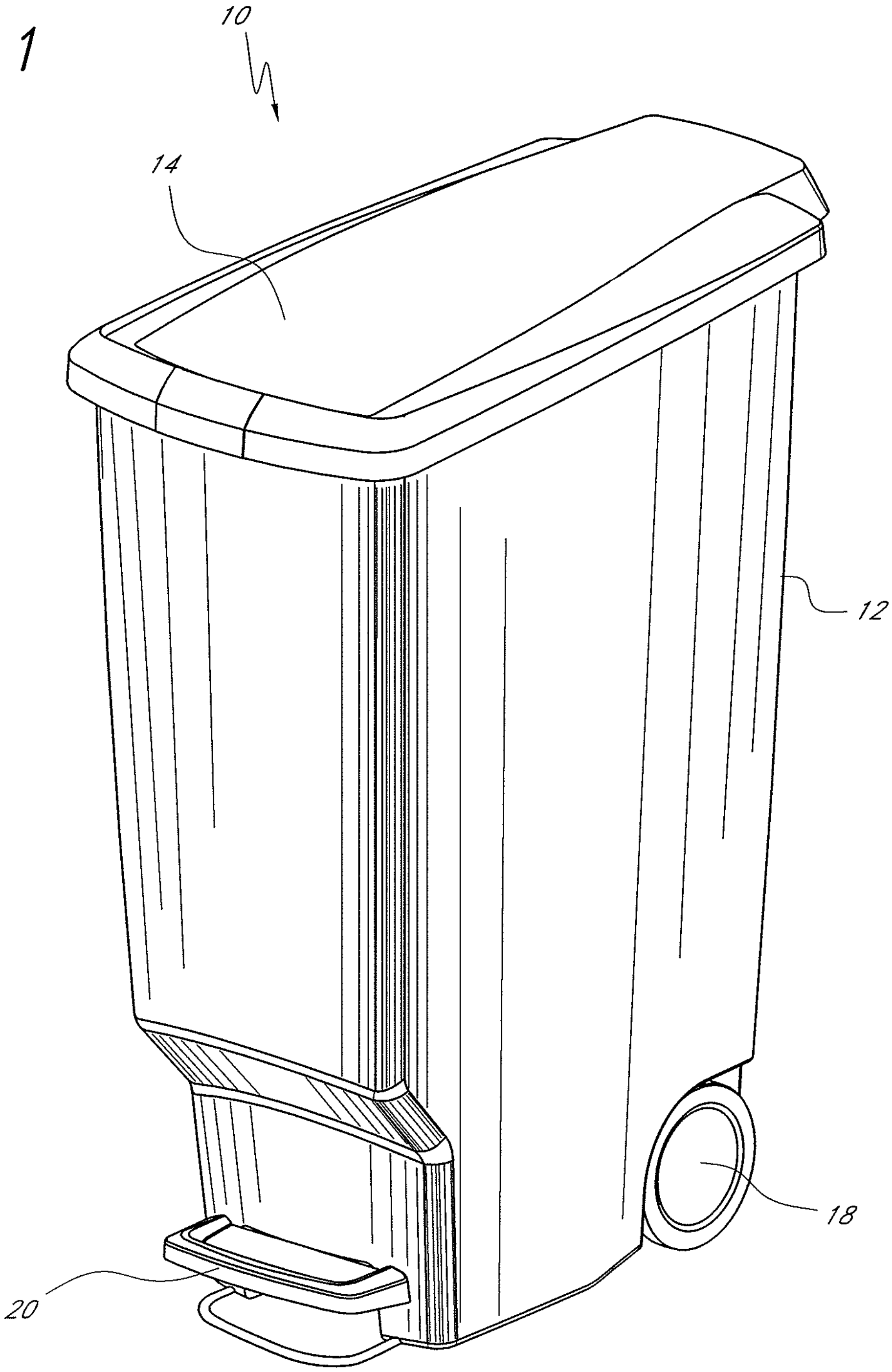
FIG. 1 illustrates a right perspective view of a step trash can in accordance with an embodiment.
Figure 2:
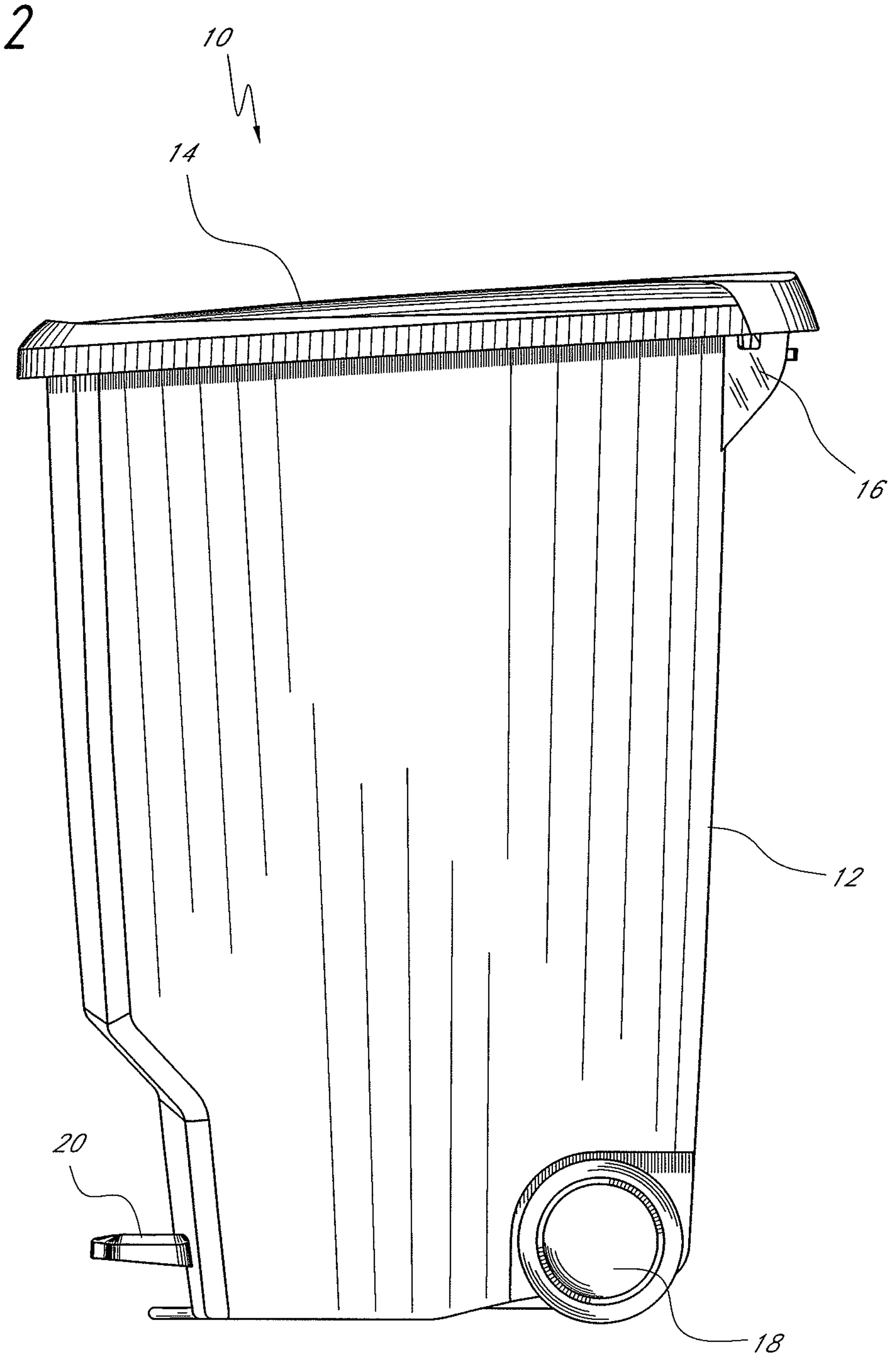
FIG. 2 illustrates a right side view thereof.
Figure 3:
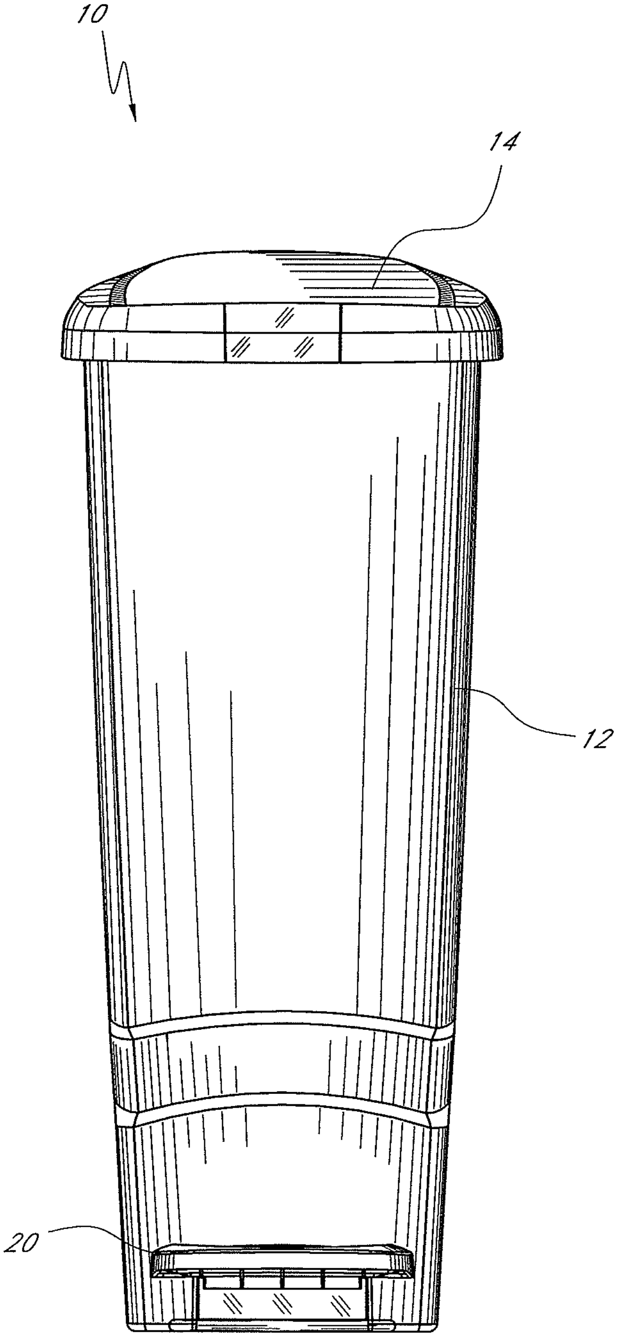
FIG. 3 illustrates a front view thereof.

The embodiments disclosed herein are disclosed in the context of trash can assemblies (also called trash cans, garbage bins, refuse containers, or otherwise) because they have particular utility in this context. However, the inventions disclosed herein can be used in other contexts as well, such as in any other type of receptacle. Further, the inventions are described herein in reference to various embodiments and drawings. It will be appreciated by those skilled in the art that variations and improvements may be accomplished in view of these teachings without deviating from the scope and spirit of the invention. By way of illustration, the many features are described in reference to a step-type trash container, such as a step trash can of the kind typically used in kitchens. Other types of trash containers, such as with side-pivoting lids or removable lids, can be used in connection with the present inventions.

FIGS. 1-7 illustrate the external views of an embodiment of a step trash can 10. The step trash can 10 can generally have a body 12 and a lid 14 pivotally supported relative to the body. For example, the lid 14 can be hinged to the rear top edge of the body 12, by a hinge 16 shown in FIG. 2. One or more wheels 18 can be provided to facilitate moving the step trash can 10 along a rolling surface.

A lid actuator system (also referred to as an opening mechanism) can be provided at the rear of the step trash can 10. The lid actuator system can be configured to activate pivotal opening of the lid 14 (see FIG. 5). In some embodiments, the lid actuator system includes a foot piece, such as a pedal 20, located near the front base of the body 12. Linkages 22, 24 (see FIGS. 5 and 7), which can include a lever member and lifting rod, can cooperate to move the lid to 14 from a closed to an open position. Certain aspects of the linkages 22, 24 are described in greater detail below.

The lid 14 can include a lid latch 30. The latch 30 can engage onto the edge of the trash container body to lock the lid to the edge of the opening of the body, thus securely covering the opening. The latch 30 can be integrated into, built into, or self-contained in the lid (as opposed to a separate external locking piece for the lid). In some embodiments, the latch 30 can be configured to slide with respect to the edge of the opening of the body from an unlocked position to a locked position. The sliding support interface between the latch and the lid can be provided with structures (e.g., indent and complementary locking tabs) that positively index the latch in the locked and unlocked positions.

Figure 9A:
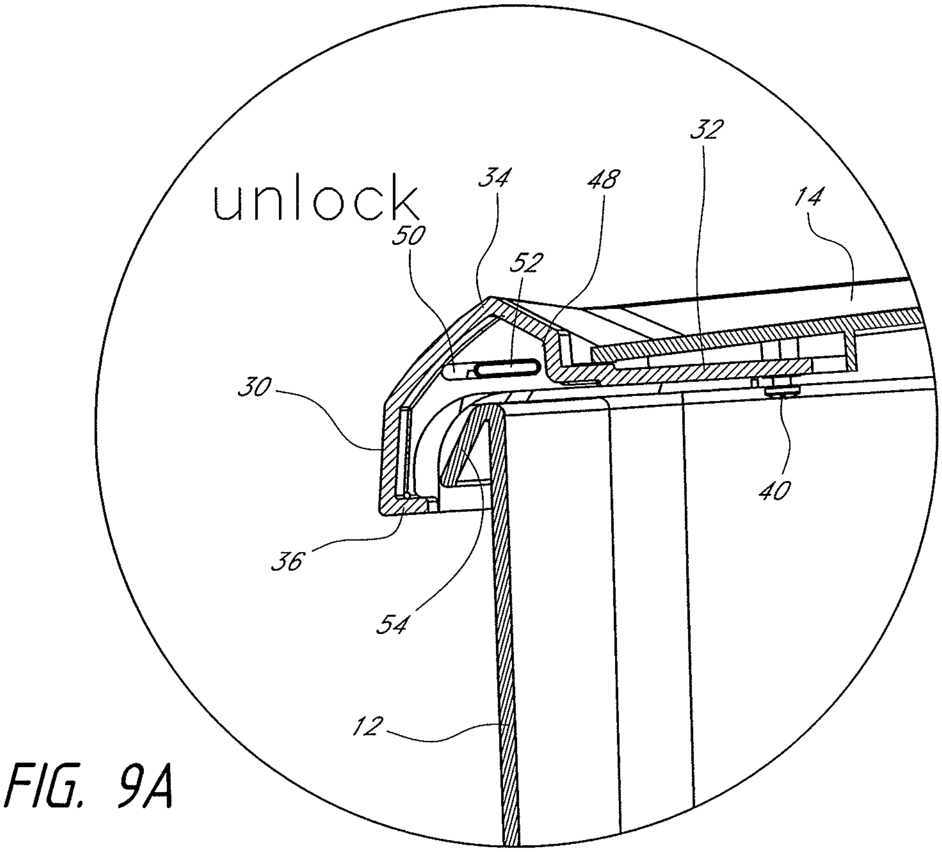
FIG. 9A illustrates a detailed sectional view of the step trash can taken along line 9A-9A in FIG. 9B with the lid latch in the unlock position.
Figure 9B:
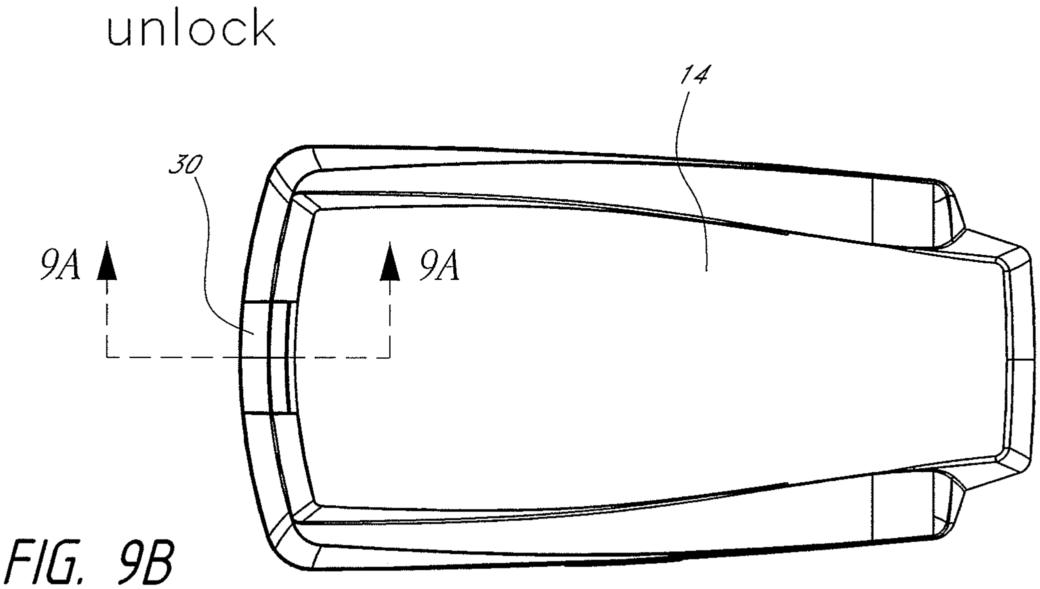
FIG. 9B is a top view of the lid with the latch in the unlock position.
Figure 10A:
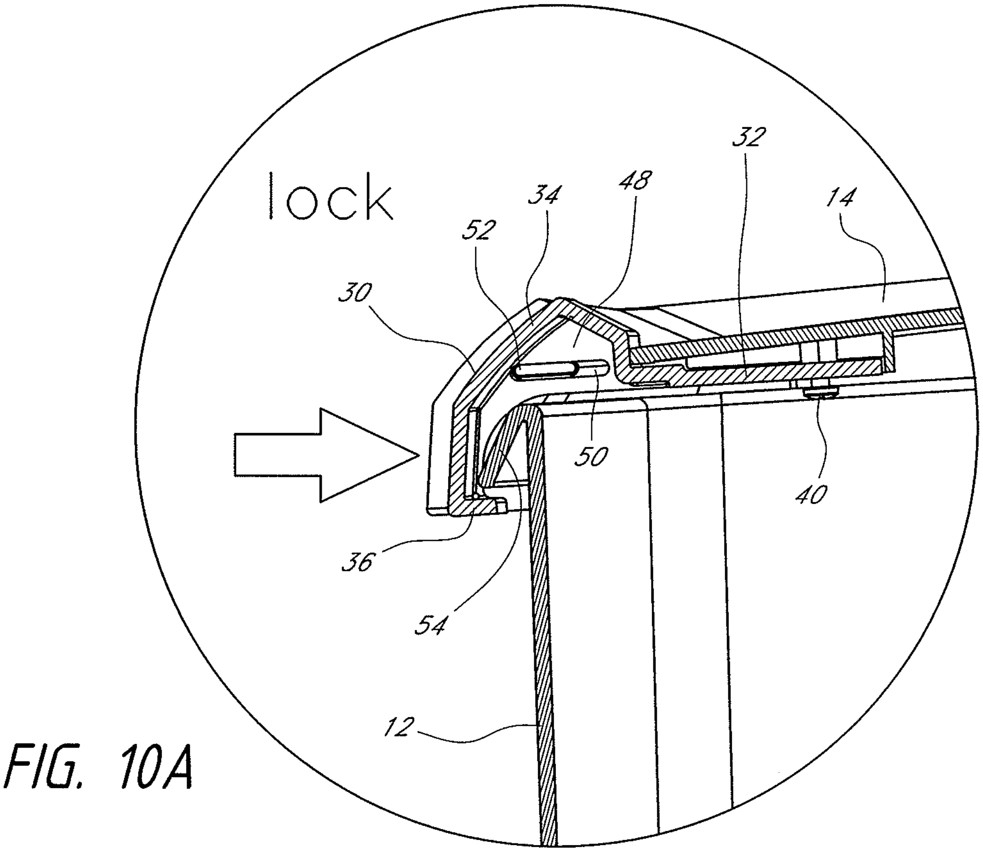
FIG. 10A illustrates a top view of the step trash can taken along line 10A-10A in FIG. 10B, with the lid latch in the lock position.
Figure 10B:
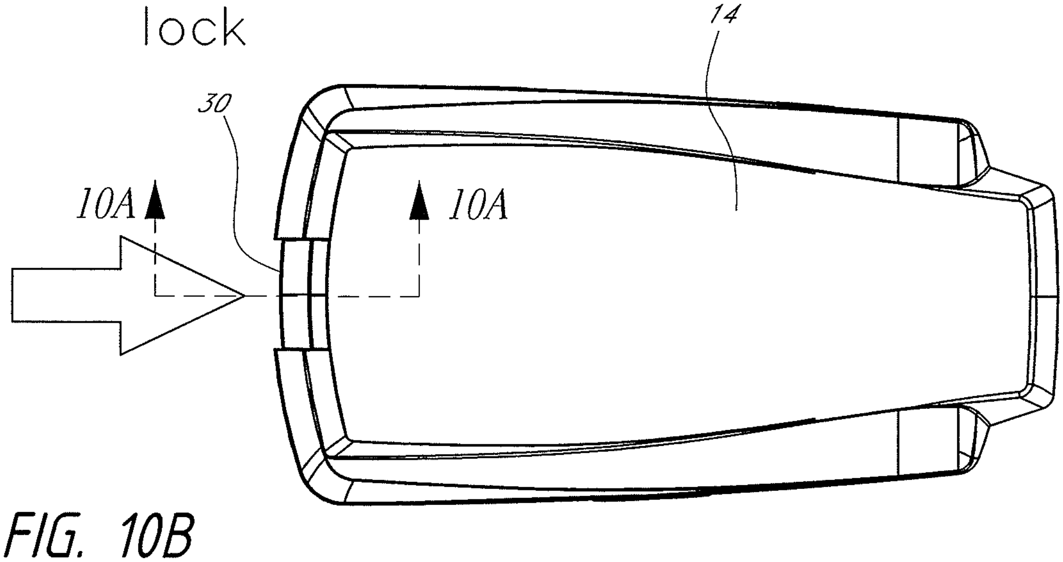
FIG. 10B is a top view of the lid with the latch in the lock position.
Figure 11:
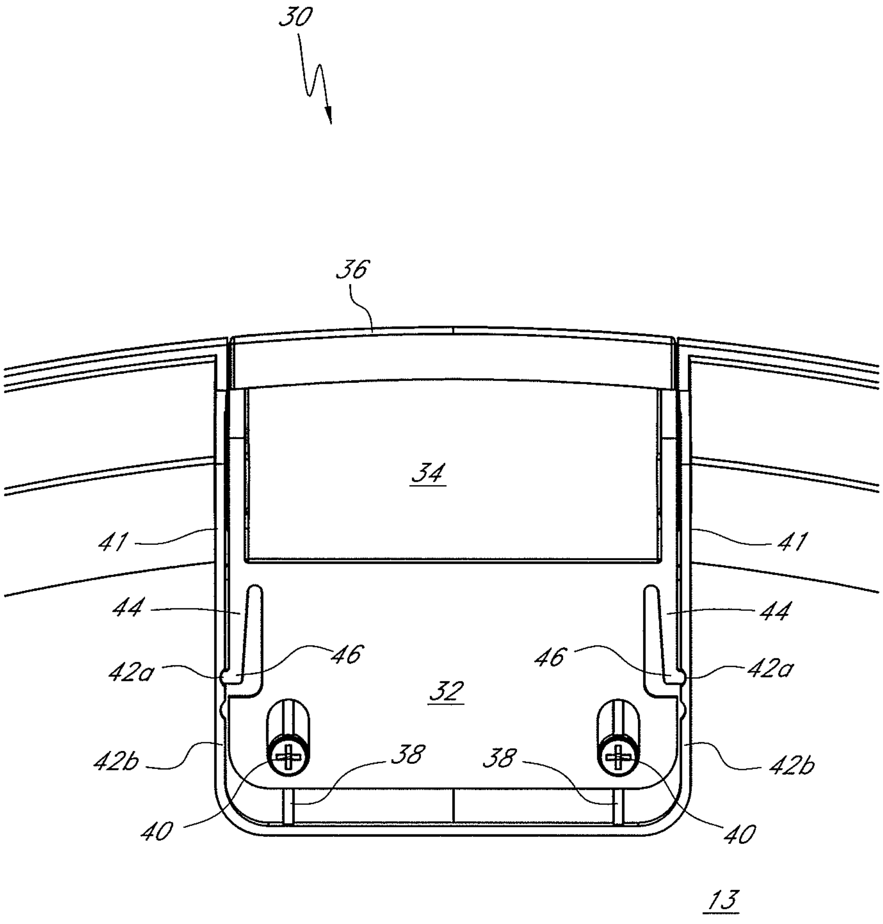
FIG. 11 illustrates a plan view of the underside of the lid with the latch in the unlock position.
Figure 12:
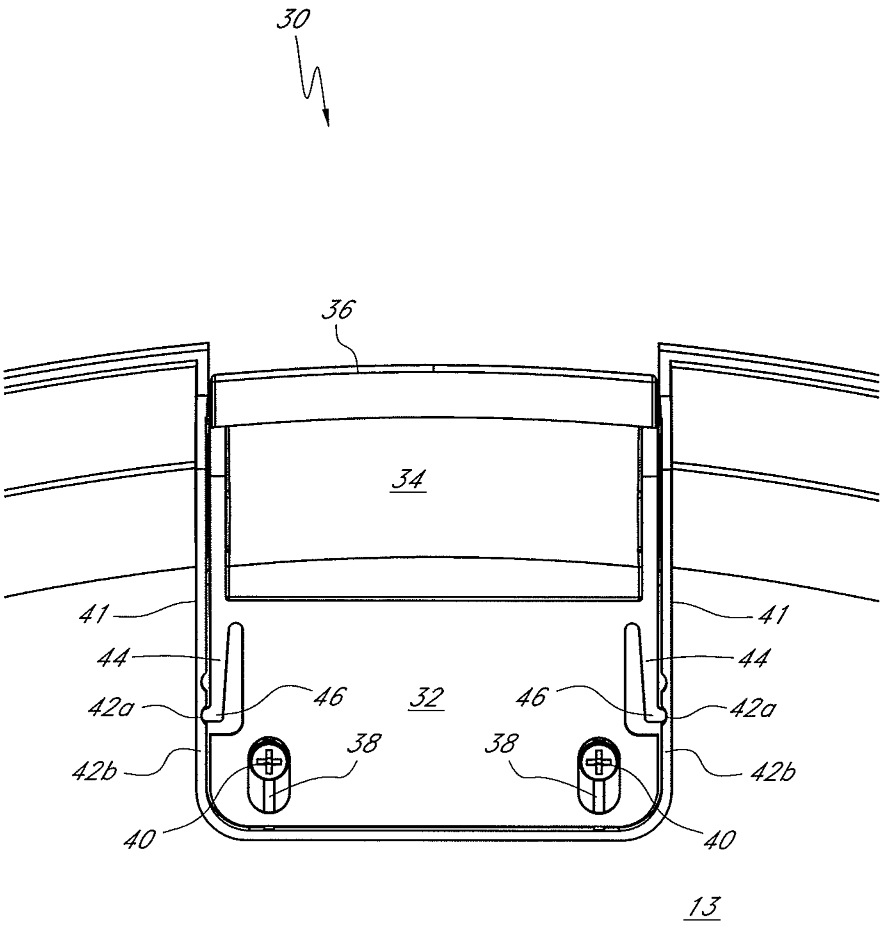
FIG. 12 illustrates a plan view of the underside of the lid with the latch in the lock position.
Figure 13:
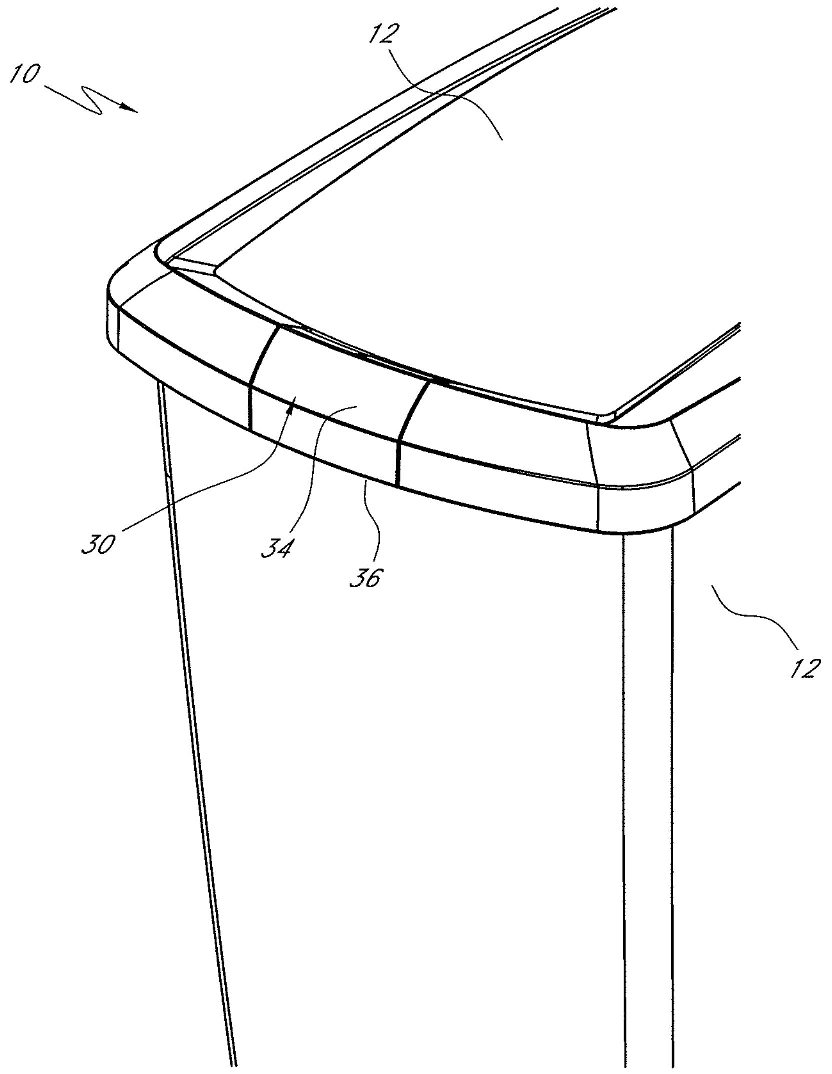
FIG. 13 illustrates a top perspective view of the lid with the latch in the unlock position.
Figure 14:
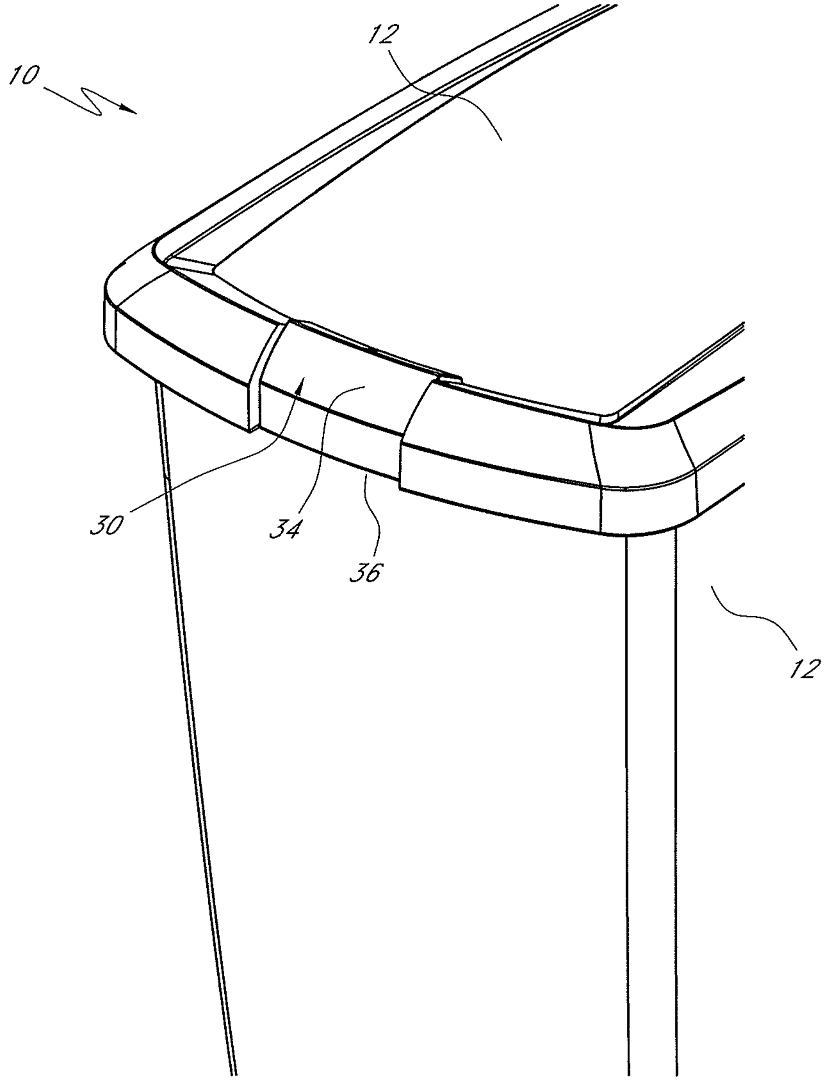
FIG. 14 illustrates a top perspective view of the lid with the latch in the lock position.
Figure 15:
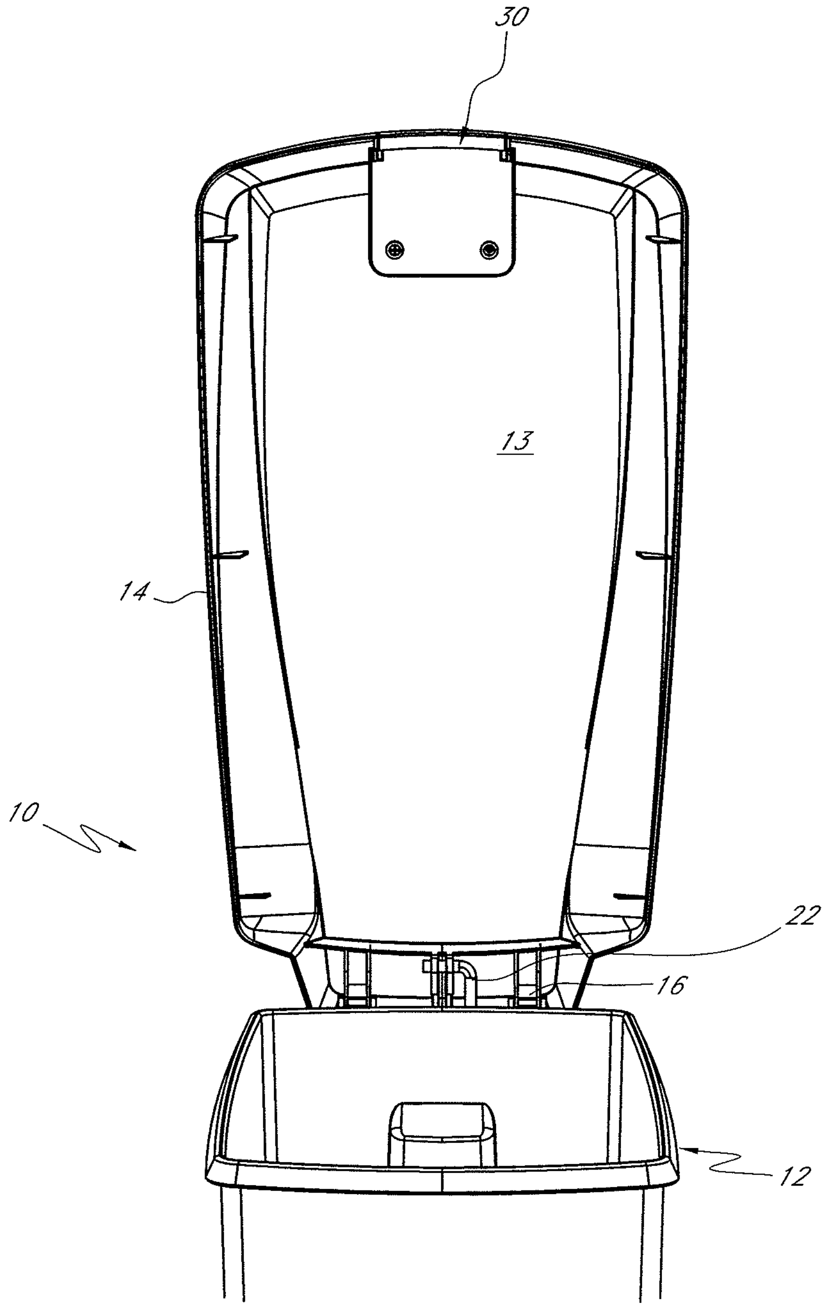
FIG. 15 illustrates a front perspective view of the step trash can with the lid open, showing the underside of the lid with the latch in the unlock position.
Figure 16:
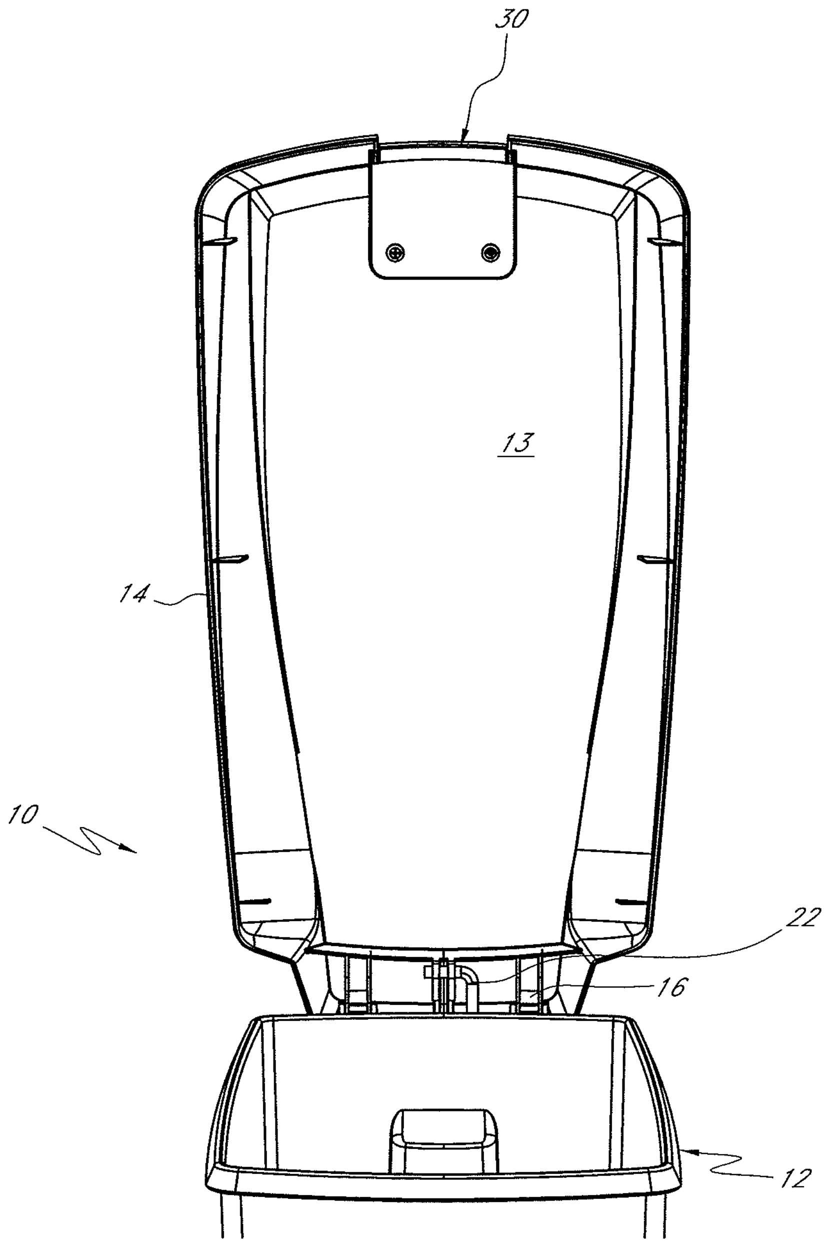
FIG. 16 illustrates a front perspective view of the step trash can with the lid open, showing the underside of the lid with the latch in the lock position.

FIGS. 9-17 illustrate various features of the lid 14, the latch 30, and other components of the trash can 10. FIGS. 9, 11, 13 and 15 illustrate the lid latch mechanism 30 in an opened/unlock position. FIGS. 10, 12, 14 and 16 illustrate the lid latch mechanism 30 in a closed/lock position. FIGS. 15 and 16 illustrate the lid 14 opened from the body 12, showing the underside 13 of the lid 14. FIGS. 11 and 12 illustrate in greater detail the sliding movements of the latch 30 with respect to the lid 14. FIGS. 13 and 14 illustrate the top perspective view of the latch 30 with respect to the lid 14. FIGS. 9 and 10 illustrate the sliding movements of the latch 30 with respect to the body 12.

The latch 30 can comprise a plate section 32, a bent section 34, and a lip 36. The bent section 34 can be exposed externally, as illustrated in FIG. 13, and can have a profile that is flush with the profile of the adjacent structure of the lid 12, thereby providing an aesthetically pleasing and appealing structure. The plate section 32 can be provided with slotted holes 38. The plate section 32 can be slidably attached to the underside 13 of the lid 14 near the front edge thereof, by two retaining screws 40 anchored to the underside 13 of the lid 14.

The slotted hole 38 can be sized to allow the screws 40 to slide relatively within the slotted holes 38, thereby allowing the plate section 32 to slide relative to the edge of the lid 14, from the opened/unlock position shown in FIG. 11 to the closed/lock position shown in FIG. 12. Further, at the sides 48 of the bent section 34 of the latch 30 (see FIGS. 9A and 10A), slotted holes 50 can be provided to receive a stub 52 anchored at the adjacent section of the lid 14. The slotted holes 50 can be sized to allow the stub 52 to slide relatively within the slotted holes 50, thereby further supporting sliding movement of the latch 30 (e.g., the sides 48 of the bent section 34 of the latch 30 to slide relative to the lid 14, from the opened/unlock position shown in FIG. 9A to the closed/lock position shown in FIG. 10A.

Detents 42*a* and 42*b* can be provided on the edges 41 at the front section of the lid 14. The plate section 32 of the latch 30 has at each side, extending spring tabs 44 that are biased outward away from the plate section 32. The tabs 44 can be provided with a detent with a rounded tip 46 that protrudes and can be received in the indentations 42*a* or 42*b*.

As the plate section 32 slides from an opened/unlock position to a closed/lock position, the tip 46 moves from a lodged position in indentation 42*a* as shown in FIG. 11, to be lodged in indentation 42*b* as shown in FIG. 12, thereby indexing the latch 30 from one position to another. The spring bias in the tab 44 is configured such that sufficient force is applied to lodge the tip 46 in the indentations 42*a* and 42*b* at the respective positions, to securely hold the latch 30 in place at the respective positions.

The periphery of the opening of the body 12 can have an outwardly extending flange or ledge 54. In the opened/unlock position shown in FIG. 9A, the lip 36 of the latch 30 is released (i.e., does not catch) from the ledge 54, allowing the lid 14 to be opened with respect to the body 12. In the closed/locked position shown in FIG. 10A, the lip 36 of the latch 30 is latched onto (i.e., catches) the ledge 54, thereby locking the lid 14 against the body 12. In some embodiments, the ledge 54 is formed from an upper portion of the side wall of the body 12. The upper portion can extend upwardly and/or outwardly away from the internal cavity of the body 12. Additionally, stiffening ribs (not shown) can extend between the ledge 54 and the outer surface of the body 12 to enhance the stiffness of the ledge 54.

While the above described embodiments are directed to deployment of the inventive latch in a step-type trash container having a pivoted lid, it is understood that the inventive latch can be used in a trash container that has a lid that is not attached to the container body, such as a lid that is removed or separated from the container body when opening the lid.

Certain embodiments of the trash can 10 include a damping mechanism 60 configured to dampen the movement of the lid 14. In some embodiments, the damping mechanism 60 can be disposed at an end of the lever member 24 connecting the pedal 20 with the linkage 22. In some embodiments, the linkage 22 can be a lifting rod. The lifting rod 22 can be connected to an end of the lever member 24 that is opposite the pedal 20. As such, when a user depresses the pedal 20, the lever member 24 pivots about a pivot member 62, thereby causing the lifting rod 22 to rise and thereby open the lid 14.

Figure 5:
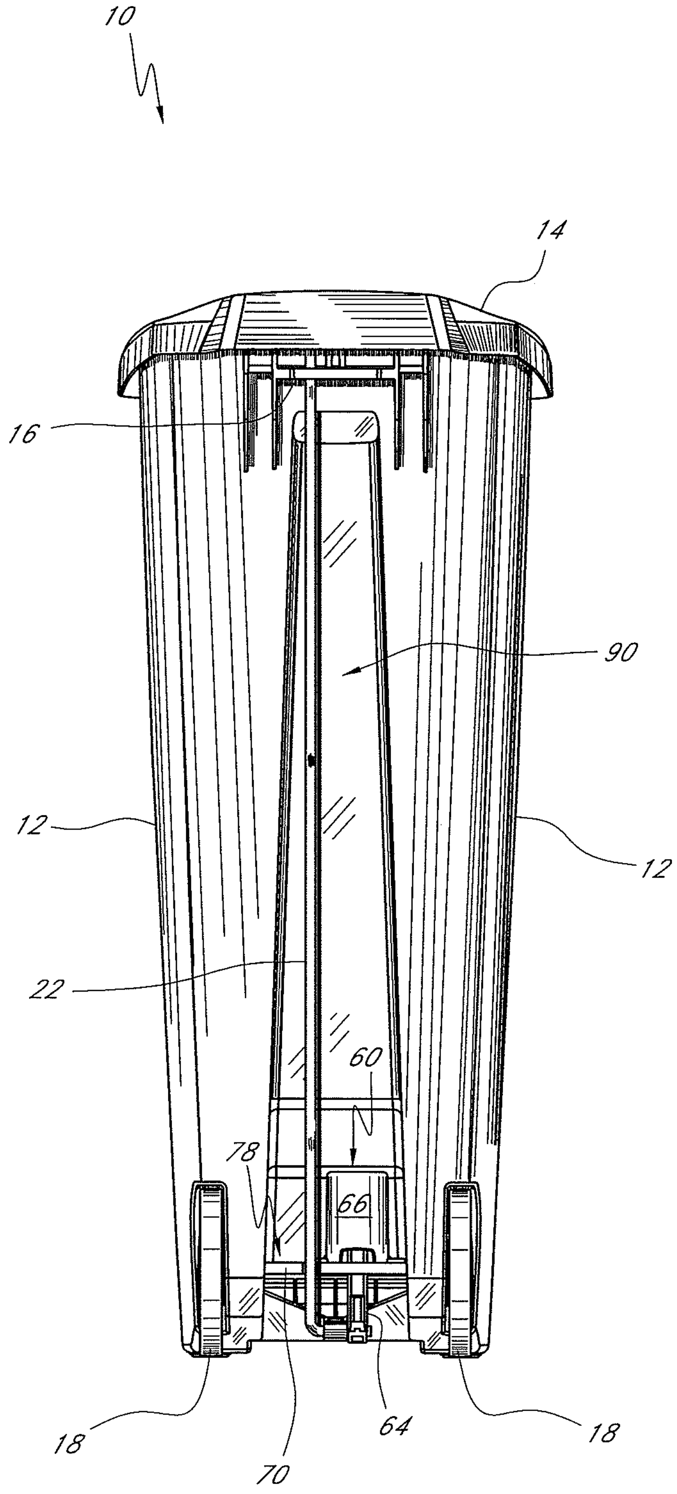
FIG. 5 illustrates a rear view thereof.
Figure 6:
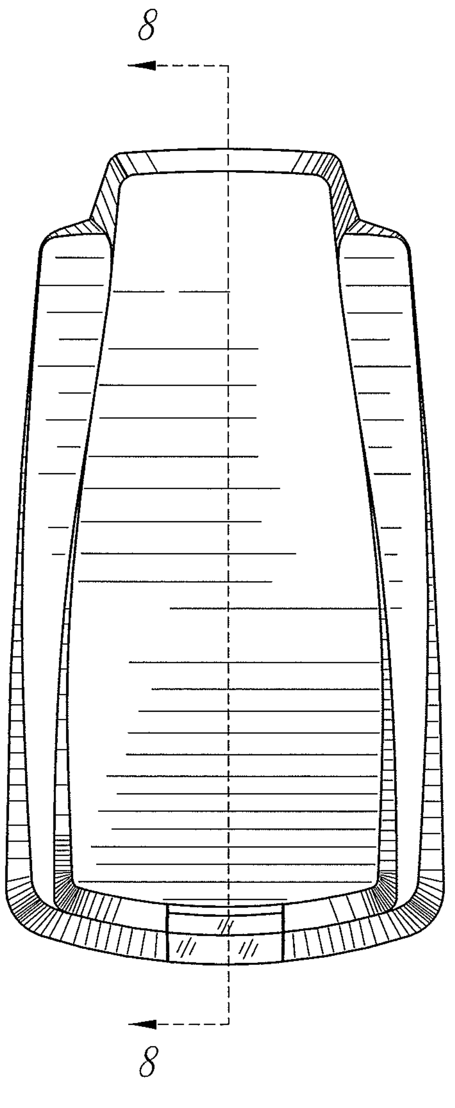
FIG. 6 illustrates a top plan view thereof.
Figure 17:
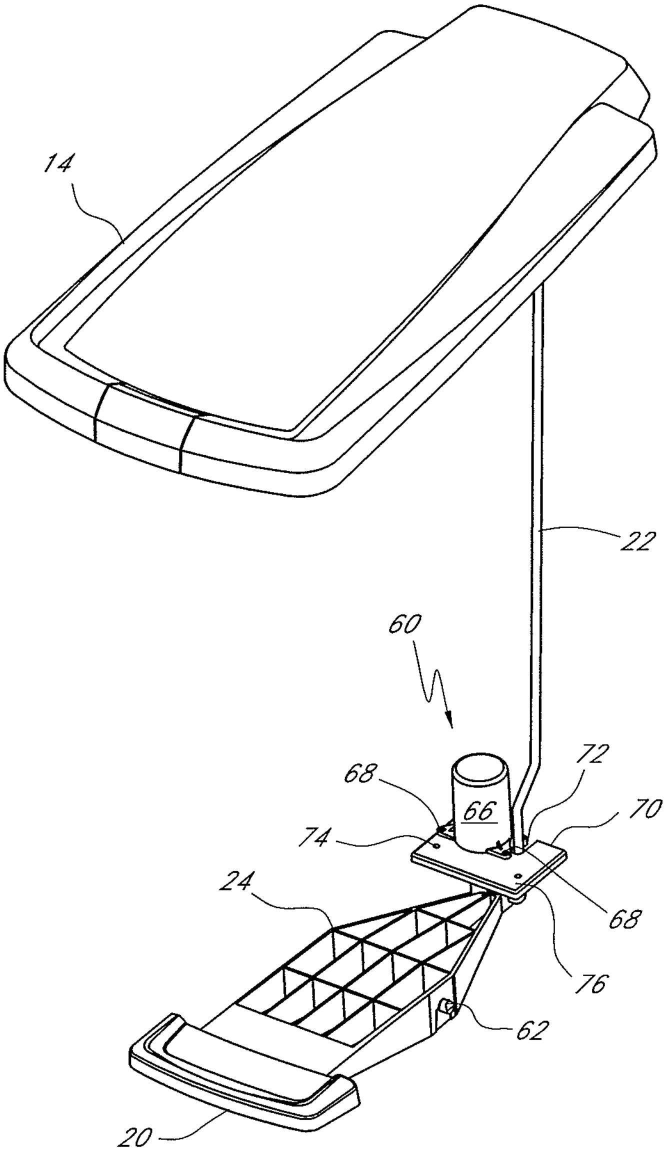
FIG. 17 illustrates another right perspective view of the trash can, with the body and wheels removed.
Figure 18:
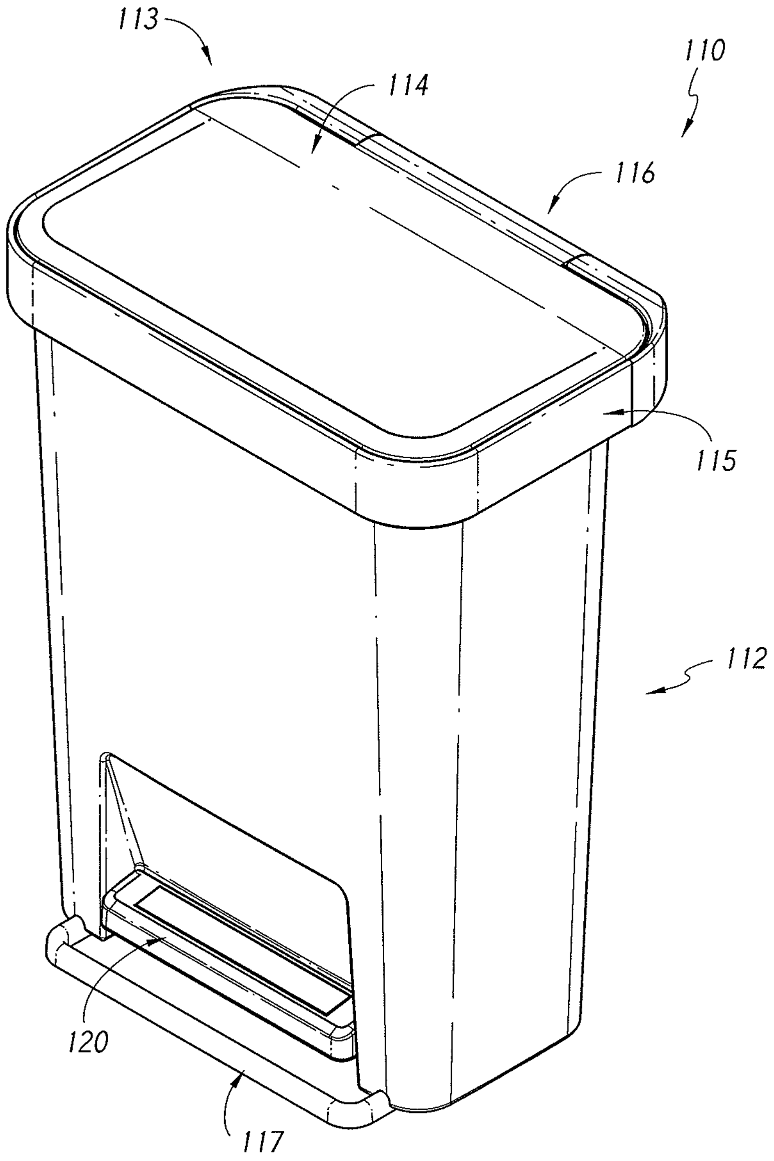
FIG. 18 illustrates a front top perspective view of another embodiment of a trash can.

As shown in FIGS. 5 and 17, the damping mechanism 60 can have a piston rod portion 64 and a cylinder portion 66. The construction and operation of this type of damping mechanism is disclosed in U.S. Patent Publication No. 2007/0012699 which is hereby incorporated by reference. Thus, a detailed description of the damping mechanism 60 is not included herein.

In some embodiments, the lower end of the piston rod 64 is connected to the end of the lever member 24 that is opposite the pedal 20. In other embodiments, the lower end of the piston rod 64 is connected to an end of the lifting rod 22. As such, when a user steps on the pedal 20, the end of the lever member 24 connected to the lifting rod 22 rises, thereby opening the lid by raising the lifting rod 22, and causing the piston rod 64 to rise, thereby moving the piston within the cylinder portion 66. As such, the damping mechanism provides resistance to the upward movement of the lifting rod 22. The damping mechanism 60 can dampen the movement of the lid toward the closed position by slowing the downward movement of the lifting rod 22. Due to the damping provided by the damping mechanism 60, the damping mechanism 60 itself can experience significant loads. Thus, in various embodiments, the cylinder portion 66 is supported by the body 12. For example, the cylinder portion 66 can include one or more flanges 68 that secure the cylinder portion 66 in a fixed position relative to the body 12.

In certain embodiments, the trash can body 12 is made from a plastic material. Some embodiments are made of softer and/or more malleable plastics, such as high impact polypropylene. However, if the cylinder portion 66 were attached directly to an embodiment of the body 12 made of those or other relatively soft plastic materials, the cylinder portion 66 may be more likely to move or twist during operation of the trash can 10 (e.g., under the loads generated during operation of the pedal 20 and the closing movement of the lid 14.) This could increase the likelihood of failure due to fatigue.

To reduce or avoid such concerns, the trash can 10 can include a mounting platform 70, which can provide a more secure and reliable attachment of the damping mechanism 60 to the body 12. In some embodiments, the mounting platform 70 can be made from material that is harder than the material used to make the body 12. For example, the mounting platform 70 can be made from Acrylonitrile Butadiene Styrene (ABS) plastic, or other materials. The mounting platform 70 can include an opening 72 such as a groove or an aperture configured to allow the lifting rod 22 to freely move up and down as the user steps on or releases the pedal 20. In certain variants, the cylinder portion 66 can be attached to the mounting platform 70 using the flanges 68 and any type of fastener. The mounting platform 70 can be connected to the body 12 in any known manner. For example, the mounting platform 70 can include apertures 74, 76 through which threaded fasteners can extend to attach the platform 70 to the body 12.

Figure 7:
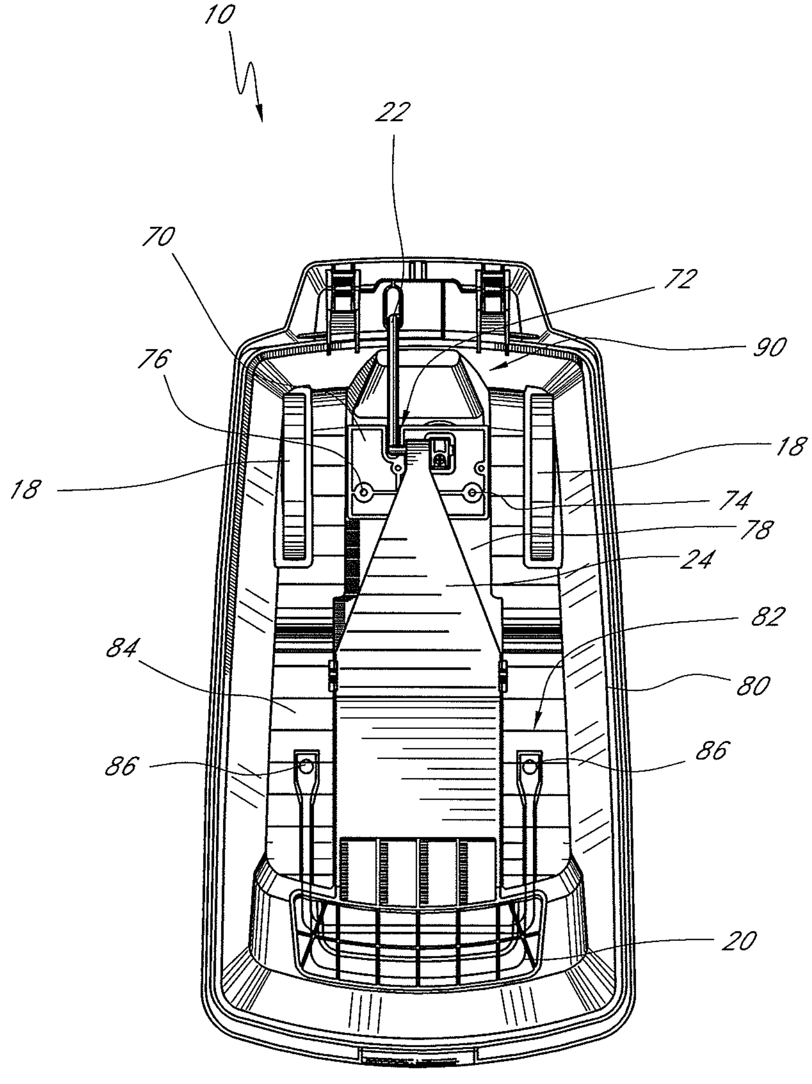
FIG. 7 illustrates a bottom plan view thereof.
Figure 8:
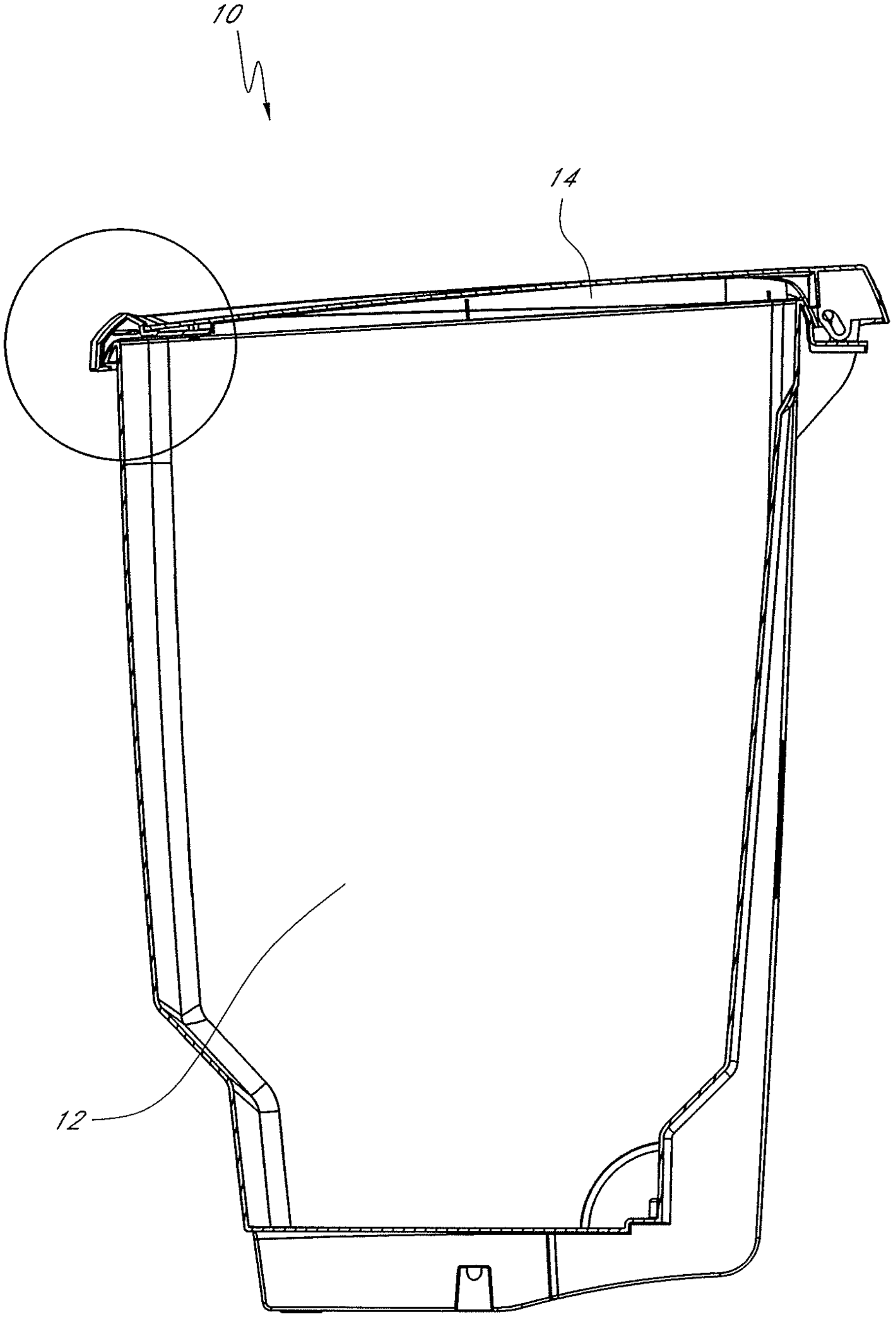
FIG. 8 illustrates a sectional view taken along line 8-8 in FIG. 6.

In some embodiments, the body 12 can include a downwardly facing surface 78 (FIG. 7). The mounting platform 70 can be attached to the downwardly facing surface 78, for example, with fasteners extending through the holes 74, 76. In certain variants, the mounting platform 70 can be glued to the lower surface 78.

With the mounting platform 70 attached to the downwardly facing surface 78, when the pedal 20 is depressed and the lifting rod 22 and the piston rod 64 are raised, substantially all, or all of the associated forces imparted to the mounting platform 70 are transferred to the downwardly facing surface 78 of the body 12. This provides the attachment of the damping member 60 to the body 12 with enhanced strength that can better withstand the forces generated when a user steps on the pedal 20. For example, when a user stomps or otherwise rapidly depresses the pedal 20, the upward movement of the piston rod 64 can be quite fast, and thus can cause significant forces on the mounting member 70.

When the pedal 20 is released, thereby allowing the lid 14 to close, the lifting rod 22 falls along with the piston rod 64. The devices within the cylinder portion 66 slow this movement, which can impart loads onto the plate 70. These loads are transferred to the body 12 through the fasteners and/or any other attachment means for attaching the plate 70 to the body 12. In some embodiments in which the plate 70 is made from a harder material than that used for the body 12, the plate 70 does not deform as much compared to embodiments in which the plate 70 is made from a material that is as hard or is softer than the material used for the body 12. This can facilitate more reliable and/or consistent operation of the damping mechanism 60.

Figure 4:
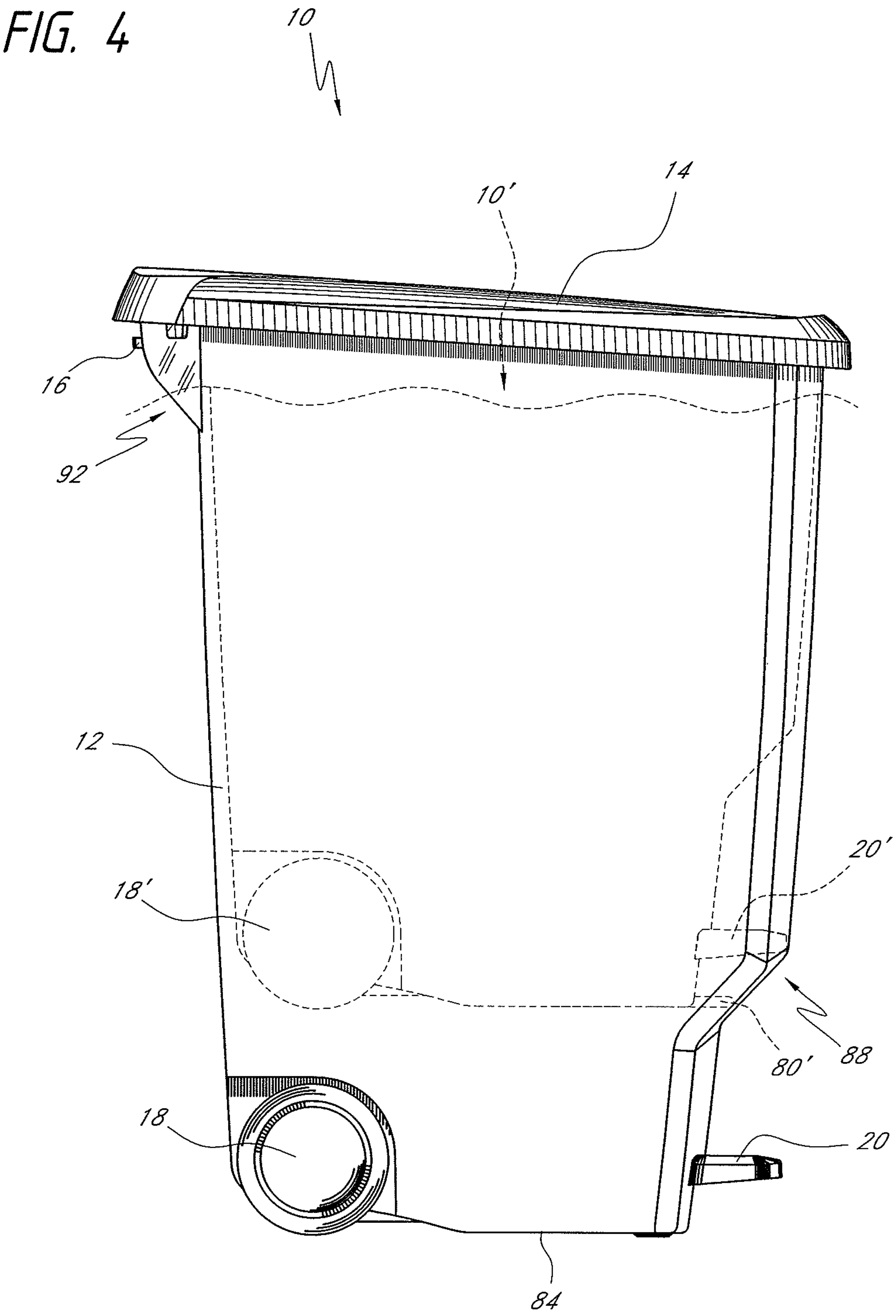
FIG. 4 illustrates a left side view thereof.

In some embodiments, the trash can 10 can be configured to be stackable (e.g., nestable), such as is shown in FIG. 4. For example, the outer surfaces of the trash can body 12 can have a tapered shape (e.g., expanding outwardly and upwardly), such as is shown in the front elevational view of FIG. 3 and the right side elevational view of FIG. 4. In certain such embodiments, with the lid 14 removed, a plurality of the trash can bodies 12 can be stacked one within another. In some variants, such as is shown in FIGS. 5 and 7, a rear surface of the body 12 can include a recessed channel 90 configured to receive the lifting rod 22. This can reduce the profile of the trash can 10 and/or can aid in protecting the lifting rod 22 when the trash can 10 is stacked within another. In some embodiments, the trash can 10 can include a brow portion 88 which extends over the pedal 20. In such embodiments, the interior surface of the brow portion 88, can serve as a resting place for the pedal protector 80' when the trash can 10' is nested within the trash can 10.

Certain embodiments of the trash can 10 are configured such that the features near the bottom of the trash can 10 fall entirely within a footprint of the upper portion of the side wall forming the body 12. For example, in some embodiments, the pedal 20 and the wheels 18, as seen in a bottom plan view, can be positioned entirely within a periphery 80 or outer boundary of an upper portion of the side wall forming the body 12. In some embodiments, when a first trash can 10 is stacked within a second trash can 10, the pedal 20 and the wheels 18 of the first trash can 10 can fit within the cavity of the second trash can 10, and so on.

In some embodiments, the trash can 10 can include a pedal protector 82 (shown in phantom). The pedal protector 82 can be attached to the lower surface 84 of the body 12. In some embodiments, the pedal protector 82 can be fixed to the lower surface 84 with threaded fasteners, such as screws, extending through apertures a six disposed in tens of the protector 82. In some implementations, the protector 82 can be in the form of a generally U-shaped bar. In certain variants, the lower surface 84 can include a recessed channel (not shown) into which the protector 82 can fit. As shown in FIGS. 4 and 7, the protector 82 can be positioned so as to extend under the pedal 20. As such, when one trash can 10' is stacked within another trash can 10, the protector 80' can prevent the pedal 20' from contacting other portions of the interior of the trash can 10.

With reference to FIG. 4, the trash can 10 can include a rear projecting portion 92. The rear projecting portion can also help in protecting the lifting rod 22 when the trash can 10 is stacked within another. For example, the projecting portion 92, when the trash can 10 is stacked within another, will contact the upper peripheral edge of the body of another trash can, thereby preventing any portion of the lifting rod 22 from contacting the upper peripheral edge of another trash can.

FIGS. 18-32 illustrate certain embodiments of another trash can 110. In many respects, the trash can 110 resembles or is identical to the trash can 10 discussed above. As such, several numerals used to identify features of the trash can 110 are incremented by a factor of one hundred relative to the numerals used in connection with the trash can 10, thereby indicating illustrative similar features. Many of the features of the trash can 110 are the same as, or similar to, the features described above in connection with the trash can 10. Indeed, the trash can 110 can include one, some, or all of the features of the trash can 10, including all combinations and sub-combinations. Any component or step disclosed in any embodiment in this specification can be used in other embodiments.

As shown in FIGS. 18-25, the trash can 110 can include a body 112 and a lid assembly 113. The lid assembly can include a lid 114 and a lid base to which the lid 114 is attached. In some embodiments, as illustrated, the lid base comprises a trim ring 115 that is attachable to the trash can body 112. In some embodiments, the upper portion of the trash can body 112 comprises the lid base. As illustrated, in some embodiments, the lid base or trim ring 115 can extend around at least a portion of, or around a majority of, or entirely around, a peripheral edge of the lid 114. In various embodiments, the lid base or trim ring 115 or upper portion of the trash can body 112 includes a hinge unit 116. The trash can body 112 can include an internal cavity, into which trash, recyclables, pet food, or other materials can be disposed. For convenience and/or sanitation, a liner or trash bag (not shown) can be positioned in the internal cavity. For example, a lip of the liner can be positioned over an upper edge of the body 112 so that trash can be accumulated in the liner in the internal cavity.

The lid 114 can be configured to move (e.g., rotate) relative to the body 112 to facilitate access into the interior cavity. For example, the lid 114 can move between open and closed positions. The lid 114 can be operatively connected with a pedal 120, such that actuation (e.g., depression) of the pedal 120 causes rotation of the lid 114 relative to the body 112. In some embodiments, a linkage 122 connects the pedal 120 and the lid 114. Certain embodiments include a damping mechanism 160 operatively connected with the pedal 120 and/or linkage 122. As shown, the linkage 122 can be located in a channel 190 in the body 112 of the trash can 110. In some embodiments, the damping mechanism 160 is located in a second channel 191. As shown, the second channel 191 can be further recessed within the body 112 compared to the channel 190. As illustrated, the damping mechanism 160 can be recessed with respect to the rear wall of the trash can body 112.

In certain implementations, the lid base or trim ring 115 can move (e.g., rotate) with respect to the body 112 and/or the lid 114. For example, the trim ring 115 can move between loading and securing positions. In some embodiments, in the loading position, the trim ring 115 facilitates loading or positioning of the liner into the internal cavity of the body 112. For example, in some embodiments, a portion of the trim ring 115 can rotate or otherwise move generally away from the upper edge of the body 112 in the loading position, thereby providing a larger opening in the trash can body 112 into which the liner can be inserted, and/or allowing a portion of the liner (e.g., an upper lip of the liner) to be wrapped over the upper edge of the body 112, which may otherwise be covered by the trim ring 115 when the trim ring 115 is in the securing position. In some embodiments, when the trim ring 115 is in the securing position, it engages with (e.g., rests on, rests adjacent to, attaches to, and/or locks onto, etc.) the upper portion of the body 112, with the liner disposed between the trim ring 115 or lid and the upper portion of the body 112. In certain variants, the weight of the lid base or trim ring 115 acting against the body 112 and/or a removable attachment of the trim ring 115 to the body 112 can aid in securing the liner with or in the body 112.

Figure 21:
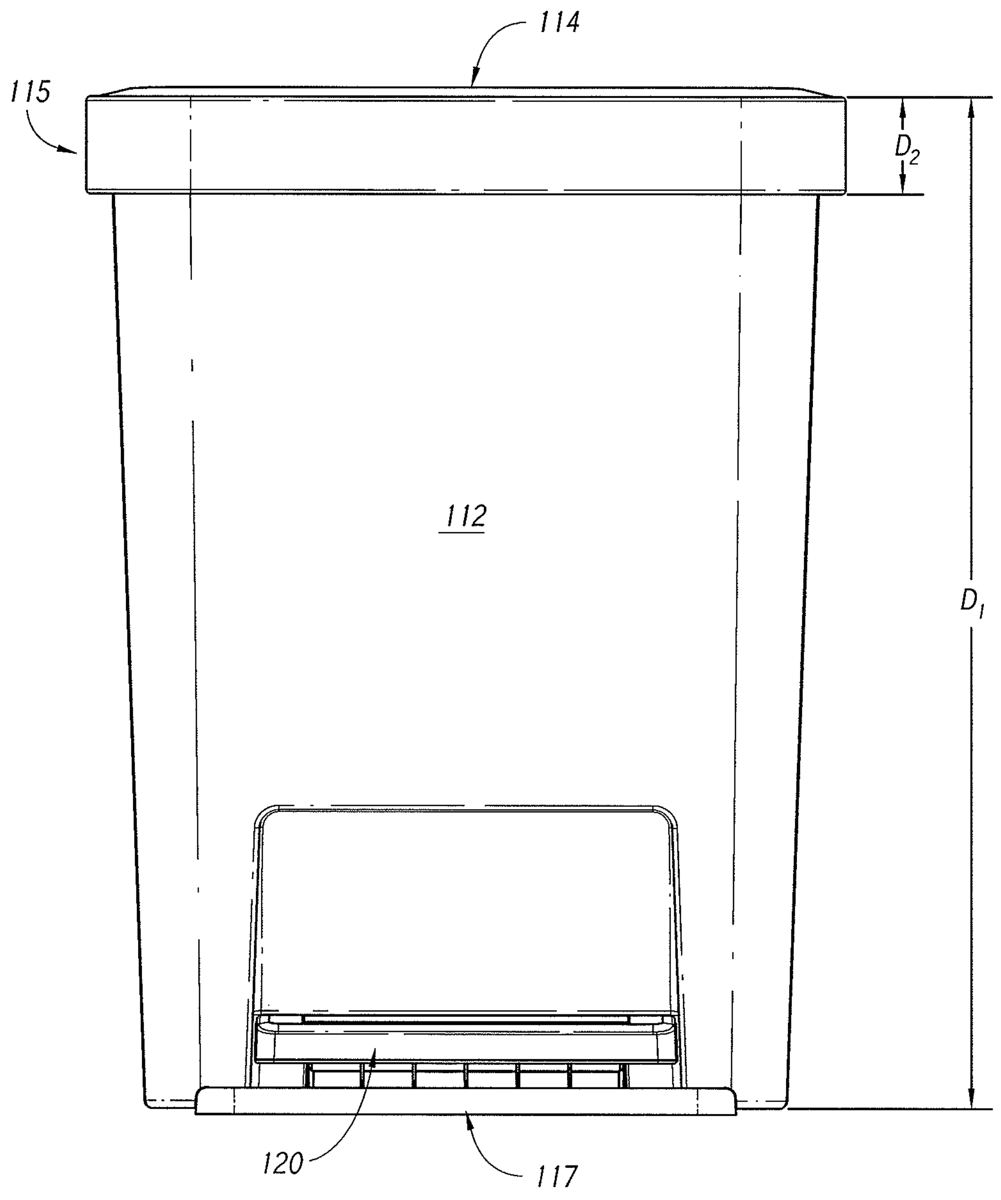
FIG. 21 illustrates a front view of the embodiment of FIG. 18.

In various embodiments, the lid base or trim ring 115 is configured to visually obscure the disposable liner wrapped over the upper edge of the body 112. For example, the trim ring 115 can be wider than the upper portion of the body 112 and/or can extend around some or all of an outer periphery of the upper edge. In some implementations, an upper portion of the trim ring 115 is located vertically higher (e.g., located a greater distance from a generally flat surface on which the trash can 110 is positioned) than the upper edge of the body 112. As shown, the trim ring 115 can extend generally downward and beyond the upper edge of the body 112 thereby obscuring the upper edge and/or the liner wrapped over the upper edge. In some variants, a lower portion of the trim ring 115 is located vertically below (e.g., located at a lesser distance from the generally flat surface on which the trash can 110 is positioned) the upper edge of the body 112. As shown in FIG. 21, the trim ring 115 can have a height D2 and the distance between the top of the trim ring 115 and the bottom of the body 112 can have a distance D1. In various implementations, the ratio of D2 to D1 is less than or equal to about: 0.20, 0.15, 0.10, 0.05, values between the aforementioned values, and otherwise.

Figure 19:
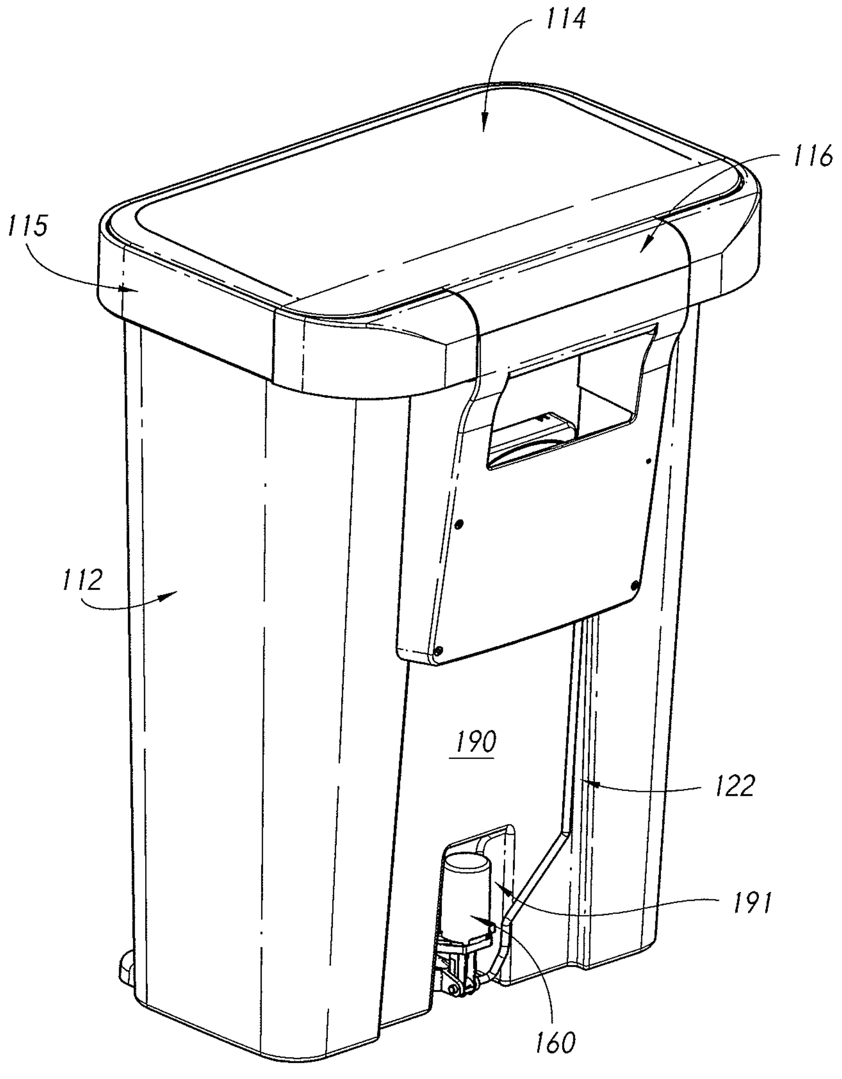
FIG. 19 illustrates a rear top perspective view of the embodiment of FIG. 18.
Figure 20:
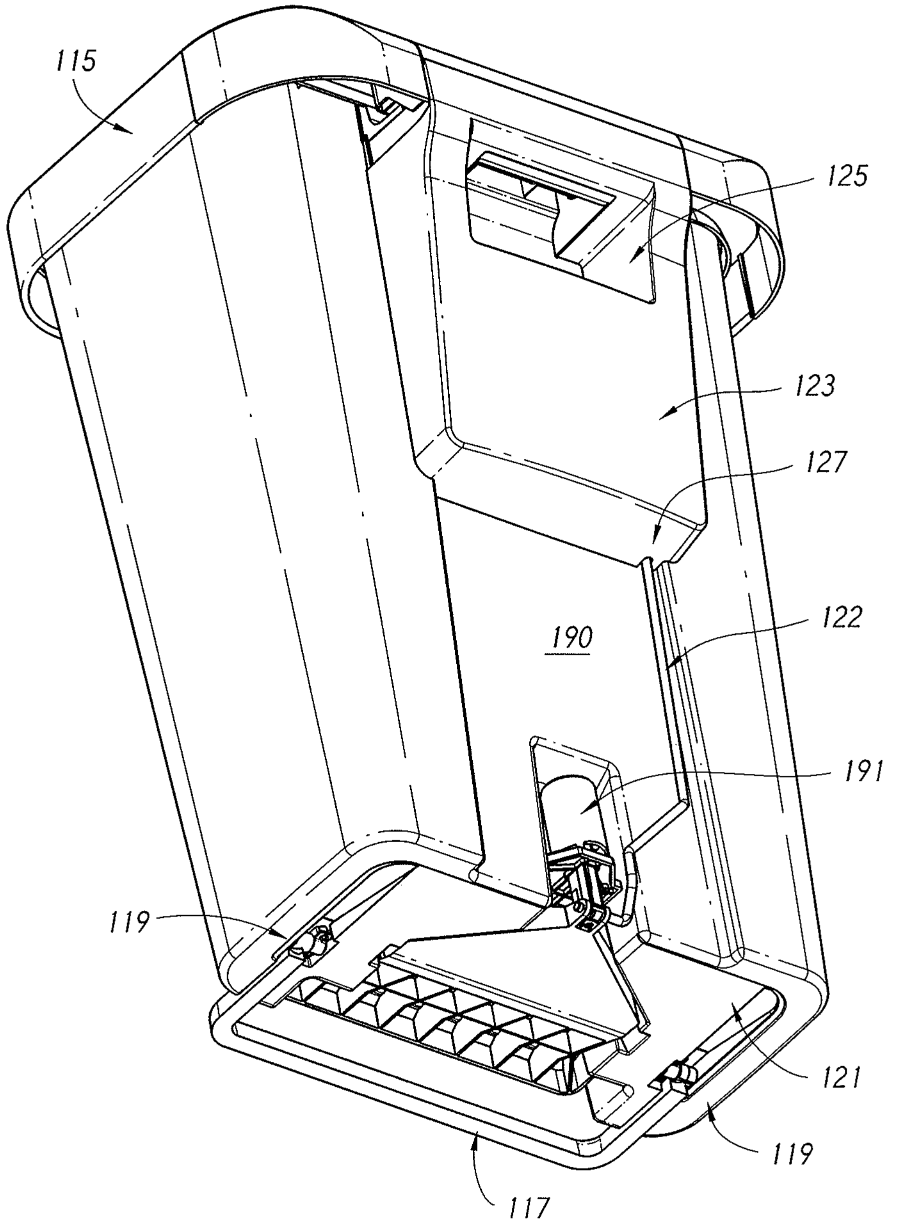
FIG. 20 illustrates a rear bottom perspective view of the embodiment of FIG. 18.
Figure 23:
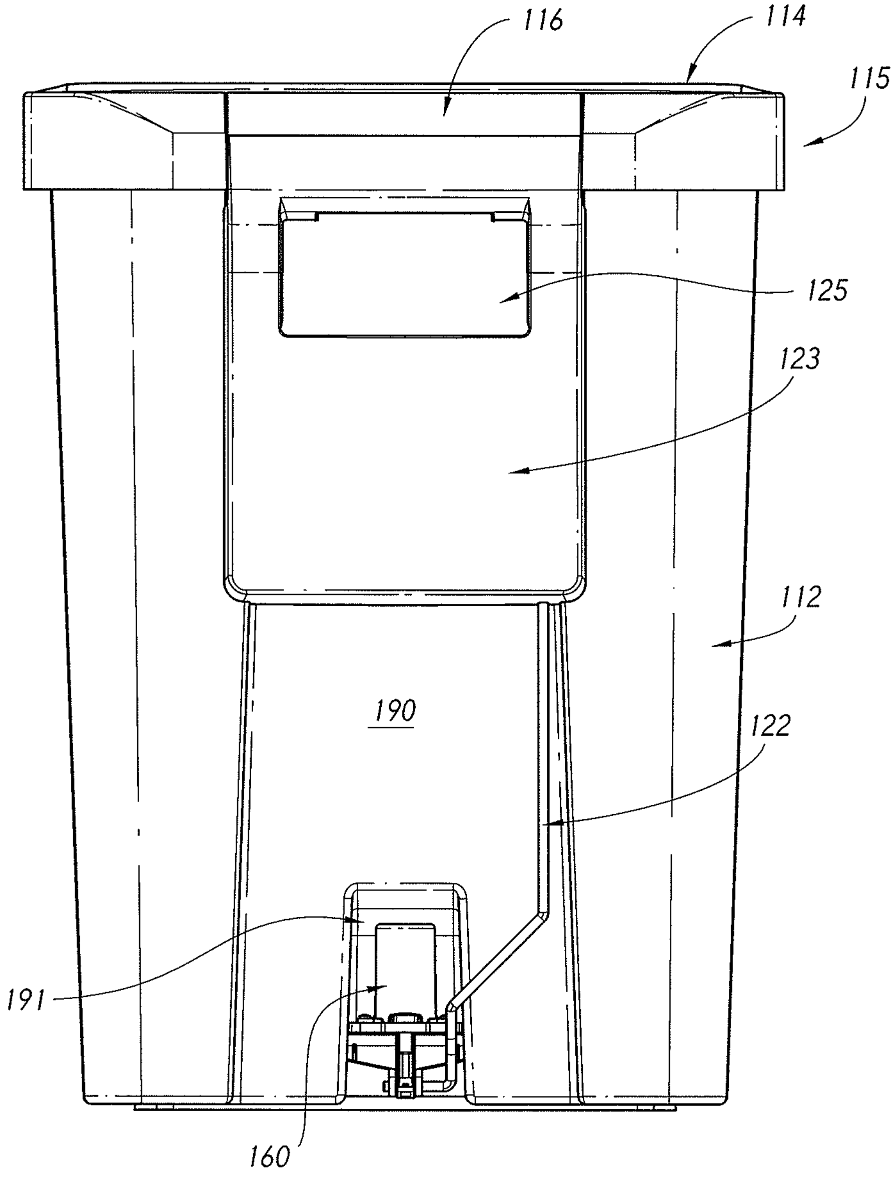
FIG. 23 illustrates a rear view of the embodiment of FIG. 18.
Figure 24:
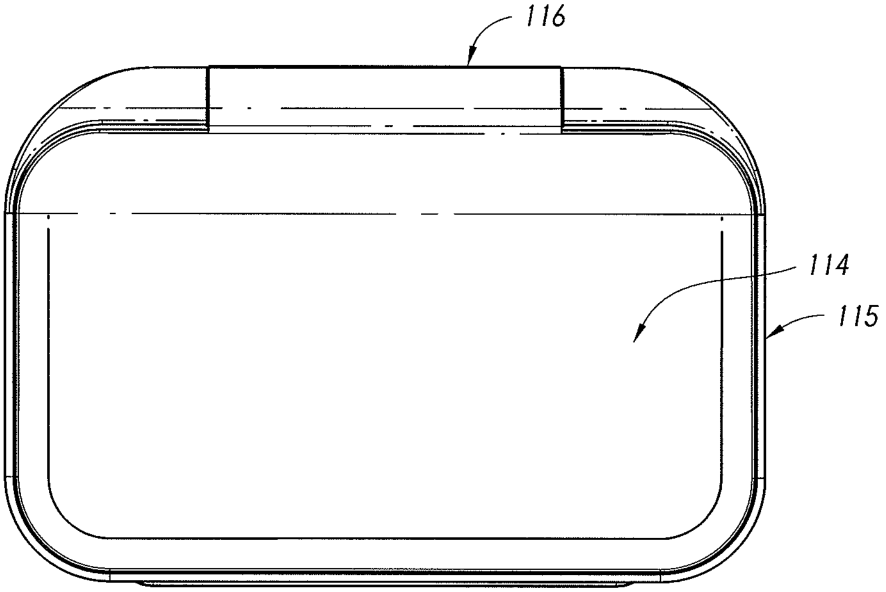
FIG. 24 illustrates a top view of the embodiment of FIG. 18.
Figure 25:
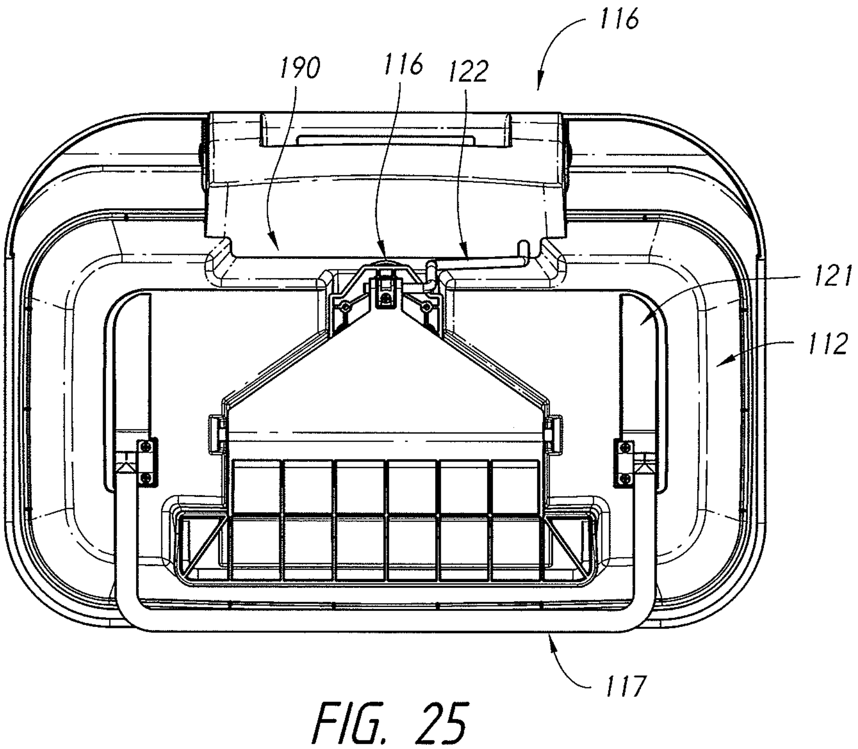
FIG. 25 illustrates a bottom view of the embodiment of FIG. 18.

As shown in FIGS. 19, 20, and 23, certain embodiments of the trash can 110 have a liner dispenser unit 123. The liner dispenser unit 123 can be configured to receive a plurality of the disposable liners for use one-at-a-time in the trash can 110. In some embodiments, the liner dispenser unit 123 is configured to facilitate dispensing of the liners into the interior cavity of the trash can 110 through a wall, such as a rear wall, of the trash can 110. For example, the body 112 can include an opening (not shown) through which the liners can travel or pass from the liner dispenser unit 123 into the interior cavity. This can provide convenient and ready access to the liners by a user. As illustrated, the liner dispenser unit 123 can include a rear opening 125. In certain variants, the liner dispenser unit 123 includes a slot 127 through which a portion of the linkage 122 can pass. Further details regarding the liner dispenser unit 123 can be found in U.S. Patent Application No. 61/949,868, filed Mar. 7, 2014, which is incorporated by reference herein in its entirety, such that any feature, step, method, structure, or component disclosed in such application can be utilized with any embodiment described and/or illustrated in this specification.

With reference to FIGS. 18, 20, 22, 25, some embodiments of the trash can 110 have a stabilizer 117. The stabilizer 117 can be configured to move between deployed and stowed (not shown) positions. In some embodiments, the stabilizer 117 slides relative to the body 112, between the stowed and deployed positions. In certain variants, the stabilizer 117 rotates about a pivot 119 between the stowed and deployed positions. The stabilizer 117 can be configured to remain connected with the body 112 in the deployed and stowed positions, or can be configured such that the stabilizer 117 separates from the body 112 in the stowed position (e.g., to be placed in the internal cavity). Additional disclosure regarding one or more features of a stabilizer that can be used is provided in U.S. Publication No. 2011/0220655, filed Mar. 14, 2011, which is incorporated by reference herein in its entirety, such that any feature, step, method, structure, or component described and/or illustrated in such application can be utilized with or instead of any feature, step, method, structure, or component in any embodiment described and/or illustrated in this specification.

In the deployed position, the stabilizer 117 can enhance or increase the stability of the trash can 110 and/or can decrease the likelihood of the trash can 110 tipping over (e.g., during depression of the pedal 120). In certain implementations, the deployed stabilizer 117 can reduce the height of the center of mass of the trash can 110, compared to the trash can 110 without the stabilizer 117, or without the stabilizer 117 deployed. In some implementations, the stabilizer 117 is made of metal (e.g., aluminum, stainless steel, or otherwise), which can provide ballast for the trash can 110, such as in embodiments in which the body 112 is made of plastic. In certain embodiments, stabilizer 117 can be coated with a flexible or resilient material, such as polyvinyl chloride, rubber, or another rubber-like material. This can protect the surface (e.g., flooring) on which the trash can 100 rests and/or can increase the amount of friction between the trash can 100 and the flooring (e.g., to reduce or avoid sliding and/or rocking of the trash can 100).

Figure 22:
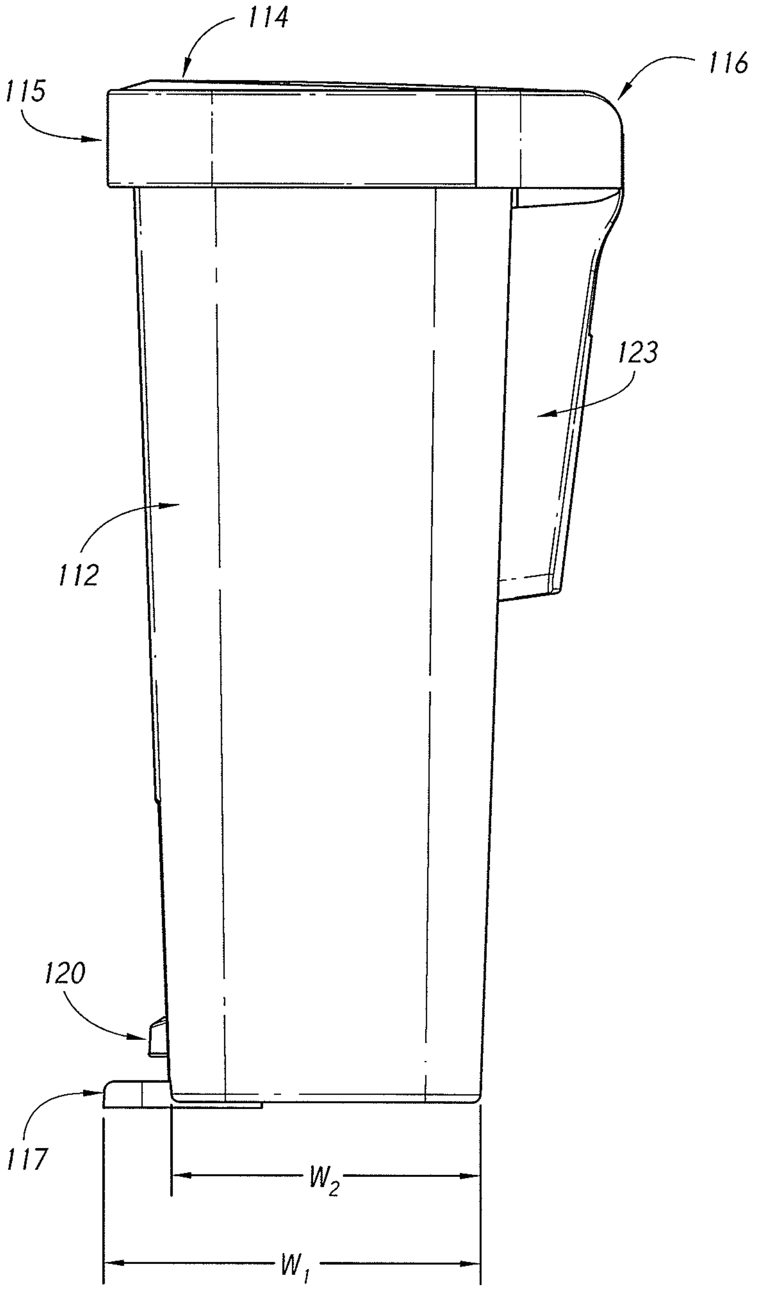
FIG. 22 illustrates a left side view of the embodiment of FIG. 18, the right side view being a mirror image of the left side view.

The stowed position of the stabilizer 117 can facilitate storage and/or transport of the trash can 110. For example, the stowed position can decrease the front-to-rear width of the bottom portion of the trash can 110, which can facilitate stacking (e.g., nesting) of one body 112 within another body 112 as is discussed above, e.g., in connection with FIG. 4. As shown in FIG. 22, with the stabilizer 117 deployed, the width of the trash can 110 is W1, but with the stabilizer 117 stowed, the width of the trash can 110 is W2, which is less than W1. This can reduce or eliminate a physical interference that the stabilizer 117 would otherwise present to stacking one body 112 within another body 112. In various embodiments, the ratio of W2 to W1 is less than or equal to about: 0.95, 0.90, 0.85, 0.80, 0.75, 0.60, values between the aforementioned values, or otherwise. In several embodiments, in the stowed position, the stabilizer 117 is received in a channel 121 in the body 112. This can reduce the height (the top-to-bottom profile) of the trash can 110 compared to a configuration without the channel 121. In certain variants, the channel 121 is configured to receive the stabilizer 117 such that the stabilizer is recessed above, or flush with, a bottom surface of the trash can 110.

In several embodiments, the lid assembly 113 is separable from the body 112. This can facilitate storage and/or transport of the trash can 110 or a plurality of the trash cans 110. For example, the lid assembly 113 can be separated from the body 112, thereby opening-up the body 112 to receive another body 112 (e.g., similar to what is shown in FIG. 4 with regard to the trash can 10 described above). The lid assemblies 113 of the stacked bodies 112 can be stored separately or can be placed in the internal cavity of one or more of the bodies 112. This can decrease the volume occupied by the plurality of trash cans 110 during storage and/or shipment, which can increase efficiency and/or reduce cost.

Figure 26:
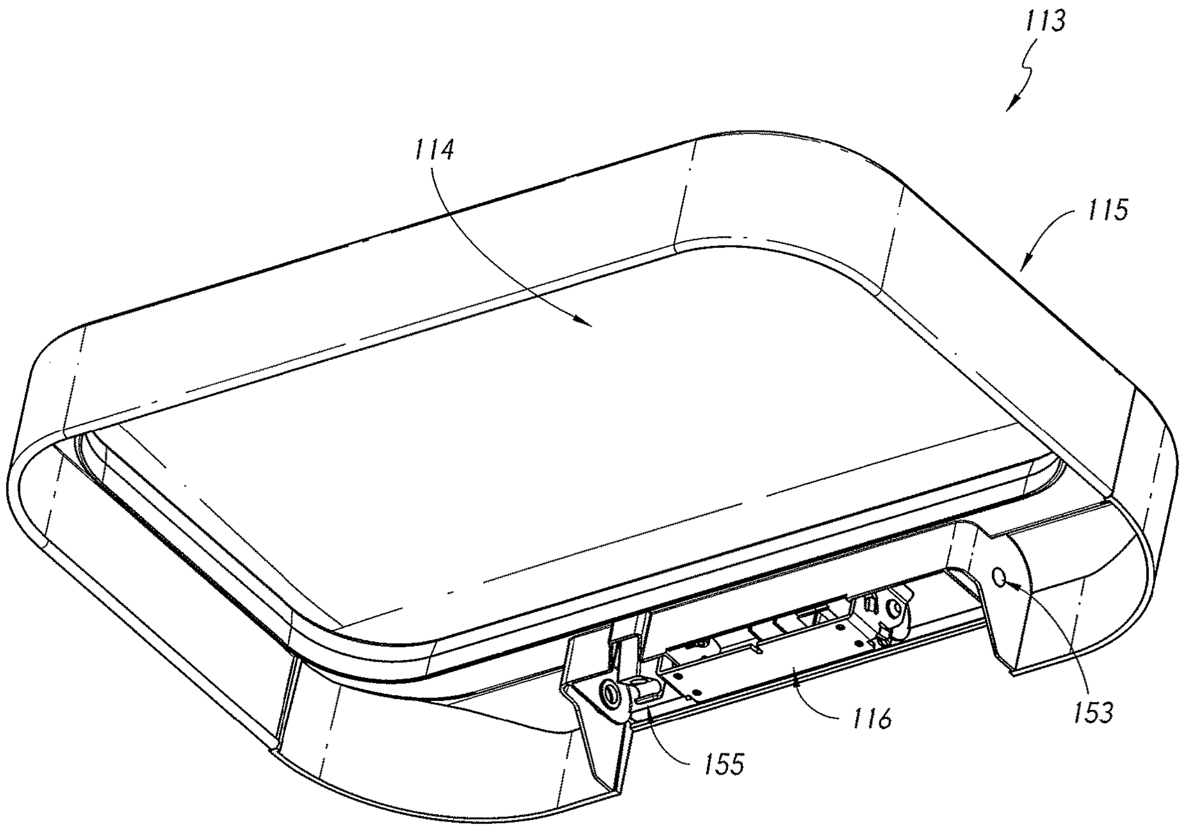
FIG. 26 illustrates a bottom perspective view of an embodiment of a lid assembly of the trash can of FIG. 18.

With regard to FIG. 26, a bottom perspective view of the lid assembly 113 is illustrated. As shown, the lid 114 can be coupled with the trim ring 115. For example, the lid 114 can be coupled with the trim ring 115 via a pivot connection 153. This can allow the lid 114 to rotate relative to the trim ring 115. In various implementations, during actuation of the pedal 120, the lid 114 can rotate (e.g., between the open and closed positions) with respect to the body 112 as well as with respect to the trim ring 115. In some variants, the pivot connection 153 include mating flanges on the lid 114 and trim ring 115 and a pivot-facilitating member, such as an expandable pin, bushing, or otherwise. In some embodiments, the lid 114 includes a linkage connection member 155, such as a hook or boss, configured to connect with the linkage 122. This can facilitate the operative connection between the pedal 120 and the lid 114. In several embodiments, the lid 114 and the trim ring 115 can rotate about the same axis of rotation.

Figure 27:
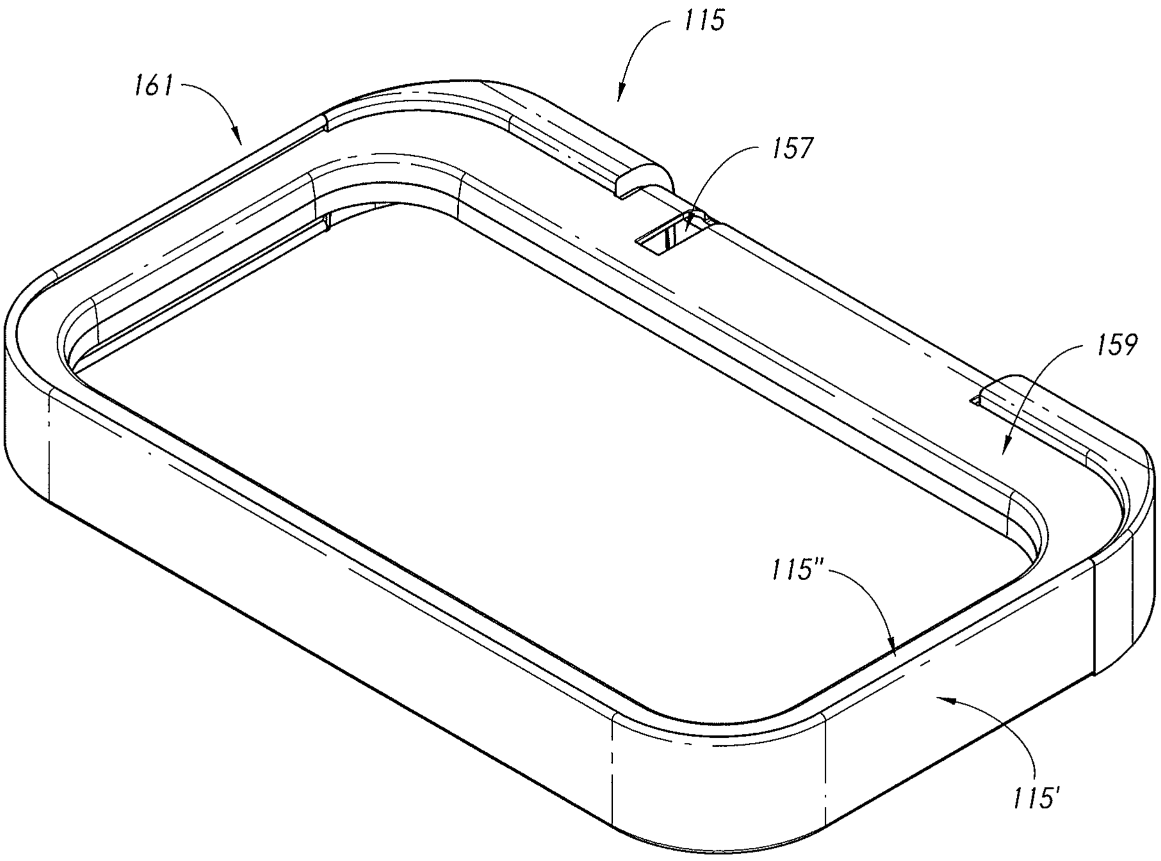
FIG. 27 illustrates a top front perspective view of an embodiment of a trim ring of the lid assembly of FIG. 26.
Figure 27A:
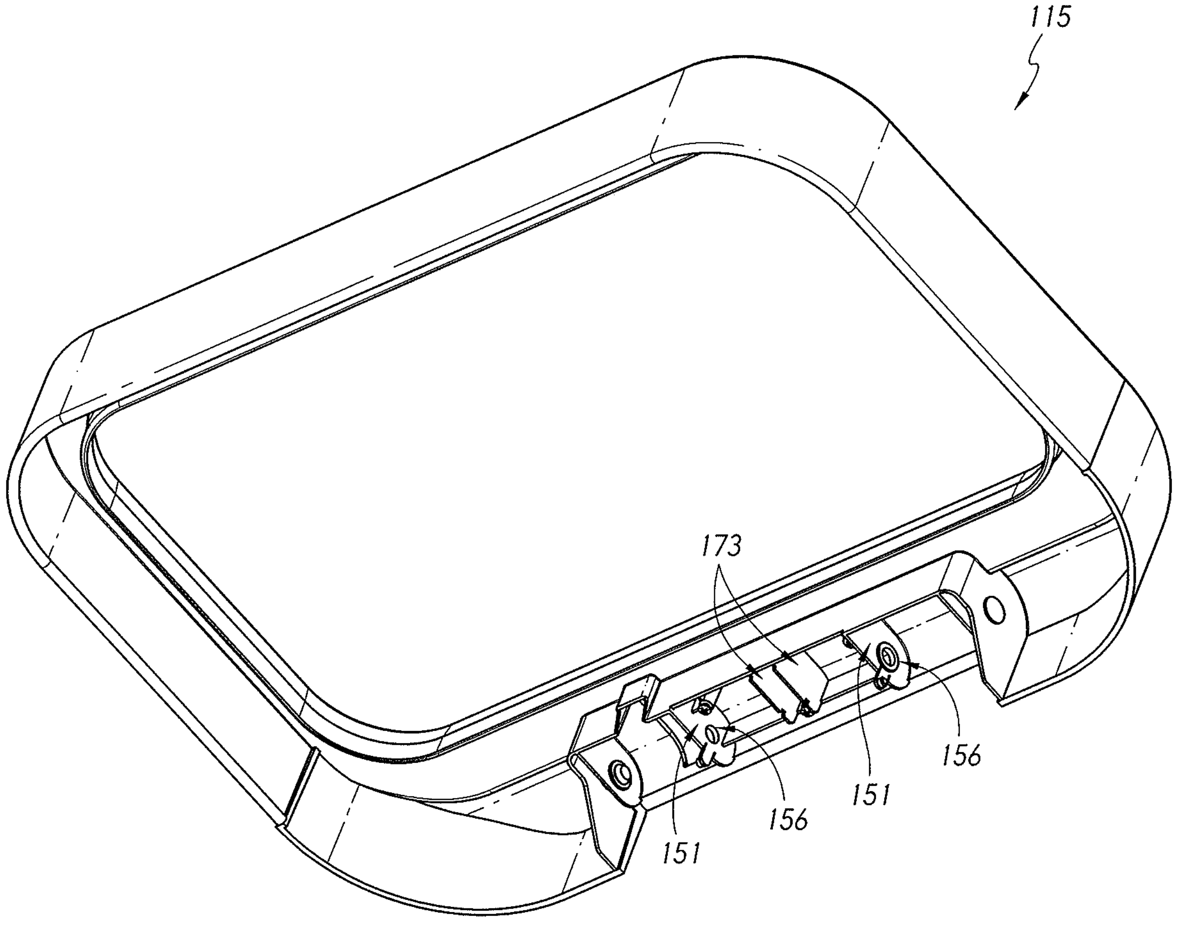
FIG. 27A illustrates a bottom front perspective view of the trim ring of FIG. 27.

With regard to FIGS. 26, 27, and 27A, the trim ring 115 can include one or more connection members 151, such as flanges, hooks, struts, ribs, or otherwise. As shown, the connection members 151 of the trim ring 115 can be laterally spaced apart from the pivot connection 153 (which connects the trim ring 115 and the lid 114). In some embodiments, the connection members 151 connect with the hinge unit 116. For example, each connection member 151 can include an opening 156, which can be sized and configured to receive a portion of a securement member of the hinge unit 116 (e.g., a rounded or chamfered end of a pin, as is described in more detail below). In some embodiments, the trim ring 115 includes a strut 173, which can be located between the connection members 151.

In some embodiments, the trim ring 115 is configured to facilitate operation of the lid 114 when the lid assembly 113 is connected with the body 112. For example, the trim ring 115 can include an aperture 157, through which the linkage connection member 122 can extend (see, e.g., FIG. 27). Various embodiments of the trim ring 115 are configured such that the lid 114 can be opened and closed independent of the trim ring 115.

In certain implementations, the trim ring 115 is configured to receive the lid 114. For example, the trim ring 115 can include a recessed portion 159 that receives the lid 114. This can, for example, reduce the height or other profile of the trash can 110. In some implementations, the trim ring 115 includes a peripheral wall 161 that can extend around some or all of the periphery of the lid 114 when the lid 114 is received in the recessed portion 159.

In various embodiments, an outwardly-facing peripheral portion 115' of the trim ring 115 is made of a different material than a radially-inwardly extending shoulder portion 115" of the trim ring 115. For example, in some embodiments, the outwardly-facing peripheral portion 115' is made of metal and the shoulder portion 115" is made of plastic. This can increase the strength and/or durability of the trash can 110 (e.g., compared to embodiments in which the peripheral portion 115' and the shoulder portion 115" are both plastic) while also reducing weight (e.g., compared to embodiments in which the peripheral portion 115' and the shoulder portion 115" are both metal). In some implementations, the outwardly-facing peripheral portion 115' is made of stainless steel and the shoulder portion 115" is made of polypropylene. In certain variants, the peripheral portion 115' has greater hardness (e.g., using the Rockwell B scale) than the shoulder portion 115". In some embodiments, the outwardly-facing peripheral portion 115' comprises a metallic band that wraps around some, substantially all, or all of the periphery of the trim ring 115. In various embodiments, the metallic band extends along one, two, three, or more sides of the outer periphery of the trim ring 115. In some implementations, the height (e.g., parallel to the vertical axis of the trash can) of the metallic band is at least about 75% of the height D2 of the trim ring 115.

Figure 28:
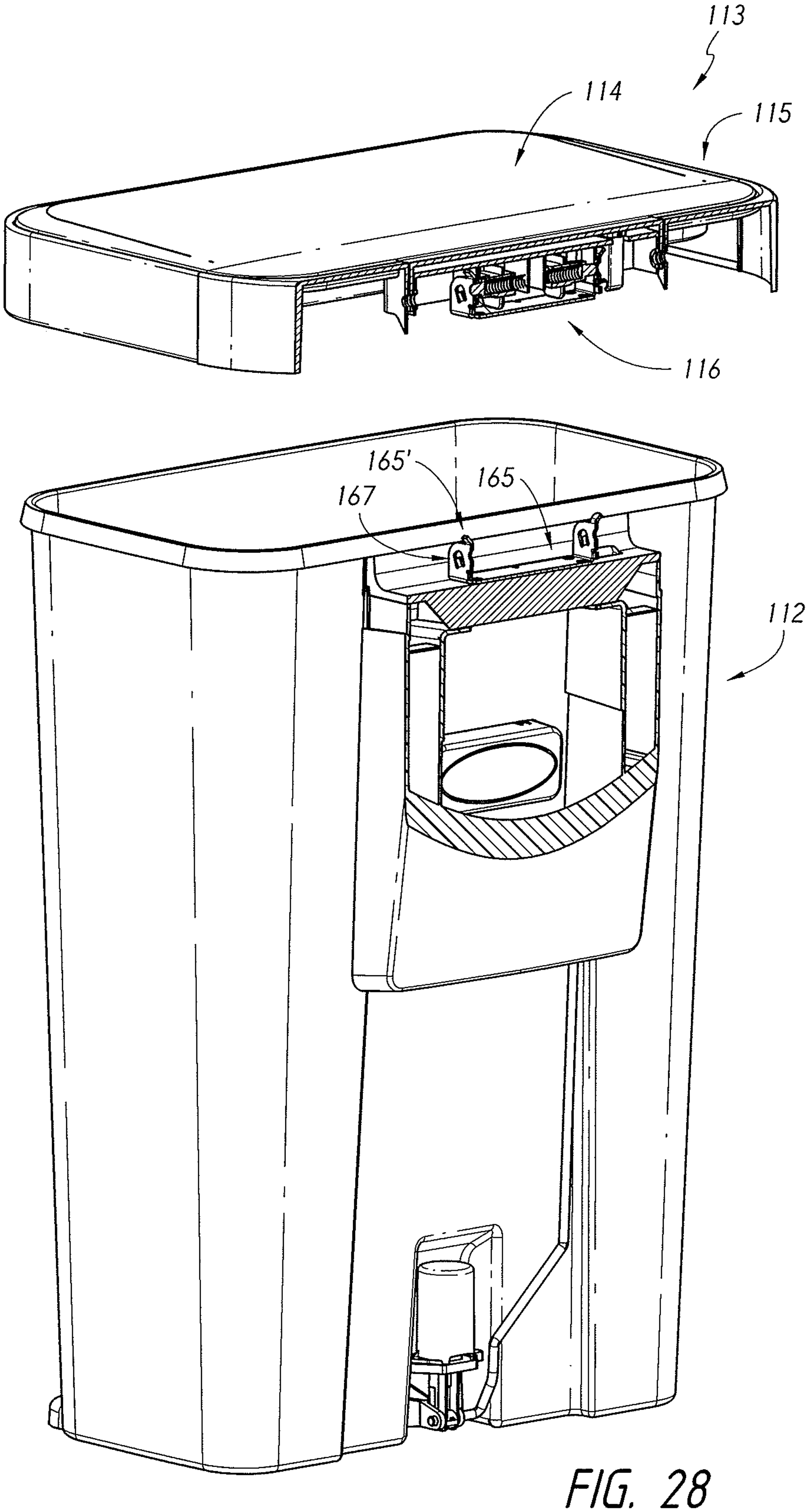
FIG. 28 illustrates an exploded top rear perspective cross-sectional view of the trash can of FIG. 18.
Figure 29:
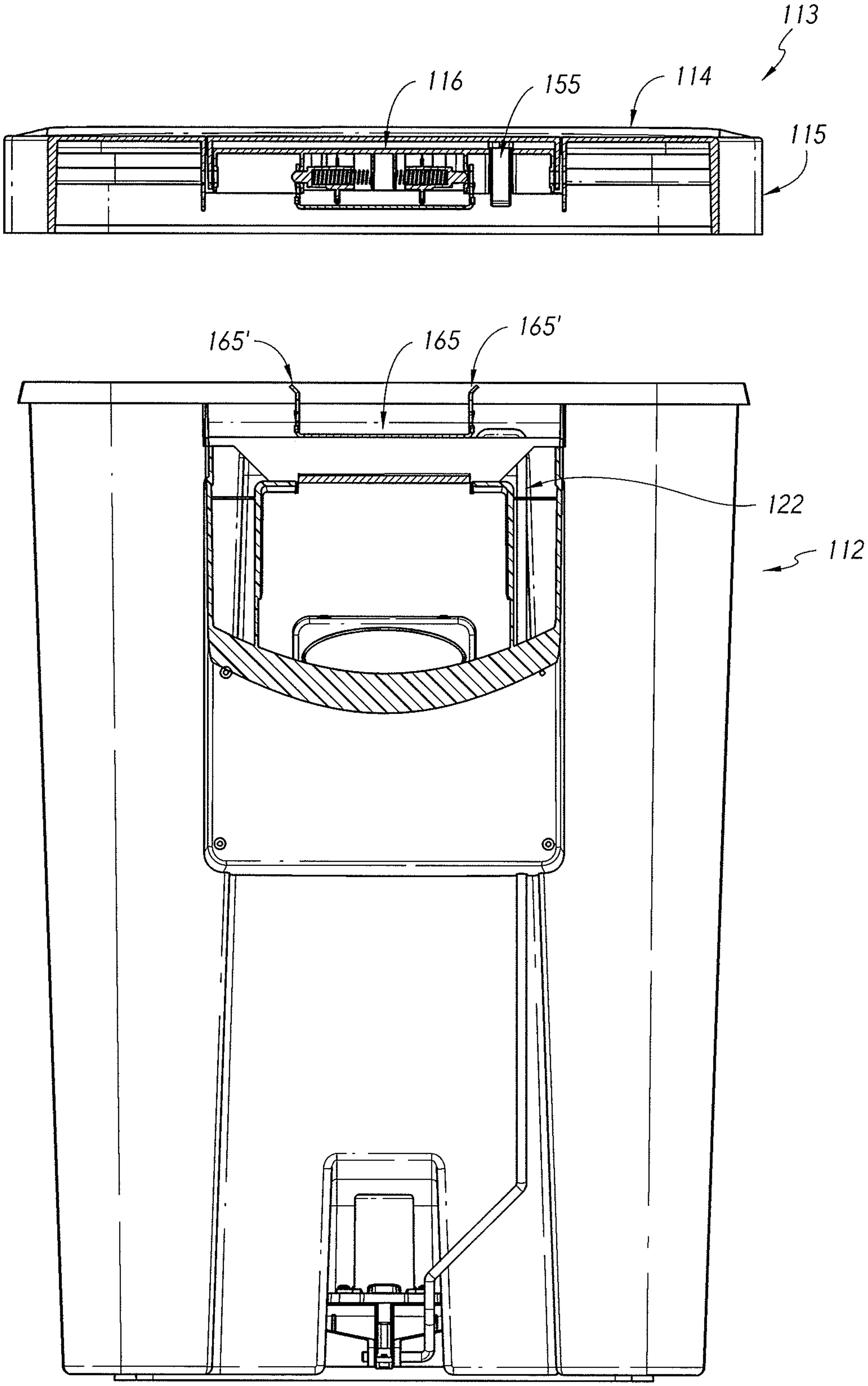
FIG. 29 illustrates a rear view of the trash can of FIG. 28.
Figure 30:
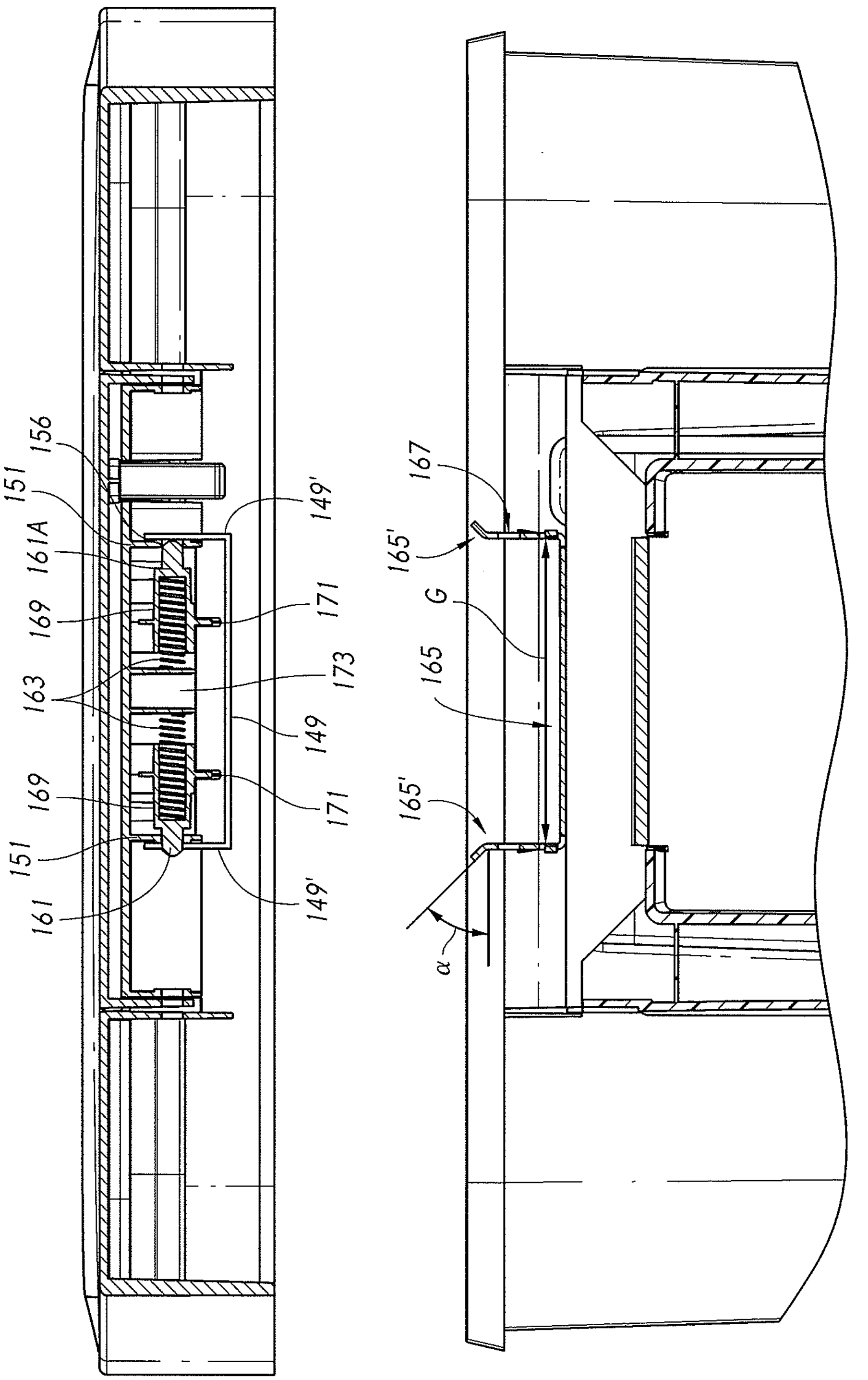
FIG. 30 illustrates an enlarged view of a portion of FIG. 28.

With regard to FIGS. 28 through 30, the trash can 110 is shown with the lid assembly 113 separated from the body 112. To facilitate the presentation of these components, FIGS. 28-30 do not show the lid 114 and a cover of the lid dispensing unit 123. As described below, in several embodiments, the hinge unit 116 of the trim ring 115 is configured to selectively connect and disconnect the lid assembly 113 with the body 112. In various embodiments, when the lid assembly 113 is connected with the body 112, the lid 114 is operatively connected with the pedal 120, such as via the linkage 122. In certain implementations, when the lid assembly 113 is disconnected with the body 112, the lid assembly 113 can be separated from the body 112 (e.g., to facilitate stacking of multiple instances of the body 112) and/or can be positioned in the interior cavity of the body 112 (e.g., for storage).

In various embodiments, the body 112 can include a connection base 165, such as flanges, ribs, hooks, struts, or otherwise. The connection base 165 can include openings 167, which can be sized and configured to receive a securement member (e.g., a strut or pin 161) of the hinge unit 116 on the trim ring 115. As described in further detail below, the engagement and interaction between the connection base 165 and the hinge unit 116 can provide the connection between the lid assembly 113 and the body 112. In various embodiments, the connection base 165 includes a gap G (also called a receiving area).

As illustrated, the connection base 165 can include a guide portion 165'. The guide portion 165' can facilitate engagement with the hinge unit 116 of the trim ring 115 by encouraging the hinge unit 116 into docking engagement with the hinge unit 116. For example, the guide portion 165' can direct a locating member 149 (e.g., a strut or brace) of the hinge unit 116 into the receiving area. In some embodiments, the guide portion 165' extends at an angle α with respect to a horizontal plane. For example, the angle α can be greater than or equal to about: 30°, 45°, 60°, 75°, values between the aforementioned values, or otherwise. As illustrated, in some embodiments, a guide portion 165' of a first end of the connection base 165 extends at an angle (e.g., at least about 45° relative to horizontal) toward a first lateral side of the trash can 110 and a guide portion 165' of a second end of the connection base 165 extends at an angle (e.g., at least about 45° relative to horizontal) toward a second lateral side of the trash can 110.

As previously noted, the hinge unit 116 can include a locating member 149, such as a tray, strut, brace, or otherwise. In some embodiments, the locating member 149 forms a bottom boundary of the hinge unit 116. In certain variants, the lateral length of the locating member 149 is less than the lateral gap G of the connection base 165. As discussed in more detail below, when the lid assembly 113 is connected with the body 112, the locating member 149 can be abutted against and/or adjacent to the connection base 165. As shown, the locating member 149 can include flanged portions 149', such as generally upwardly directed members. In some embodiments, the flanged portions 149' have openings, which can be similar to the openings 156 in the connection members 151.

As also noted above, the hinge unit 116 can include a securement member, such as a strut or pin 161. The pin 161 can move relative to the upper edge of the body 112, such as between a first position and a second position. For example, the pin 161 can slide between the first position and the second position. As is discussed in more detail below, when the pin 161 is in the first position, the hinge unit 116 is configured to secure, and/or provide a pivotal connection between, the lid assembly 113 with the body 112; and when the pin 161 is in the second position, the hinge unit 116 is configured to facilitate docking or separation of the lid assembly 113 with the body 112.

As shown, the hinge unit 116 can include a plurality of the securement members, such as pins 161 and 161A. In some implementations, the pins 161, 161A are generally oppositely directed. For example, the pins 161, 161A can be configured to slide in substantially opposite directions. In certain embodiments, the pins 161, 161A are substantially co-axial.

The pins 161, 161A can be configured to move between respective first and second positions. For presentation purposes, the pin 161 is shown in its respective first position and the pin 161A is shown in its respective second position. In some variants, the pins 161, 161A are closer to each other when both are in their respective second positions than when both in their respective first positions. In certain variants, the pins 161, 16' are configured to move independent of the other. For example, the pin 161 can slide between its first and second positions regardless of whether the pin 161A is in its first or second position, and vice versa.

In some embodiments, the hinge unit 116 of the trim ring 115 includes one or more biasing members 163, such as springs. The biasing members 163 can be configured to bias the pins 161, 161A. For example, the biasing members 163 can bias the pins 161, 161A toward the first position. In certain implementations, when the one of the pins 161, 161A is moved to its second position, the biasing member for that pin is energized. In some variants, the biasing member 163 can encourage the pin 161 toward and/or through the openings in the connection member 151 and the locating member 149.

In various embodiments, the hinge unit 116 includes a housing 169. The housing 169 can be configured to receive a portion of the pin 161 and/or the biasing member 163. For example, the pin 161 can slide in the housing 169.

In some embodiments, the pin 161 is coupled with an actuating portion, such as a grip or handle 171. In certain implementations, the handle 171 can be a flange, hook, boss or other feature that is graspable or engageable by a tool (e.g., a lever) and/or a user's finger. In the embodiment illustrated, the handle 171 is a generally downwardly extending fin. As illustrated, some embodiments include a plurality of handles, such as one handle for each pin 161. In certain variants, the handles 171 can be moved in a direction generally toward each other and/or against the bias of the biasing member 163.

In some embodiments, lid assembly 113 can be connected with the body 112 by engaging (e.g., abutting) the hinge unit 116 of the lid assembly 113 with the support member 165 of the body 112. For example, the locating portion 149 of the hinge unit 116 can be positioned in the gap G (also called the receiving area) of the support member 165. In various embodiments, the pins 161 can be moved to the second position during the engagement. For example, in the illustrated embodiment the pins are pushed laterally inward (e.g., toward a centerline of the lid assembly 113) in the course of such engagement. In some embodiments, the pins 161 engage (e.g., contact) the angled guide portions 165' of the support member 165, which act as cams to move the pins 161. In some embodiments, the user actuates the handles 171 against the bias of the spring 163 to move the pins 161. In various implementations, movement of the pins 161 can reduce or eliminate a physical interference between the hinge unit 116 and the connection base 165 and/or can reduce the lateral length of the hinge unit 116 to be approximately less than or equal to the gap G. This can enable the hinge unit 116 to be received in the connection base 165. For example, the locating portion 149 of the hinge unit 116 can be positioned on or adjacent to the connection base 165. In certain variants, when the hinge unit 116 is received in the connection base 165, the pins 161 can be substantially aligned (e.g., are approximately co-axial) with the openings 167 in the support member 165. This can allow the biasing members 163 to move the pins 161 through the openings 167 in the support member 165, which in turn can provide securement of the lid assembly 113 with the body 112. In some embodiments, the engagement of the pins 161 of the hinge unit 116 with the openings 167 of the support member 165 provides a pivot about which the trim ring 115 and/or the lid 114 can rotate relative to the body 112.

In some implementations, the locating member 149 is configured to aid in aligning the pins 161 with the openings 167 of the connection base 165. For example, in certain variants, when the locating member 149 and the connection base 165 are engaged (e.g., in substantially flush abutment), the pins 161 are substantially aligned with the openings 167. This can reduce or avoid the need for a user to visually align the pins 161 and openings 167. As illustrated, in some variants, the mating surfaces of the locating member 149 and the connection base 165 are both generally flat. In some variants, the locating member 149 and the connection base 165 include location-facilitating features, such as a rib on one and a corresponding groove on the other.

In several embodiments, the locating member 149 and/or the connection base 165 are configured for increased strength and/or durability. For example, the locating member 149 and/or the connection base 165 can be made of a metal (e.g., steel). This can reduce the likelihood of the locating member 149 and/or the connection base 165 being damaged during mating of the lid assembly 113 with the body 112. In certain embodiments, the only component made of metal on the body 112 is the connection base 165 and/or the stabilizer 117 (e.g., the remainder of the body 112 is plastic). In some variants, the only component made of metal on the lid assembly 113 is the locating member 149 and/or the peripheral portion 115' (e.g., the remainder of the lid assembly 113 is plastic).

In certain embodiments, lid assembly 113 can be disconnected with the body 112 by removing the engagement of the hinge unit 116 and the connection base 165. For example, in some embodiments, moving the handle 171 moves the pin 161 against the bias of the biasing member 163, thereby removing the pin 161 from the openings 167 in the connection base 165. This can selectively remove the physical interference of the pin 161 with the support member 165, thereby allowing the hinge unit 116 of the trim ring 115 to be separated from (e.g., lifted-off of) the body 112.

Figure 31:
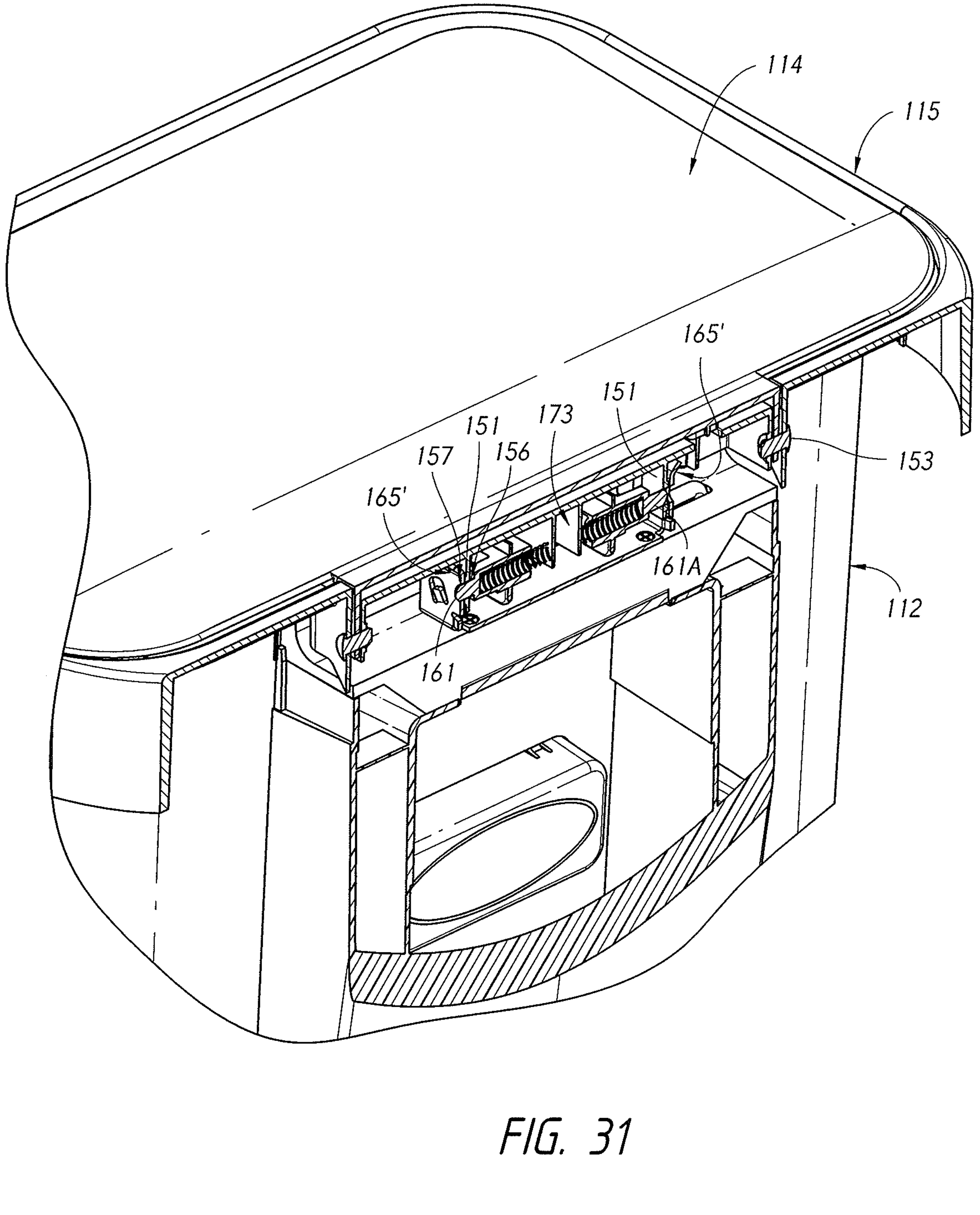
FIG. 31 illustrates a top rear perspective cross-sectional view of a connection between the lid assembly and body of the trash can of FIG. 18.
Figure 32:
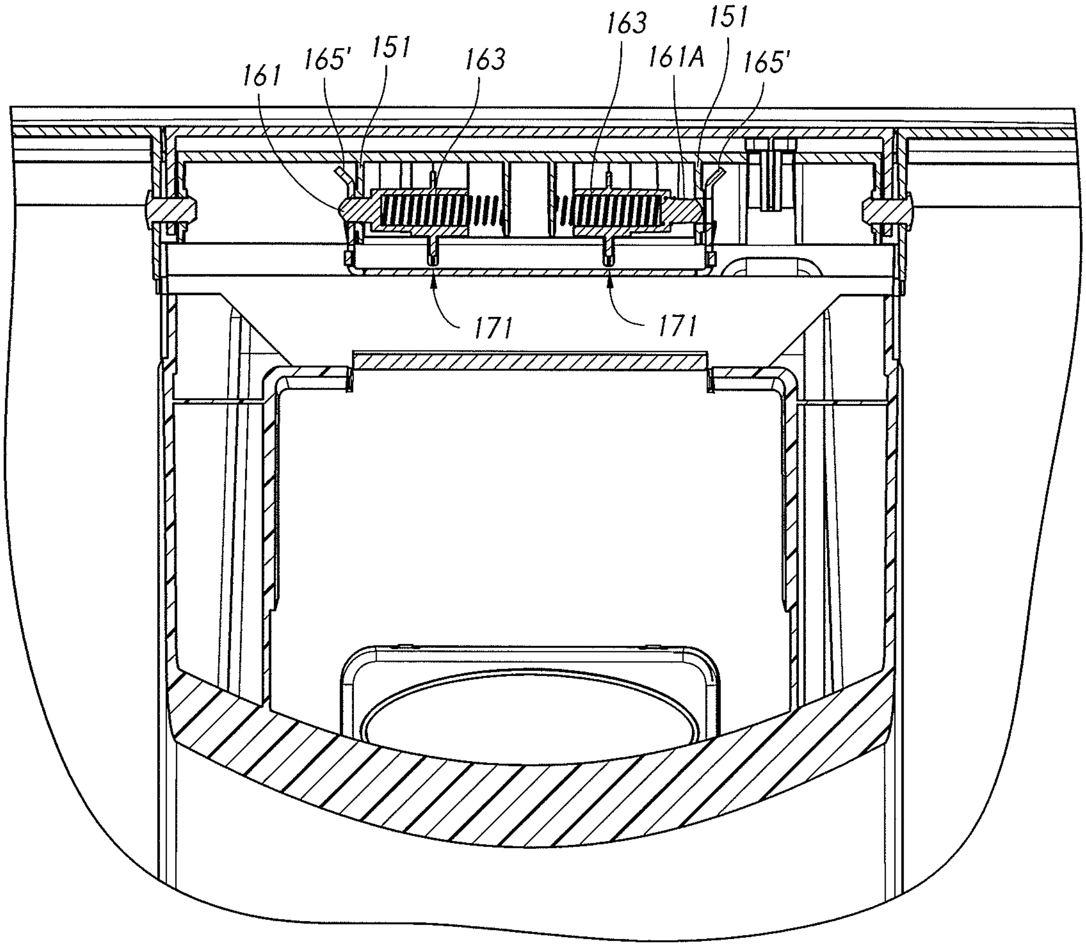
FIG. 32 illustrates a rear view of the connection of FIG. 31.
Figure 33:
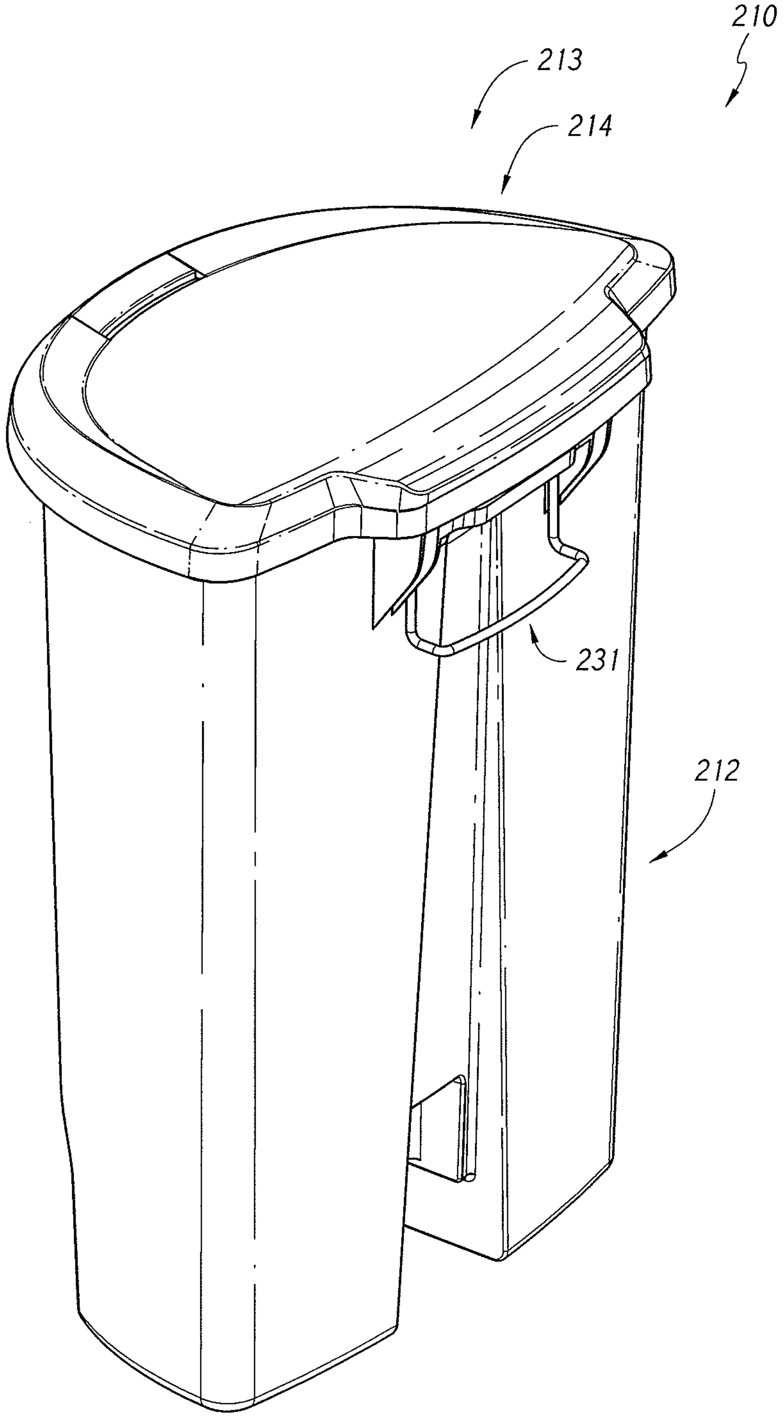
FIG. 33 illustrates a rear perspective view of another embodiment of a trash can, including a spacer in a stowed position.
Figure 34:
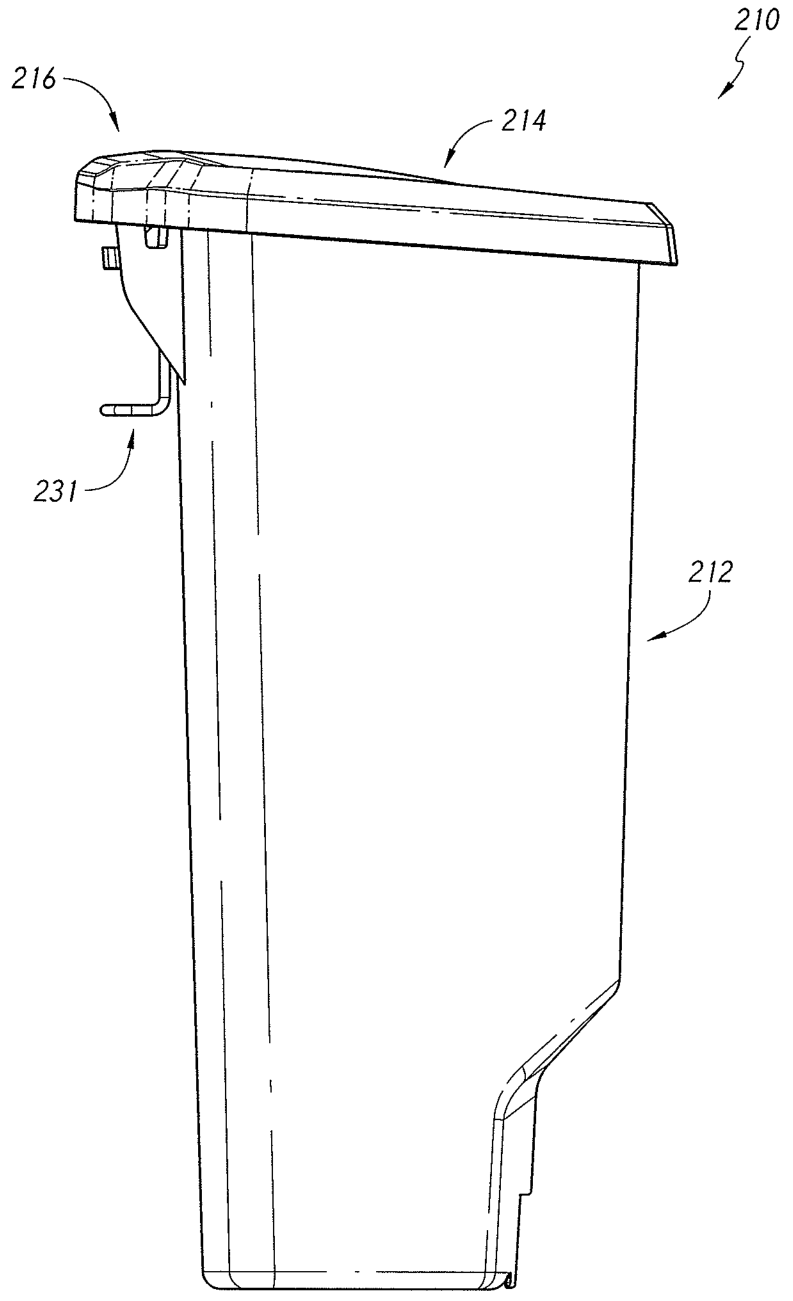
FIG. 34 illustrates a side view of the trash can of FIG. 33.
Figure 35:
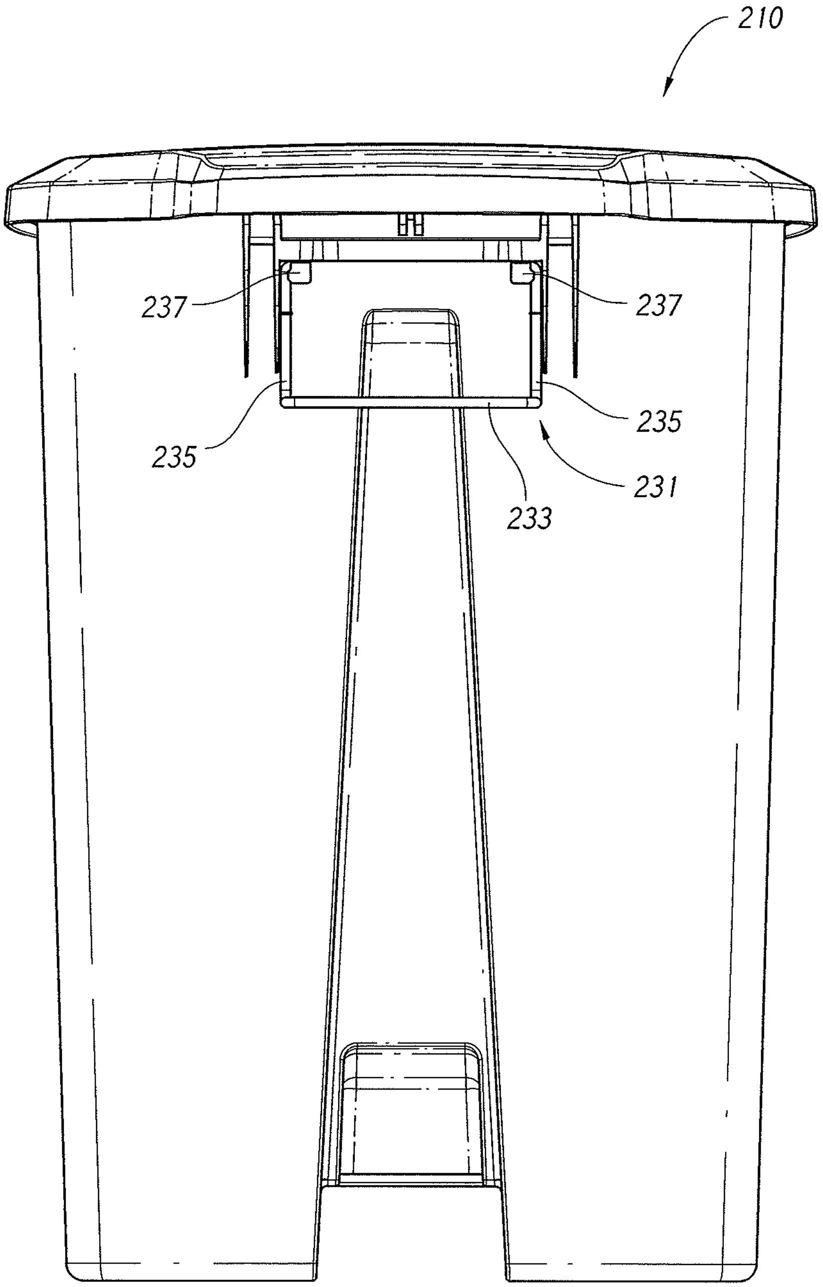
FIG. 35 illustrates a rear view of the trash can of FIG. 33.
Figure 36:
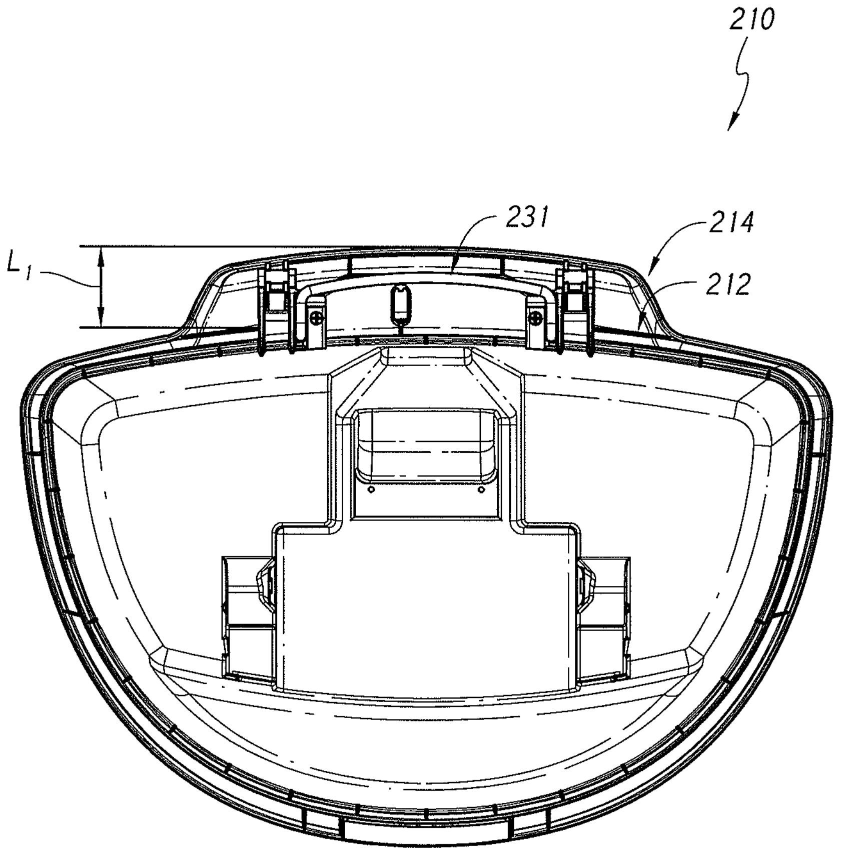
FIG. 36 illustrates a bottom view of the trash can of FIG. 33.
Figure 37:
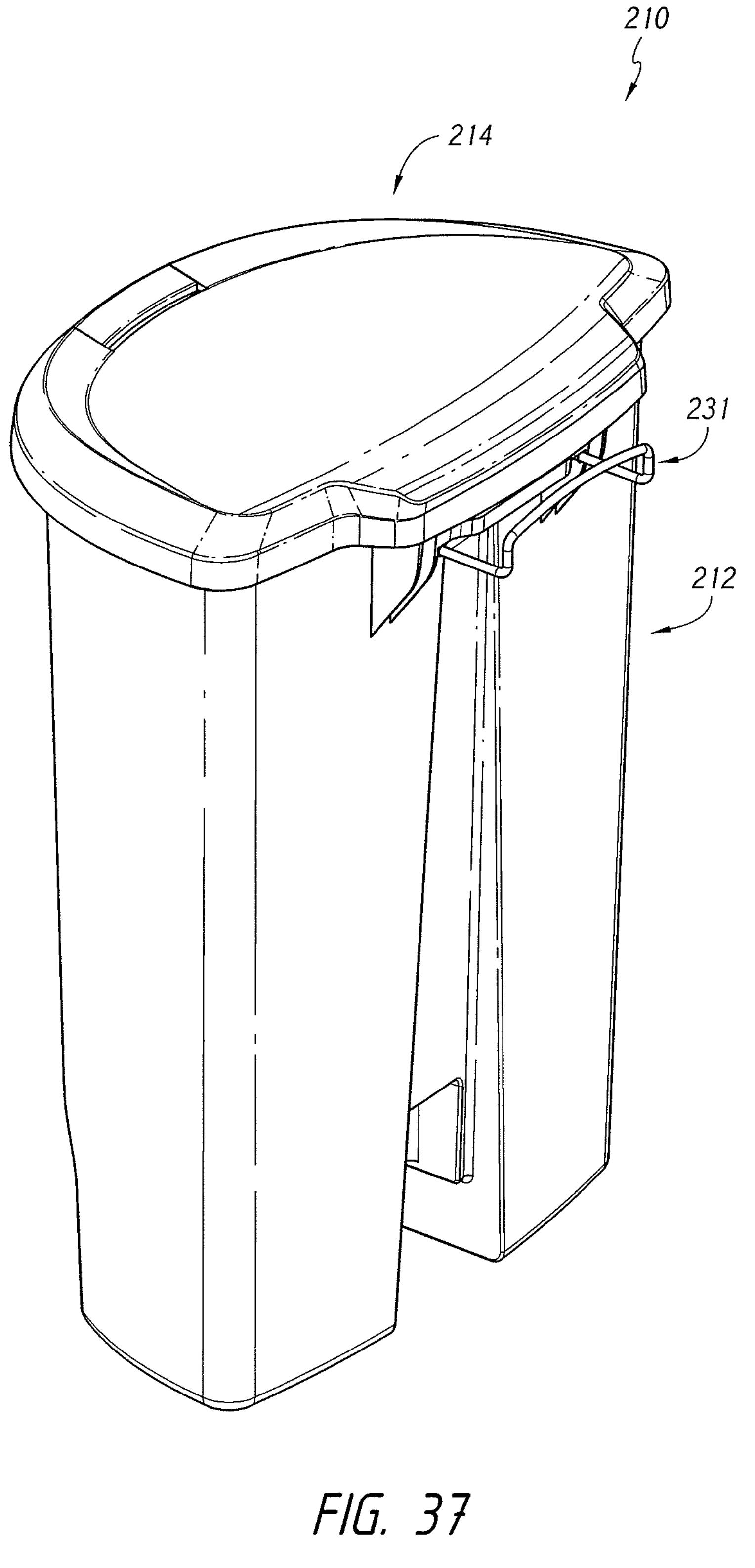
FIG. 37 illustrates a rear perspective view of the trash can of FIG. 33, with the spacer in a deployed position.

FIGS. 31 and 32 illustrate certain views of the hinge unit 116 engaged with the lid assembly 113. As shown, in the engaged configuration, the pin 161 can extend through the opening 156 in the connection member 151 of the trim ring 115 and/or can extend through the opening 167 in the connection base 165 of the hinge unit 116. In various embodiments, the pin 161 can thus provide a pivot axis about which the trim ring 115 and/or lid 114 can rotate relative to the body 112. In various embodiments, the pin 161 can axially engage with the connection member 151 and/or the connection base 165 to limit the amount of movement of the pin 161. For example, the pin 161 can include a shoulder (e.g., a region of an increased diameter) that axially engages with the connection member 151, and/or does not pass through at least one of the openings 156, 167.

As noted above, the pin 161 can be biased by the biasing member 163. In some embodiments, one end of the biasing member 163 engages (e.g., presses against) a projection on the pin 161 and another end of the biasing member 163 engages the strut 173 of the trim ring 115. For example, the strut 173 can be positioned laterally between the biasing members 163, as shown in FIGS. 31 and 32.

In various embodiments, certain portions of the trash can 110 are configured for increased strength and/or durability. For example, in some embodiments, certain components that experience increased loading during the operation of the trash can 110 (e.g., opening the lid 114 by depressing the pedal 120) are made of a stronger material than other portions of the trash can 110. In some embodiments, the support 165 is made of a different material than the body 112 of the trash can 110. For example, the support 165 can be made of a metal and the body 112 can be made of a plastic. In certain embodiments, the support 165 has a higher hardness (e.g., using a Rockwell Hardness B standard) than the body 112. Having an increased hardness and/or strength for the support 165 can facilitate guiding the connection member 151 of the trim ring 115 during engagement of the trim ring 115 and the hinge unit 116 and/or can improve durability of the hinge unit 116, which can experience stress during opening and closing of the lid 114.

Some embodiments of the trash can 110 are configured to be a lightweight trash can 110. For example, in some embodiments, some, substantially all, or the entire trash can 110 is made from a plastic material. This can reduce the weight of the trash can 110 (e.g., compared to an all-metal trash can), which can facilitate ease of positioning for a user and reduce costs associated with manufacturing and/or transporting the trash can 110. In some variants, the lid 114 is plastic. In certain implementations, the body 112 is plastic. In some embodiments, at least a portion of the trim ring 115 is plastic. As noted above, in some embodiments, part of the trim ring 115 is plastic and part of the trim ring 115 is metal. In certain variants, the pedal 120 is plastic. In some implementations, the pedal 120 is metal. In various embodiments, the linkage 122 is metal. Some embodiments have the hinge unit 116 made substantially or entirely of metal. In certain embodiments, the support 165 and/or the pin 161 is metal. In certain embodiments, the pin 161 is plastic.

In some embodiments, the trash can 110 is configured to be readily assembleable and/or to not require any special tool to assemble. For example, in some embodiments a method of assembling the trash can 110 includes removing the lid assembly 113 from an interior cavity of the body 112. In some embodiments, the method includes substantially aligning the hinge unit 116 with the connection base 165. Certain variants include receiving the hinge unit 116 in the connection base 165. In some embodiments, the method includes abutting the locating member 149 with the connection base 165. In certain implementations, the method includes guiding the hinge unit 116 with one or more guide portions 165'. Certain embodiments of the method can include moving (e.g., sliding) the pin 161, such as by pressing against the handle 171 that acts against the bias of the biasing member 163 and/or by a cam-action from engaging the pin 161 with the angled guide portion 165'. The method can include substantially aligning the pin 161 with the opening 156 (in the connection member 151) and/or with the opening 167 (in the connection base 165). The method can include moving the pin 161 through one or both of the openings 156, 167, such as by decreasing or removing pressure on the handle 171, thereby allowing the biasing member 163 to move the pin 161. In some embodiments, the method includes moving (e.g., rotating) the stabilizer 117 from the stowed position to the deployed position.

In various embodiments, a method of disconnecting the lid assembly 113 from the body 112 includes removing the pin 161 from engagement with the connection base 165, such as by sliding the pin 161 out of the opening 167. For example, the method can include actuating the handles 171 against the bias of the biasing members 163, thereby moving the pin 161 out of the opening 167. The method can include removing the hinge unit 116 of the trim ring 115 from the gap G in the connection base 165. In some embodiments, the method includes placing the lid assembly 113 in the interior cavity of the trash can 110. Some embodiments of the method include receiving a portion of another body 112 in the interior cavity of the body 112, such as in a nested configuration. Certain variants of the method include moving (e.g., rotating) the stabilizer 117 from the deployed position to the stowed the position.

With regard to FIGS. 33-41, another embodiment of a receptacle 210, such as a trash can 210, is illustrated. In any respects, the trash can 210 can be identical or similar to and/or can include one or more of the components or structures of any of the other receptacles disclosed in this specification instead of or in addition to those illustrated and/or described in connection with FIGS. 33-41. The numerals used to identify features of the trash can 210 are incremented by a factor of one hundred relative to the numerals used in connection with the trash can 110, thereby indicating illustrative similar features. The trash can 210 can include one, some, or all of the features of the trash can 10 and/or the trash can 110, including all combinations and sub-combinations. Any component or step disclosed in any embodiment in this specification can be used in any other embodiments.

The trash can 210 can include a body 212, lid assembly 213, and hinge unit 216. In some embodiments, the trash can 210 includes a pedal that is operatively connected to the lid assembly, such as via a linkage (for purposes of presentation, the pedal and linkage are not illustrated). In various implementations, when the pedal is depressed, a lid 214 of the lid assembly 213 moves to an open position, thereby allowing access to an interior cavity of the body 212. For example, the lid 214 can rotate upwardly about the hinge unit 216. In some embodiments, a lid of a trash receptacle can pivot peripherally, and the other components of the trash receptacle can be adapted accordingly. In certain variants, the lid assembly 213 includes a trim ring (not shown), which can rotate relative to the body 212. For example, the lid 214 and the trim ring can rotate about the same axis.

In some embodiments, a portion of the lid 214 and/or the hinge unit 216 projects generally rearwardly from the body 212. This allows the axis of rotation of the lid 214 to be positioned outside the body 212, which can aid in opening the lid 214 and/or in rotating the lid 214 such that it is substantially or completely disengaged from an upper peripheral lip of the body 212. In some variants, the lid 214 and/or the hinge unit 216 can extend from a rear outside edge of the upper peripheral lip of the body 212 by a horizontal distance of L1 (see FIG. 36).

Several embodiments of the trash can 210 include a positioner or location device, such as a spacer 231. The spacer 231 can selectively maintain the trash can 210 a distance away from an adjacent surface, such as a wall, cabinet, or other generally vertical interior structure. This can reduce the chance of the lid 214 rubbing against and/or impacting the wall when the lid 214 is opened, thereby reducing noise and inhibiting damage to the wall and/or the lid 214. In some embodiments, when the trash can 210 is placed adjacent a wall, the spacer 231 can space the rearmost portion of the lid 214 apart from the wall by a sufficient distance to provide a clearance for the moving parts of the lid assembly and/or to provide a clearance between the lid in its fully opened position and nearby objects. For example, as in the illustrated embodiments, a vertical line extending through a rearmost portion of the spacer 231 can be positioned in a rearward direction from a vertical line extending through a rearmost portion of one or more moving parts of the lid assembly and/or from a vertical line extending through a rearmost portion of the lid in its fully opened position.

The spacer 231 can move between a stowed position (such as is shown in FIGS. 33-36) and a deployed position (such as is shown in FIGS. 37-41). In some embodiments, the spacer 231 rotates between the stowed and deployed positions. In certain variants, the spacer 231 slides between the stowed and deployed positions. For example, the spacer 231 can move in a telescoping or accordion-like manner. In several variants, the lid 214 can be operated (e.g., opened and closed) regardless of the position of the spacer 231. In some embodiments, as illustrated, the spacer 231 is not configured to be a handle for the trash can 210. For example, the spacer 231 is too narrow to provide a comfortable gripping surface (e.g., the spacer 231, as shown, can be narrower along its length than the distance between the rear wall of the body 212 of the trash can 210 and the rearmost portion of the spacer 231) and/or the spacer 231 is not connected to the trash can 210 in a manner that is configured to bear the weight of the trash can 210 (especially when filled) when moved.

When in the stowed position, the spacer 231 is not the rearward-most portion of the trash can 210. For example, in some embodiments, when the spacer 231 is in the stowed position, the rear of the lid 214 can extend rearward of the spacer 231. In certain implementations, when the spacer 231 is in the stowed position, the trash can 210 occupies less space (e.g., the distance between the frontmost and rearmost portions of the trash can is reduced) and/or is more compact compared to when the spacer 231 is in the deployed position. This can aid in storing and/or transporting the trash can 210. In some embodiments, including but not limited to those in which the lid 214 is not yet attached to the trash can 210, as in the example illustrated in FIGS. 28-30, multiple trash cans 210 can be stacked in a vertically nested, stacked manner, with at least a first trash can 210 positioned at least partially within the interior cavity of a second trash can 210, for efficiency and cost-savings in transportation and storage. In some embodiments, nesting or stacking of the trash cans 210 can be accomplished only with the spacer 231 in the stowed position; while in some embodiments, nesting or stacking of the trash cans 210 can be accomplished with the spacer 231 in either the stowed or the deployed positions. In some embodiments, the stowed position of the spacer 231 can create a low profile for the trash can 210, which can decrease costs and increase shipping volumes by permitting the trash can 210 to be inserted into a substantially smaller individual package and/or by permitting multiple trash cans 210 to be inserted into a substantially smaller master carton, than if the spacer 231 were permanently in the deployed position.

When in the deployed position, the spacer 231 can project outward from one or more surfaces of the trash can 210, such as rearward of the lid 214. In some embodiments, when the spacer 231 is in the deployed position, the spacer 231 is the rearward-most portion of the trash can 210. When the trash can 210 is positioned adjacent an external objected or surface (e.g., a wall or cabinet), the spacer 231 can provide a physical stop that spaces-apart at least a portion of the trash can 210 (e.g., the lid 214) from such surface or object. As noted above, this can reduce the chance of the lid 214 rubbing against and/or impacting the surface when the lid 214 is opened, thereby reducing noise and inhibiting damage to the surface and/or the lid 214. In the deployed position, the spacer 231 can extend rearwardly beyond a rear of the lid 214 in the closed position by a horizontal distance of L2 (see FIG. 38). In some embodiments, the distance L2 is greater than or equal to about: 10 mm, 20 mm, 25.4 mm, 40 mm, or 50 mm, values between the aforementioned values, or otherwise. In certain embodiments, the ratio of L2 to L1 is at least about: 1.0, 1.5, 3.0, or 3.5, values between the aforementioned values, or otherwise.

The spacer 231 can be configured to position the trash can away from an adjacent surface. For example, the spacer 231 can be an elongate member, such as a curved wire, that can be selectively moved to extend rearward from the trash can 210. In some implementations, the spacer 231 is a movable arm, flange, or bar. In several embodiments, the spacer is generally rigid, which can inhibit movement of the trash can 210 relative to the adjacent surface and/or can allow the spacer 231 be to be used as a hand-hold during movement of the trash can 210. In several embodiments, the spacer 231 is made of metal, such as carbon steel, stainless steel, aluminum, or otherwise.

In some embodiments, the spacer 231 includes a handle portion 233. This can provide a place for a user to grasp when moving the trash can 210. For example, the trash can 210 can be lifted and/or pulled by the handle 233. In the embodiment shown, the spacer 231 is a generally U-shaped member with the handle portion 233 located in the bottom of the "U"; in other words, the spacer 231 can comprise a plurality of generally parallel portions and a portion that is generally perpendicular or generally orthogonal to the plurality of generally parallel portions. In some embodiments, when the spacer 231 is in the deployed position and the trash can 210 is positioned adjacent a wall, the handle portion 233 is configured to contact or to be positioned adjacent to the wall.

Figure 40:
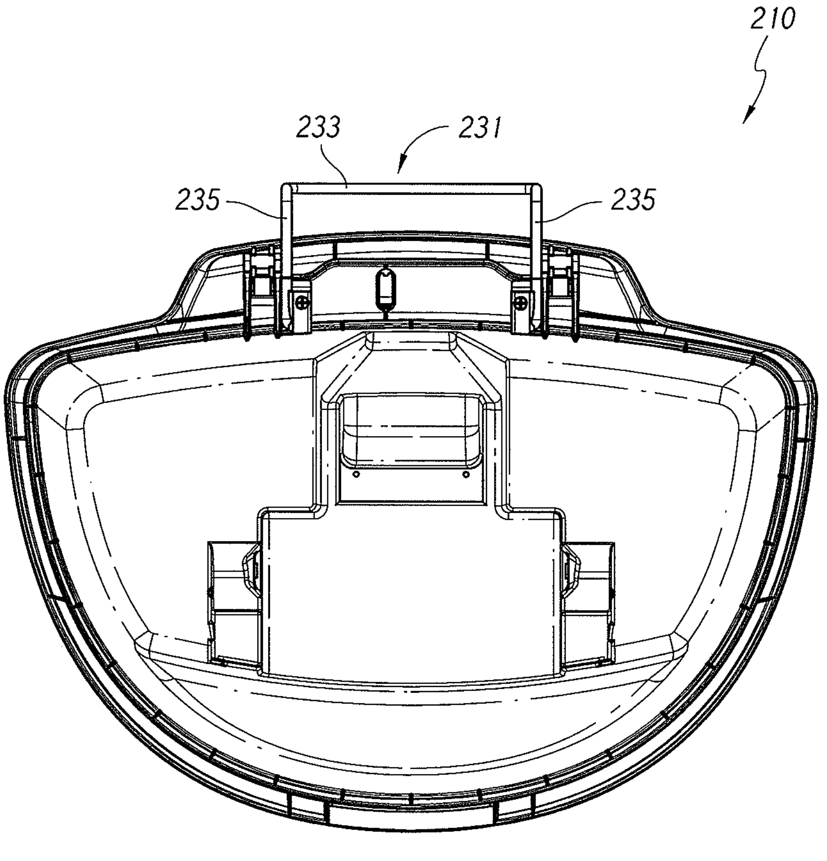
FIG. 40 illustrates a bottom view of the trash can of FIG. 37.

In some embodiments, as illustrated in FIG. 40, the side-to-side length of the spacer 231 is substantially less than the side-to-side width of the trash can 210. For example, the distance between the rear corners of the trash can 210 (if included), or the diameter of a generally round trash receptacle, can be substantially larger than the side-to-side length of the spacer 231. The spacer 231 can be positioned in a generally central, generally upper region of the rear portion of the trash can 210, such as along an upper edge of the body 212 and generally surrounding the hinge or lid-opening assembly. In some embodiments, there is only a single spacer 231 on the trash can 210, as illustrated, and no other portion of the trash can 210 extends in a rearward direction more than the single spacer 231. In some embodiments, as shown in FIG. 40, the side-to-side length of the spacer 231 can be about the same as the side-to-side length of the hinge or lid-moving assembly.

Figure 38:
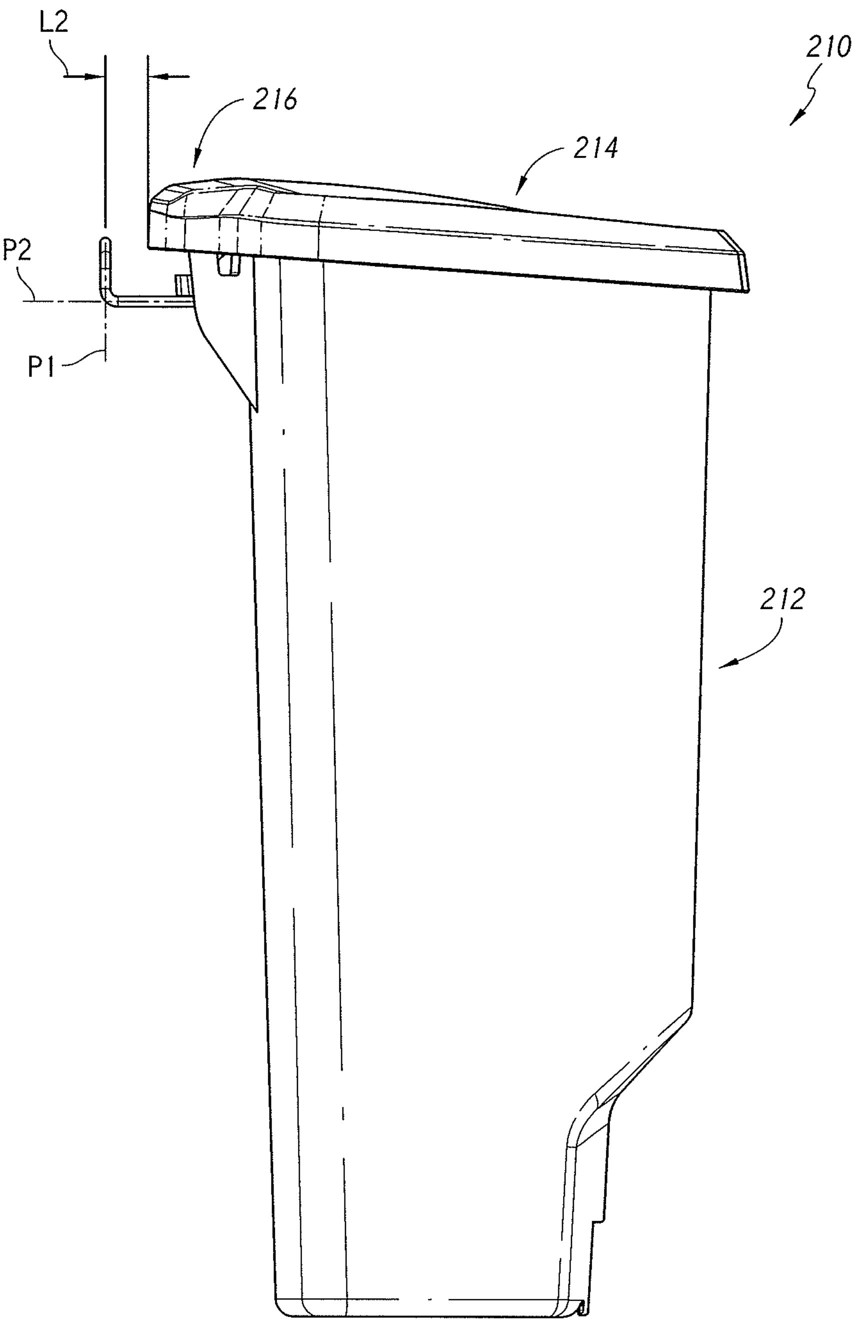
FIG. 38 a side view of the trash can of FIG. 37.
Figure 39:
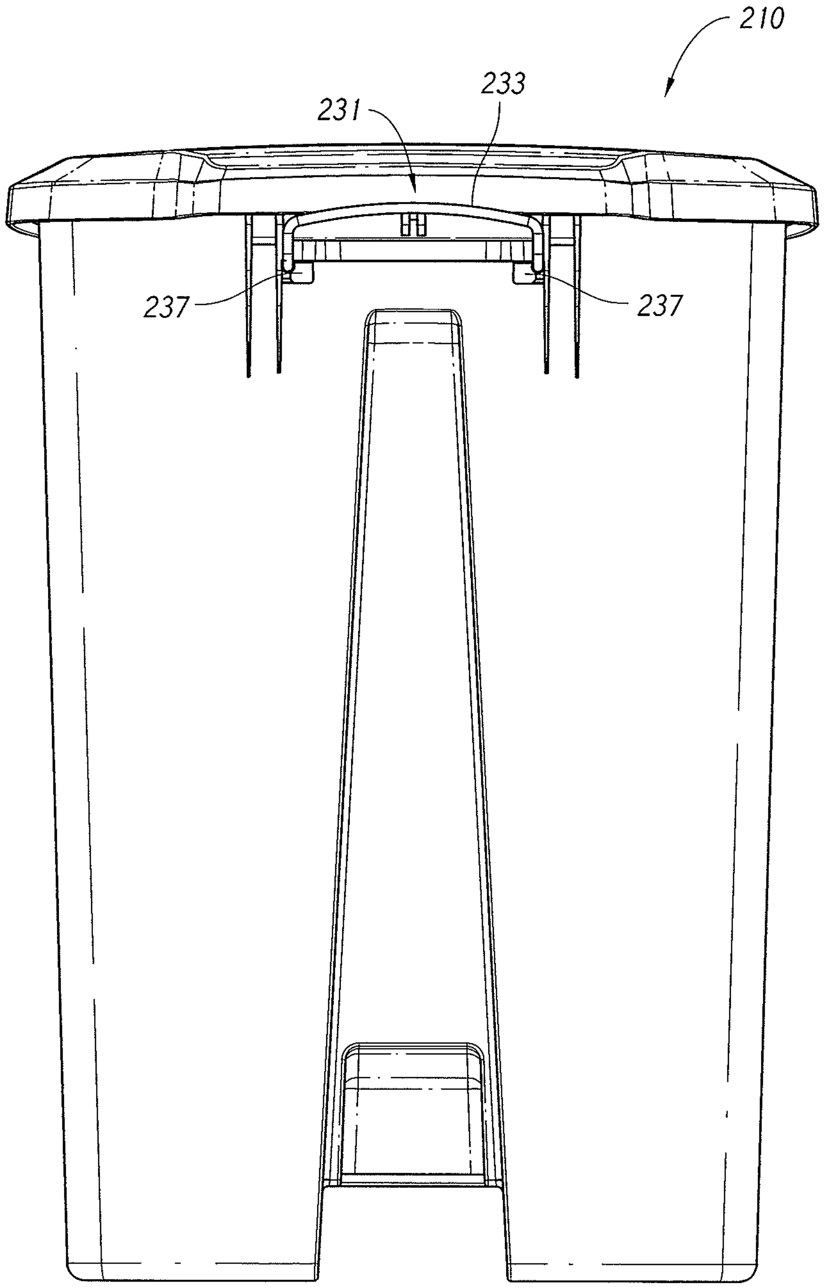
FIG. 39 illustrates a rear view of the trash can of FIG. 37.

The spacer 231 can include legs 235 that connect with the handle portion 233. In certain implementations, the transition between the handle portion 233 and each of the legs 235 includes curves (e.g., two substantially 90° bends). In some variants, the handle portion 233 is in a first plane P1 and the legs 235 are in a second plane P2. The first and second planes P1, P2 can be substantially perpendicular. For example, as shown in FIG. 38, the first plane P1 can be generally vertical and the second plane can be generally horizontal P2 when the spacer 231 is in the deployed position. Certain variants having the handle portion 233 and the legs 235 in different planes provide increased surface area of the handle portion 233, compared to some embodiments in which the handle portion 233 and the legs 235 are in the same plane. An increase in the surface area of the handle 233 can spread over a larger area any force that is transmitted from the trash can 210 to an adjacent surface, such as a wall. This can reduce the likelihood of damage to the wall and/or can inhibit rocking of the trash can 210 (e.g., an upper portion of the trash can 210 tipping toward the wall).

In certain implementations, the spacer 231 can be connected with one or more securing members 237, which are in turn connected with the body 212. For example, as shown, the securing members 237 can be connected to a flange on the body 212. In some embodiments, the securing members 237 are formed as part of the body 212 (e.g., are co-molded with the body 212). In some embodiments, the securing members 237 are separate components that are connected with the body 212, such as with fasteners (e.g., screws, rivets, or otherwise), adhesive, welding (e.g., thermal or ultrasonic), or otherwise.

The securing members 237 can include features that interact with the legs 235 of the spacer 231 aid in retaining the spacer 231 in the deployed position and/or the stowed position. For example, the securing members 237 can have catches or detents (e.g., ball detent, ramp detent, etc.) configured engage with the legs 235. In some embodiments, the securing members 237 have grooves (e.g., channels, recesses, or otherwise) that are configured to at least partially receive the legs 235. In some embodiments, the cross-sectional shape of each groove is substantially the same as the cross-sectional shape of the portion of the leg 235 received in that groove.

In some embodiments, the securing members 237 include openings (e.g., recesses) that are configured to receive a pivot end of one of the legs 235. The pivot end can be the end of the respective leg 235 that is opposite the end that connects to the handle portion 233. In some variants, the pivot end of each of the legs 235 extends in a direction generally parallel to the handle portion 233 and is received in the openings in the securing members 237. This can provide a pivot axis about which the spacer 231 can rotate. In some embodiments, the pivot ends point generally toward each other and/or are approximately coaxial.

In certain variants, at least a portion of the spacer 231, such as a contacting region of the spacer 231, includes a coating or other region that is configured to contact an object or structure near the trash can 210 while avoiding or resisting interference, damage, and/or noise. For example, the coating can be positioned on the handle portion 233. The coating can facilitate gripping of the spacer 231 by a user and/or can protect the coated portion of the spacer 231. In some embodiments, the coasting comprises a flexible and/or scuff-resistant material, which can reduce the chance of the spacer 231 damaging or scuffing an adjacent surface. For example, the coating can be a rubber (e.g., natural or synthetic) or plastic (e.g., polyvinylchloride or otherwise). In certain variants, the coating is generally clear to visible light and/or is substantially colorless. In some embodiments, the coating is generally opaque to visible light.

Figure 41:
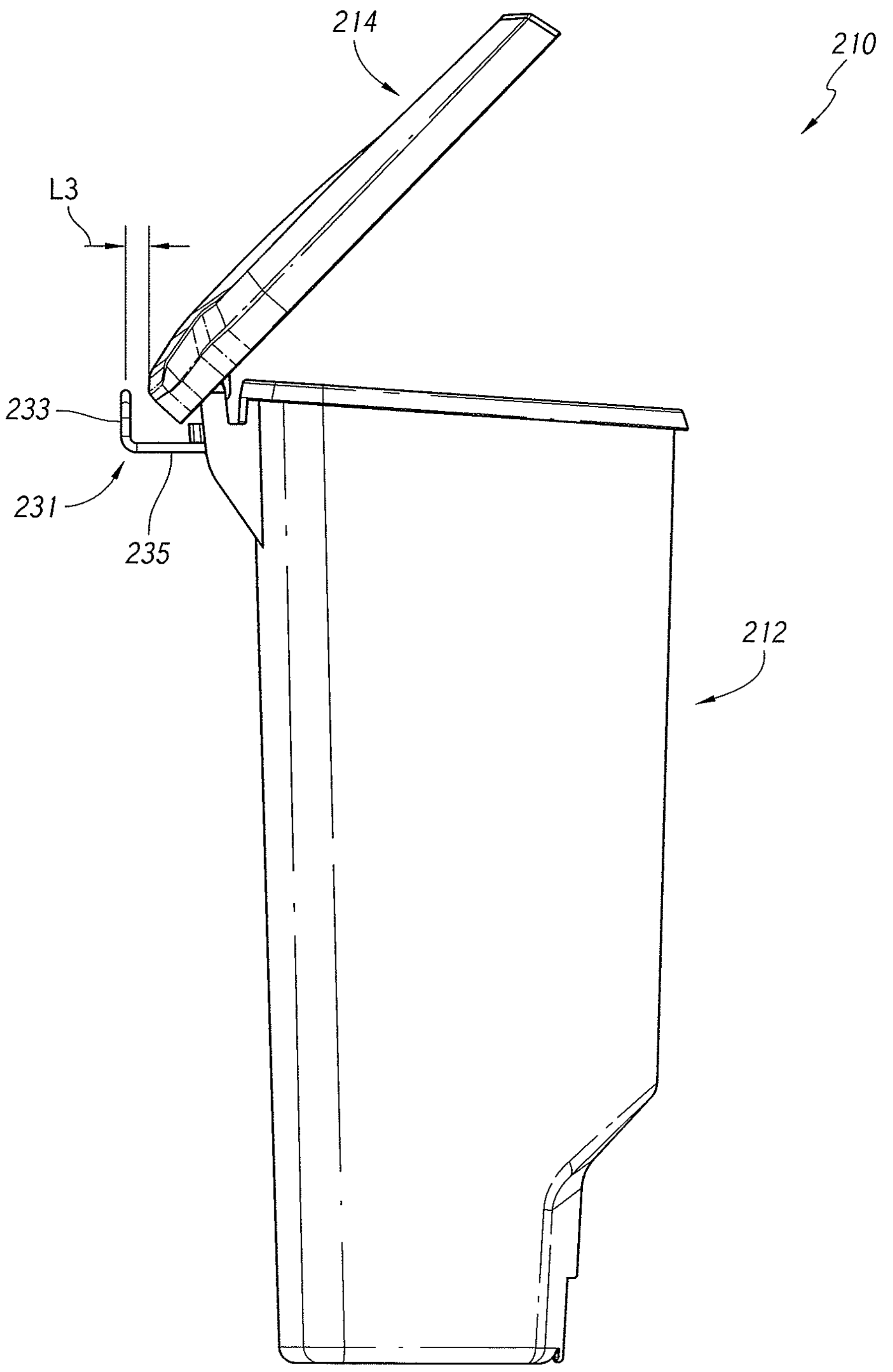
FIG. 41 illustrates a side view of the trash can of FIG. 37, with a lid of the trash can in an open position.

The spacer 231 can be configured such that, when the spacer 231 is in the deployed position and the lid 214 is opened, the spacer 231 extends rearward of the rearward-most portion of the lid 214. For example, the legs 235 can have a length such that the handle portion 233 is located rearward of the entirety of the lid 214, when lid 214 in the open position (e.g., as shown in FIG. 41) and when the lid 214 in the closed position (e.g., as shown in FIG. 38). This can reduce the chance of the lid 214 contacting a wall or other surface that is adjacent the trash can 210. In some embodiments, in the deployed position, the spacer 231 extends beyond a rear of the lid 214 in the open position by a horizontal distance of L3. In some embodiments, the distance L3 is greater than or equal to about: 10 mm, 15 mm, 20 mm, 25.4 mm, 30 mm, 35 mm, 40 mm, 50 mm, values between the aforementioned values, or otherwise. In some variants, the ratio of L3 to L1 is at least about: 1.0, 1.25, 1.5, 2.0, 2.5, 3.0, 3.5, values between the aforementioned values, or otherwise.

Figure 42:
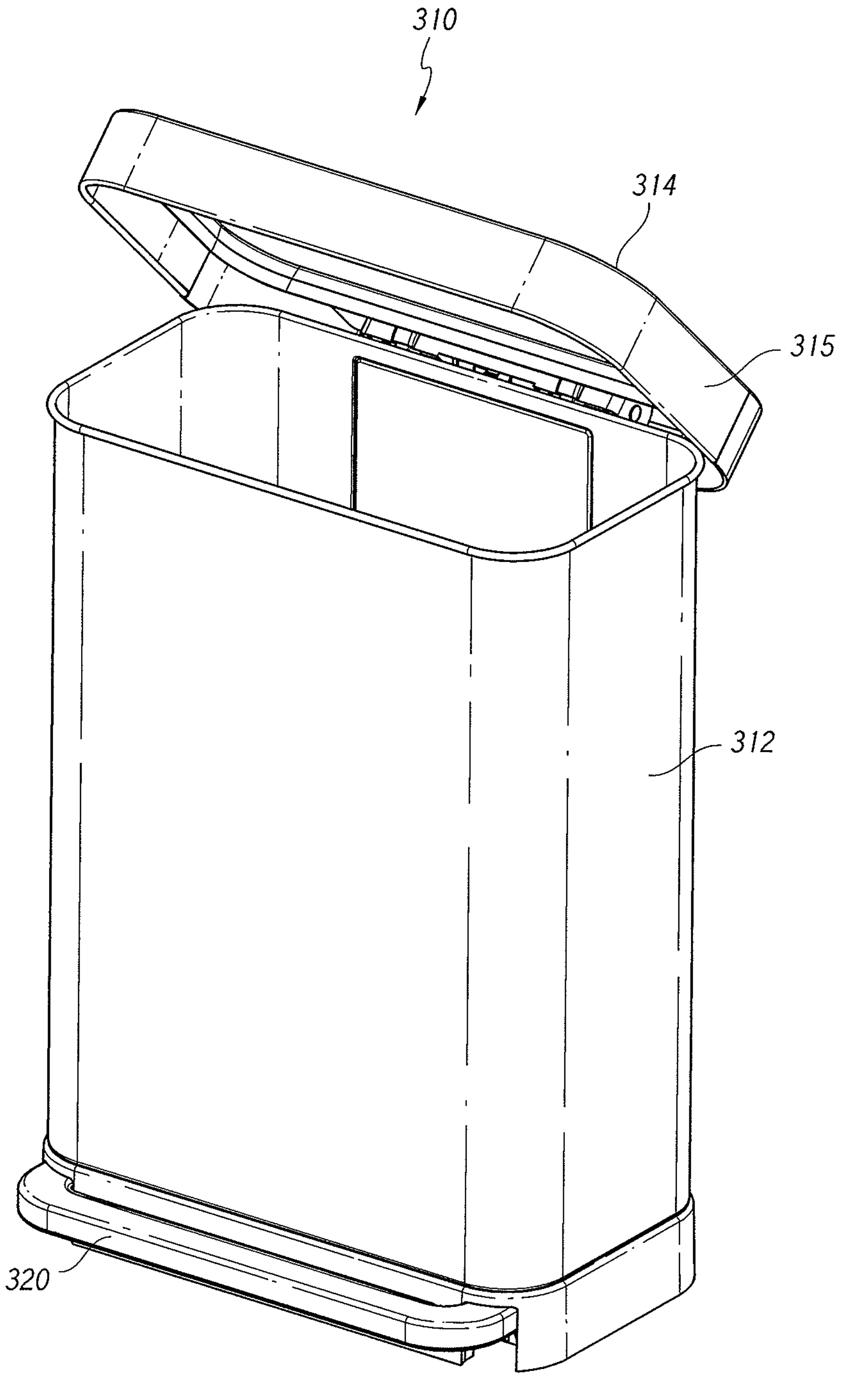
FIG. 42 illustrates a front perspective view of another embodiment of a trash can, including a movable trim ring in an open position.
Figure 43:
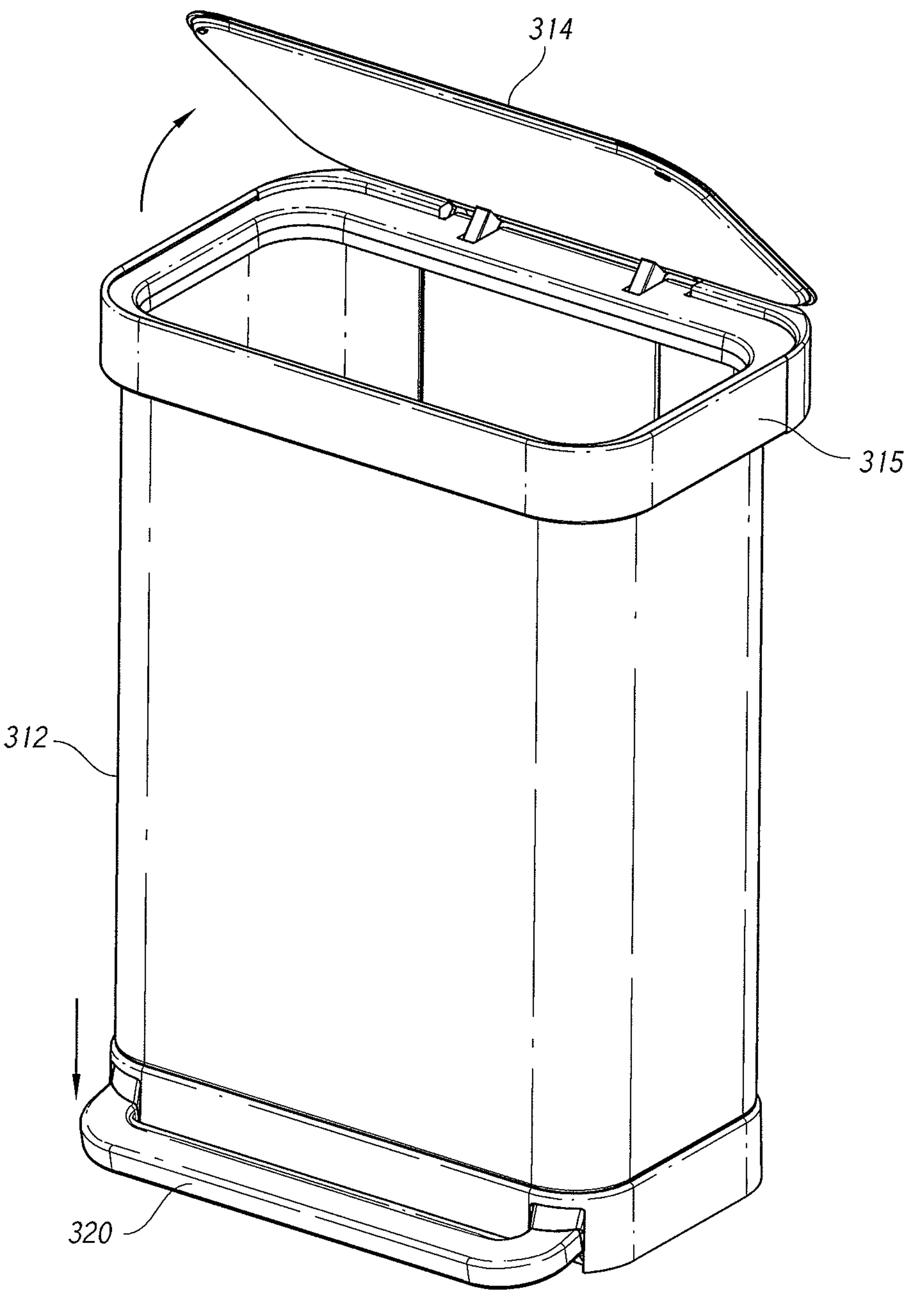
FIG. 43 illustrates a front perspective view of the trash can of FIG. 42 with the trim ring in a closed position and a lid in an open position.

FIGS. 42-46 illustrate another embodiment of a receptacle such as a trash can. As with all embodiments in this specification, any individual feature, step, structure, material, or method that is illustrated and/or described in FIGS. 42-46 can be used in combination with or instead of any individual feature, step, structure, material, or method that is illustrated and/or described in any other portion of this specification. As shown in FIG. 42, the trash can 310 can include a body 312 and an upper closure assembly. In some embodiments, as illustrated, the body 312 has at least two main parts: an upper sidewall and a lower base. The upper sidewall can be made of a material that is different from the lower base. For example, the upper sidewall can be made of a metal, such as stainless steel or aluminum, and/or the base can be made of a polymer such as plastic. The trash can 310 can include an aperture 325 that is configured to pass through trash bags or liners from the exterior of the trash can 310 to an interior region of the trash can 310, such as in other embodiments that are illustrated and/or described in this specification.

The upper closure assembly can include multiple parts, such as a trim ring 315 that is rotatable or otherwise moveable with respect to the body 312, and a lid 314 that is rotatable or otherwise moveable with the respect to the body 312. The trash can 310 may also include an actuator such as a pedal 320 that is configured to permit a user to actuate a function of the trash can 310, such as opening one or more portions of the closure assembly of the trash can, such as opening the lid 314 of the trashcan 310. In some embodiments (not shown), there may be multiple actuators, such as multiple pedals, that may actuate a plurality of different functions of the trash can 310, such as opening the lid 314 and/or the trim ring 315 of the trash can 310.

As illustrated in FIG. 42, the trim ring 315 can comprise a wide band that extends generally around the entire periphery of at least the front and sides of an upper portion of the body 312 of the trash can 310. The outer perimeter of the trim ring 315 can be larger than the outer perimeter of the upper portion of the body 312, as shown; or the outer perimeter of the trim ring 315 can be approximately the same size as or smaller than the outer perimeter of the upper portion of the body 312. As illustrated, the outer contours of the trim ring 315 can generally correspond to the outer contours of the upper region of the body.

In some embodiments, the trim ring 315 is configured to move between a closed position (as illustrated, for example, in connection with the trim ring 115 of FIGS. 18-24) and an open position (as illustrated, for example, in FIG. 42). In the closed position, a top edge or top region of the trim ring 315 can be generally horizontal and/or generally perpendicular to the vertical sidewall of the body 312. In some embodiments, in the closed position, the trim ring 115 can extend downwardly along or overlap at least a portion of the upper region of the body 312. As shown, the vertical height of the trim ring 315 can be approximately the same as the vertical height of the base of the trash can, although may other height dimensions are possible for either or both of these components, if even present.

In some embodiments, the trash can 310 does not include a removable rigid liner inside of the trash can 310 for receiving disposable trash bags or liners; rather, the trash can 310 is configured to receive an upper edge of the disposable trash bags or liners directly around the outer perimeter of the upper edge of the body 310 itself. When an upper edge of a trash bag or liner (not shown) is positioned around the upper edge of the body 310, a portion of the trash bag or liner may be exposed on the outside of the upper region of the body 310, which may present an undesirable aesthetic appearance. Conveniently, when the trim ring 115 is in the closed position, it can be configured to cover, obscure, and/or to securely hold the exposed portion of the disposable trash bag or liner along the upper region of the body 310. In some embodiments, as illustrated, the vertical length of the trim ring 115 is sufficiently long to cover or obscure any exposed portion of the upper edge of the disposable trash bag or liner when the trim ring 115 is in the closed position.

Figure 44:
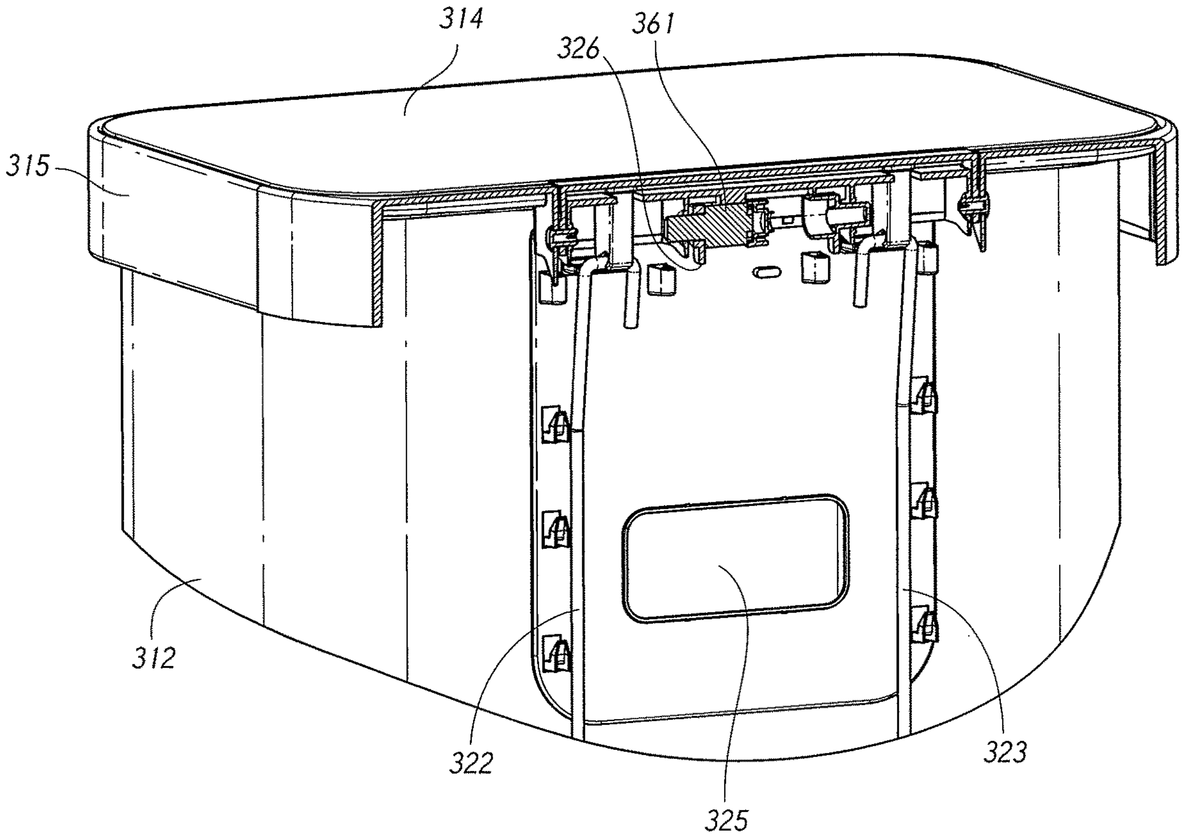
FIG. 44 illustrates a rear perspective cut-away view of a top portion of the trash can of FIG. 42.
Figure 45:
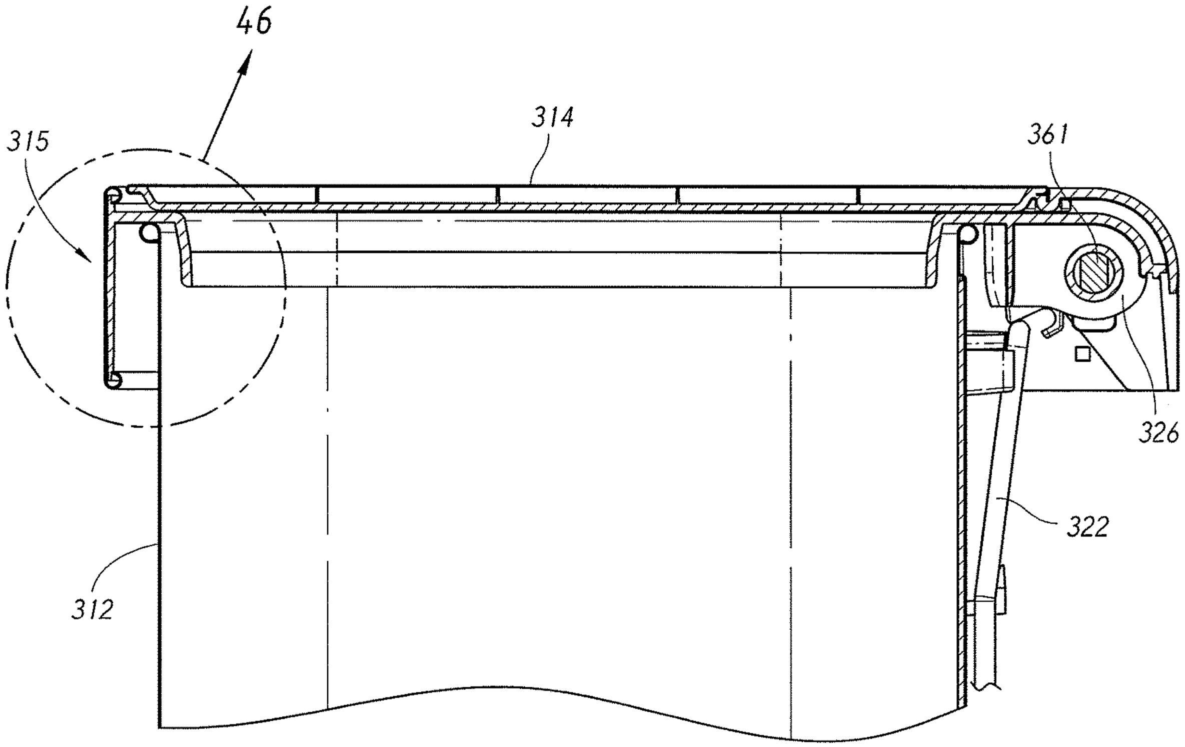
FIG. 45 illustrates a left-side cross-sectional view of a top portion of the trash can of FIG. 42.
Figure 46:
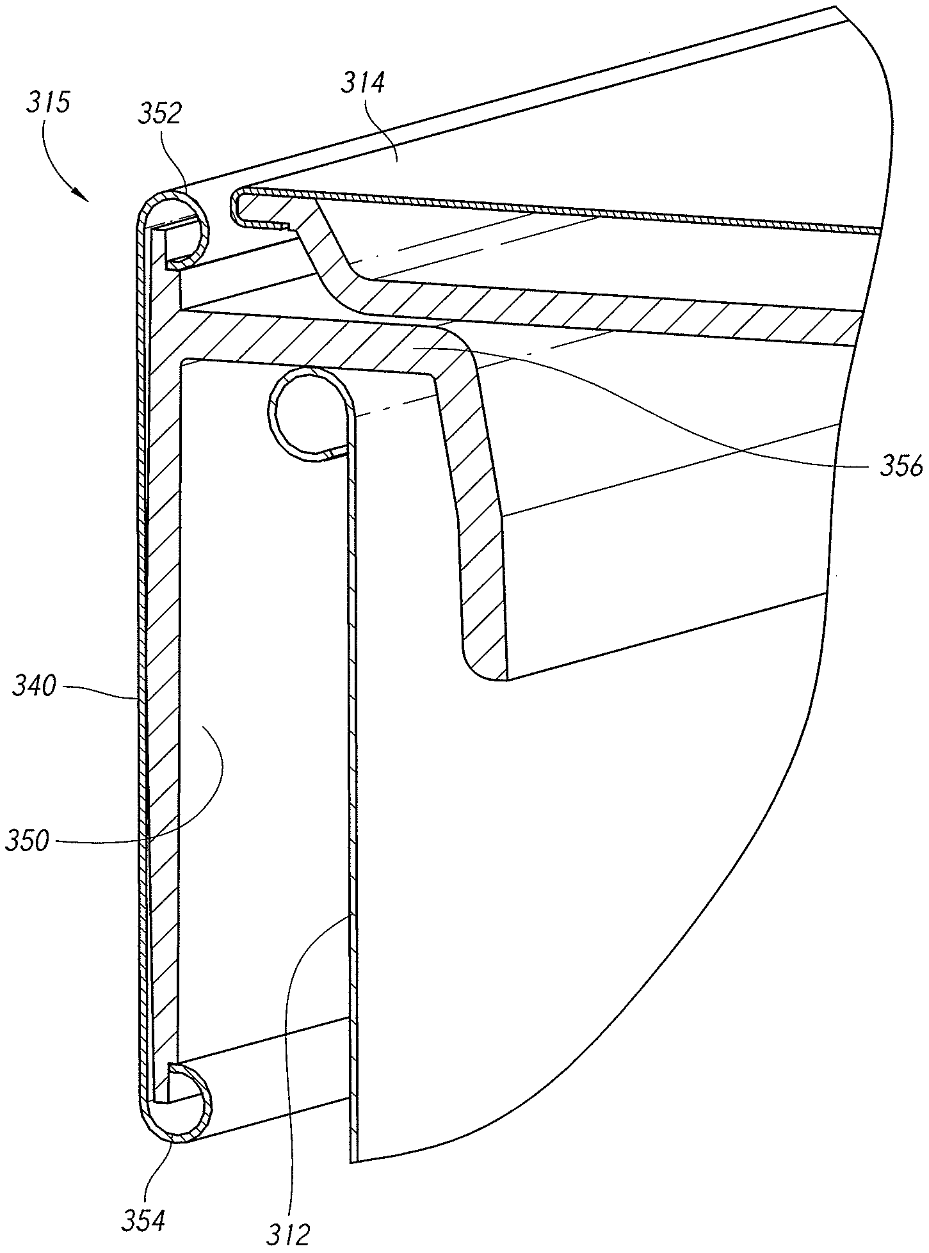
FIG. 46 illustrates a cross-sectional view of a detail section as shown in FIG. 45.

As shown in FIG. 44, which is a rear cut-away illustration of the trash can 310, the trim ring 315 and/or the lid 314 can be rotatably or pivotally or otherwise moveably attached to the trash can 310 along a rear side of the trash can 310. The pedal 320 can be directly or indirectly attached to a force-transferring system, such as one or more linkages 322, 323, that is or are configured to transfer force from the actuation of the pedal to the lid 314 to urge the lid to temporarily pivot upwardly into an open position. As illustrated in FIGS. 44-46, at least a portion of the lid 314 can be positioned to contact and rest upon an interior ledge region 356 of the trim ring 115, and/or to nest at least partially within an upper region 356 of the trim ring 115. In some embodiments, as shown in FIGS. 44-46, the lid 314 and the trim ring 115 can together form a generally continuous exterior without protruding edges. For example, the uppermost edge of the trim ring 115 can be positioned at about the same vertical level as the uppermost surface of the lid 314.

The lid 314 can be directly or indirectly attached to a damper (not shown), such as a dampening mechanism 160 at or near the base of the trash can 310, as is illustrated and/or described in connection with the trash can of FIG. 19, or any other type of damper. In some embodiments, the damper can help to slow down the closing and/or opening of the lid 314 to diminish noise and/or undesired knocking of the lid 314 against an adjacent wall or cabinet or furniture. The damper can be positioned at or near the bottom region or base of the trash can 310 of FIGS. 42-46, as illustrated in the embodiment of FIG. 19, or in any other suitable position, such as in a top or middle region of the trash can 310.

In some embodiments, as shown, the lid 314 can be pivotally attached to the trim ring 315, which in turn can be pivotally attached to the body 312 of the trash can 310. The trim ring 315 can be manually moved by a user from the closed position to the open position, as shown in FIG. 42, such as by grasping a side or front region of the trim ring 315, and rotating it upwardly. In some embodiments (not shown), the opening and/or closing of the trim ring 315 can be actuated in another way, such as with an actuator (e.g., a foot pedal, a lever, an electric motor, or some other actuation device). In some embodiments, the trim ring 315 can lock into or be held by the closure assembly in a temporarily open position to provide an opening that is sufficiently wide at the top of the trash can 310 to enable a user to maneuver around the top region of the trash can 310 in order to install a trash bag or liner along the top region of the trash can 310, without significant obstruction by the trim ring 315. The temporary locking or holding of the trim ring 315 can be accomplished, at least in part, by an actuator (e.g., a sliding switch, dial, or lever, electronic button, etc.) or by a particular manual movement of the trim ring 315 to engage a locking or holding mechanism (e.g., by pushing the trim ring 315 in a rearward direction after rotating it upwardly into the opened position).

As shown in FIGS. 44 and 45, the trim ring 315 can include a dampening mechanism, such as damper 361, to slow down the opening and/or closing of the trim ring 315. The damper 361 can be directly or indirectly attached to a movement component 326, such as a hinge or pivot component, of the closure assembly. As illustrated, the damper 361 can be a rotation damper, which can provide rotational resistance against a torque applied to the movement component 326. Any suitable type of dampening mechanism can be used instead of or in addition to the rotational damper 361, such as an air damper, a liquid damper, or a spring damper. As illustrated, the trash can 310 can comprise at least two dampers: a first damper for dampening the opening and/or closing movement of the lid 314, and a second damper for dampening the opening and/or closing movement of the trim ring 315. In some embodiments, as illustrated, the lid 314 and trim ring 315 can move independently of each other, such that the lid 314 can be open while the trim ring 315 is closed, and/or the lid 314 can be closed while the trim ring 315 is open. Many other variations from those illustrated are possible. For example, either or both of the trim ring 315 and/or lid 314 can be omitted entirely; the lid 314 can be attached to the trash can 310 independently of the trim ring 315; the lid 314 and trim ring 315 can be damped using the same dampening mechanism, etc.

As shown in FIG. 46, the trim ring 315 can be formed from a plurality of different materials. For example, the trim ring 315 can comprise an exterior panel 340 and an interior panel 350. In some embodiments, the exterior and interior panels 340, 350 can be formed from different materials. For example, the exterior panel 340 can be formed from a metal, such as stainless steel or aluminum, and the interior panel 350 can be formed from a polymer, such as a plastic. In some embodiments, as shown, the exterior panel 340 can be substantially thinner than the interior panel 350. A metallic exterior panel 340 can provide a desirable aesthetic appearance and/or can be easier to clean or to maintain clean than a polymer exterior panel; however, metallic materials can be more expensive, more heavy, and/or more difficult or more expensive to mold into a particular functional shape than a polymer material. On the other hand, a plastic interior panel 350 can be less expensive, light-weight, and easy to mold into a particular functional shape than a metallic material, such as in forming a hinge or attachment member in the pivot or movement region of the trim ring 315 or other component.

The exterior panel 340 can be attached to the interior panel 350 in many different ways. For example, the exterior panel 340 can be adhered onto an exterior face of the interior panel 350, such as using any suitable type of glue or tape or other adhesive; or the exterior panel 340 can be mechanically affixed onto the interior panel 350, such as by a snap fit, or by a friction fit, or by fasteners such as one or more screws, rivets, brads, etc. In some embodiments, the exterior panel 340 can be attached to the interior panel 350 in such a way that, as illustrated, the upper edge 352 and/or lower edge 354 of the trim ring 315 are covered (at least partially, or along a majority or their respective lengths, or at least along a majority of the front and lateral side regions, or substantially entirely) by the exterior panel 340, at least along the front and/or lateral sides of the upper region of the trash can 310. In some embodiments, the rear side of the interior panel 350 of the trim ring 315 is not covered by the exterior panel 340 (as shown). In some embodiments, the interior panel 350, which may not be as aesthetically pleasing as the exterior panel 340, is not exposed to outside view, including along at least a portion of, or a majority of, or the entirety of, the upper edge 352 and/or the lower edge 354 of the trim ring 315, at least on the front and/or lateral sides of the trash can 310. In some embodiments, as shown, the exterior panel 340 is attached to the interior panel 350 by curling a portion of an upper edge 352 of the exterior panel 340 around an upper edge of the interior panel 350 and/or by curling a portion of a lower edge 354 of the exterior panel 340 around a lower edge of the interior panel 354. In some embodiments, as shown, the upper and/or lower edges 352, 354 of the exterior panel are rounded, as illustrated in FIGS. 45-46.

In some embodiments, as shown in FIG. 46, the lid can comprise a least two components: an interior portion and an exterior portion. The interior and exterior portions can be made of different materials. For example, the interior portion can be made of a thick polymer, such as plastic, and the exterior portion can be made of a thin metal, such as aluminum or stainless steel. As illustrated, the trim ring 315 and the lid 314 can be formed and oriented such that only a metallic appearance on both of these components is visible from the exterior (at least on the front and/or lateral sides) when the lid 314 and trim ring 315 are both in closed positions.

Although the trash cans have been disclosed in the context of certain embodiments and examples, it will be understood by those skilled in the art that the trash cans extend beyond the specifically disclosed embodiments to other alternative embodiments and/or uses of the embodiments and certain modifications and equivalents thereof. For example, although generally rectangular trash cans are depicted, the disclosed inventive concepts can be used in connection with a wide variety of trash can configurations. Various features and aspects of the disclosed embodiments can be combined with or substituted for one another in order to form varying modes of a receptacle or trash can. For example, the trash can 10 can include the hinge unit 116 of the trash can 110. As another example, the trash can 110 can include the wheels 18 and/or the stacking functionality (see, e.g., FIG. 4) of the trash can 10. Or the trash can 210 can include the dispenser unit of FIG. 20. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and that all operations need not be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

In summary, various embodiments and examples of trash can assemblies have been disclosed. Although the trash cans have been disclosed in the context of those embodiments and examples, it will be understood by those skilled in the art that this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow.

The following is claimed:

1. A trash can assembly comprising:

a body comprising a front wall, a rear wall, a bottom, an interior cavity, and an upper opening through which refuse can be inserted into the interior cavity;

a lid assembly configured to couple with the body, the lid assembly comprising a lid that is movable between an open position and a closed position;

a leg connected with the body and configured to move between a stowed position and a deployed position, the leg comprising a first terminal end, a second terminal end, and an intermediate section between the first terminal end and the second terminal end, wherein:

in the stowed position, the entirety of the leg is positioned within a footprint of the lid of the lid assembly; and in the deployed position, an end of the leg extends rearwardly beyond a footprint of the bottom of the body of the trash can assembly; and a catch or detent located under an overhanging wall, the catch or detent configured to engage with the intermediate section of the leg, thereby retaining the leg in the deployed position.

2. The trash can assembly of claim 1, wherein the leg is configured to rotate between the stowed and deployed positions.

3. The trash can assembly of claim 1, further comprising a second leg, the second leg configured to move between the stowed and deployed positions.

4. The trash can assembly of claim 3, wherein the leg and the second leg are connected.

5. The trash can assembly of claim 1, further comprising a recess that receives the leg in the stowed position.

6. The trash can assembly of claim 1, wherein the lid assembly further comprises a trim that is movable relative to the lid, the trim being visible to a user with the lid in the closed position.

7. The trash can assembly of claim 6, wherein the lid is connected to the trim, and the trim is connected to the body.

8. The trash can assembly of claim 1, wherein the leg rotates about a horizontal axis of rotation.

9. The trash can assembly of claim 1, in the deployed position, the end of the leg extends rearwardly beyond the footprint of the lid assembly.

10. The trash can assembly of claim 1, further comprising a trash bag dispenser on the rear wall of the body.

11. The trash can assembly of claim 10, wherein the trash bag dispenser comprises a rear wall with an open passageway for the passage of trash bags.

12. The trash can assembly of claim 1, wherein the lid and a trim are rotatable about the same axis.

13. The trash can assembly of claim 1, wherein the leg is connected with an upper end of the body.

14. The trash can assembly of claim 1, wherein the leg is connected with a rear wall of the body.

15. The trash can assembly of claim 1, wherein the trash can assembly is configured such that, with the leg in the stowed position, a plurality of the trash can assemblies are stackable in a vertically nested manner such that a first of the plurality of trash can assemblies is positionable at least partially within the interior cavity of a second of the plurality of trash can assemblies.

16. The trash can assembly of claim 1, wherein the body comprises a tapered shape such that a top of body is wider than a bottom of the body.

17. The trash can assembly of claim 1, further comprising a foot pedal connected to the lid by a linkage, the linkage positioned in an exterior recessed channel of the rear wall of the body.

18. The trash can assembly of claim 17, further comprising a second leg, the second leg configured to move between the stowed and deployed positions, the first leg connected to the body on a first lateral side of the recessed channel and the second leg connected to the body on an opposing second lateral side of the recessed channel.

19. A trash can assembly comprising:

a body comprising a front wall, a rear wall, a bottom, an interior cavity, and an upper opening through which refuse can be inserted into the interior cavity;

a lid assembly configured to couple with the body, the lid assembly comprising:

a lid that is rotatable between an open position and a closed position; and a trim that is rotatable relative to the lid, the lid and the trim rotatable about the same axis;

a leg connected with the body and configured to move between a stowed position and a deployed position, wherein:

in the stowed position, the entirety of the leg is positioned within a footprint of the lid; and in the deployed position, an end of the leg extends rearwardly beyond a footprint of the bottom of the body of the trash can assembly; and a catch or detent located under an overhanging wall, the catch or detent configured to retain the leg in the deployed position.

20. A trash can assembly comprising:

a body comprising a front wall, a rear wall, a bottom, an interior cavity, and an upper opening through which refuse can be inserted into the interior cavity, the rear wall comprising an exterior recessed channel;

a lid assembly configured to couple with the body, the lid assembly comprising:

a lid that is movable between an open position and a closed position; and a trim that is movable relative to the lid, the trim being visible to a user with the lid in the closed position;

a foot pedal connected to the lid by a linkage, the linkage positioned in the exterior recessed channel;

a leg connected with the body and configured to move between a stowed position and a deployed position, wherein:

in the stowed position, the entirety of the leg is positioned within a footprint of the lid assembly; and in the deployed position, an end of the leg extends rearwardly beyond a footprint of the bottom of the body of the trash can assembly; and a catch or detent located under a wall of the body, the catch or detent configured to retain the leg in the deployed position.

21. The trash can assembly of claim 20, further comprising a second leg, the second leg configured to move between the stowed and deployed positions, the leg connected to the body on a first lateral side of the exterior recessed channel and the second leg connected to the body on an opposing second lateral side of the exterior recessed channel.

* * * * *